(12) United States Patent
Kline et al.

(10) Patent No.: US 12,269,728 B2
(45) Date of Patent: *Apr. 8, 2025

(54) SYSTEM, METHOD, AND APPARATUS FOR PURCHASING, DISPENSING, OR SAMPLING OF PRODUCTS

(71) Applicant: TransparenSee LLC, Marietta, GA (US)

(72) Inventors: Michael J. Kline, Corona Del Mar, CA (US); Denise Lisa Salvucci, Corona Del Mar, CA (US)

(73) Assignee: TransparenSee LLC, Marietta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/473,252

(22) Filed: Sep. 13, 2021

(65) Prior Publication Data

US 2021/0403308 A1 Dec. 30, 2021

Related U.S. Application Data

(60) Division of application No. 16/749,741, filed on Jan. 22, 2020, now Pat. No. 11,124,405, which is a
(Continued)

(51) Int. Cl.
*B67D 1/08* (2006.01)
*B67D 1/00* (2006.01)
(Continued)

(52) U.S. Cl.
CPC ......... *B67D 1/0888* (2013.01); *B67D 1/0027* (2013.01); *G06Q 30/0203* (2013.01);
(Continued)

(58) Field of Classification Search
CPC .... B67D 1/088; B67D 1/0027; B67D 1/0878; G06Q 30/0203; G07F 13/065; G07F 9/026; G07F 9/023; G07F 13/00
See application file for complete search history.

(56) References Cited

U.S. PATENT DOCUMENTS

| | | | |
|---|---|---|---|
| 4,512,431 | A | 4/1985 | Bloomfield |
| 4,534,818 | A | 8/1985 | Kreager et al. |

(Continued)

FOREIGN PATENT DOCUMENTS

| | | |
|---|---|---|
| CA | 2912016 A1 | 11/2014 |
| JP | 09-050426 A | 2/1997 |

(Continued)

OTHER PUBLICATIONS

U.S. Appl. No. 16/749,741, filed Jan. 22, 2020.
(Continued)

*Primary Examiner* — Timothy R Waggoner
(74) *Attorney, Agent, or Firm* — BakerHostetler

(57) ABSTRACT

A product dispenser is configured to dispense products subject to a warning and products not subject to a warning, the product dispenser further configured to transmit a product warning notice only in response to a request to dispense a product subject to the warning. In another embodiment, a product dispenser is configured to dispense a food or beverage product and provide information indicative of an attribute of the food or beverage product, such as nutrition facts, as it is being dispensed. In another embodiment, a product dispenser is configured to enable a user to request a customized product from the product dispenser, to determine a first profile for the customized product blend, compare the first profile to a second profile, and reformulate the customized product blend to a dispensed product blend comprising a third profile approximating the second idealized profile.

15 Claims, 23 Drawing Sheets

Related U.S. Application Data continuation of application No. 15/609,245, filed on May 31, 2017, now Pat. No. 10,611,622, which is a continuation of application No. 14/335,855, filed on Jul. 18, 2014, now Pat. No. 9,701,530, which is a continuation-in-part of application No. 14/269,741, filed on May 5, 2014, now Pat. No. 9,527,716, which is a continuation-in-part of application No. 14/087,881, filed on Nov. 22, 2013, now Pat. No. 9,633,504.

(51) Int. Cl.
  *G06Q 30/0203* (2023.01)
  *G07F 9/02* (2006.01)
  *G07F 13/00* (2006.01)

(52) U.S. Cl.
  CPC ............. *G07F 9/023* (2013.01); *G07F 9/026* (2013.01); *G07F 13/00* (2013.01); *B67D 1/0878* (2013.01)

(56) References Cited

U.S. PATENT DOCUMENTS

| | | | |
|---|---|---|---|
| 5,360,176 A | 11/1994 | Mugge et al. | |
| 5,774,871 A | 6/1998 | Ferro | |
| 6,161,059 A | 12/2000 | Tedesco et al. | |
| 6,413,000 B1 | 7/2002 | Borcherds et al. | |
| 6,751,525 B1 | 6/2004 | Crisp, III | |
| 7,493,267 B1 | 2/2009 | Walker et al. | |
| 7,627,496 B2 | 12/2009 | Walker et al. | |
| 7,757,896 B2 | 7/2010 | Carpenter et al. | |
| 7,762,181 B2 | 7/2010 | Boland et al. | |
| 8,306,655 B2 | 11/2012 | Newman | |
| 8,340,815 B2 | 12/2012 | Peters et al. | |
| 8,364,520 B1 | 1/2013 | Eichorn et al. | |
| 8,392,019 B2 | 3/2013 | Segal et al. | |
| 8,489,450 B2 | 7/2013 | Agarwal | |
| 8,490,829 B2 | 7/2013 | Deo et al. | |
| 8,601,938 B2 | 12/2013 | Huber et al. | |
| 8,616,250 B2 | 12/2013 | Herbert | |
| 8,656,690 B2 | 2/2014 | Bierschenk et al. | |
| 8,744,618 B2 | 6/2014 | Peters et al. | |
| 8,755,932 B2 | 6/2014 | Peters et al. | |
| 8,787,006 B2 | 7/2014 | Golko et al. | |
| 8,788,341 B1 | 7/2014 | Patel et al. | |
| 9,155,330 B1 | 10/2015 | Shtivelman | |
| 9,527,716 B2 | 12/2016 | Kline et al. | |
| 9,633,504 B2 | 4/2017 | Kline et al. | |
| 9,701,530 B2 | 7/2017 | Kline et al. | |
| 10,121,132 B2 | 11/2018 | Salvucci et al. | |
| 10,319,001 B2 | 6/2019 | Kline et al. | |
| 10,417,624 B2* | 9/2019 | Salvucci ............. | B67D 1/0888 |
| 2002/0173875 A1 | 11/2002 | Wallace et al. | |
| 2003/0055727 A1* | 3/2003 | Walker ............... | G06Q 30/0601 705/16 |
| 2003/0208409 A1 | 11/2003 | Mault | |
| 2004/0049427 A1 | 3/2004 | Tami et al. | |
| 2004/0065700 A1 | 4/2004 | Milian | |
| 2004/0118733 A1 | 6/2004 | Pauli | |
| 2004/0137078 A1 | 7/2004 | Najafi et al. | |
| 2004/0193495 A1 | 9/2004 | Kim | |
| 2004/0241759 A1 | 12/2004 | Tozer et al. | |
| 2004/0247911 A1 | 12/2004 | Saito | |
| 2004/0249711 A1 | 12/2004 | Walker et al. | |
| 2005/0048461 A1 | 3/2005 | Lahteenmaki | |
| 2005/0193896 A1 | 9/2005 | McGill | |
| 2005/0210834 A1 | 9/2005 | Kamineni | |
| 2005/0226970 A1 | 10/2005 | Gordon | |
| 2005/0273387 A1 | 12/2005 | Previdi | |
| 2006/0027597 A1 | 2/2006 | Chow et al. | |
| 2006/0081653 A1* | 4/2006 | Boland ................ | G16H 20/60 222/243 |
| 2006/0247824 A1 | 11/2006 | Walker et al. | |
| 2006/0278093 A1 | 12/2006 | Biderman et al. | |
| 2007/0027576 A1 | 2/2007 | Juds et al. | |
| 2007/0050083 A1 | 3/2007 | Signorelli et al. | |
| 2007/0078561 A1 | 4/2007 | Sansone | |
| 2007/0100649 A1 | 5/2007 | Walker et al. | |
| 2007/0110880 A1 | 5/2007 | Thomas et al. | |
| 2007/0156523 A1 | 7/2007 | Liu et al. | |
| 2007/0255450 A1 | 11/2007 | Mazur et al. | |
| 2008/0077455 A1 | 3/2008 | Gilboa | |
| 2008/0201241 A1 | 8/2008 | Pecoraro | |
| 2009/0065520 A1 | 3/2009 | Peters et al. | |
| 2009/0065570 A1 | 3/2009 | Peters et al. | |
| 2009/0069931 A1 | 3/2009 | Peters et al. | |
| 2009/0070234 A1 | 3/2009 | Peters et al. | |
| 2009/0105875 A1 | 4/2009 | Wiles | |
| 2009/0138817 A1 | 5/2009 | Oron et al. | |
| 2009/0176526 A1 | 7/2009 | Altman | |
| 2009/0177318 A1 | 7/2009 | Sizemore | |
| 2009/0222300 A1 | 9/2009 | Guith et al. | |
| 2009/0222301 A1 | 9/2009 | Phillips et al. | |
| 2009/0222339 A1 | 9/2009 | Antao et al. | |
| 2009/0222340 A1 | 9/2009 | Insolia et al. | |
| 2010/0131096 A1 | 5/2010 | Koyano | |
| 2010/0169313 A1 | 7/2010 | Kenedy et al. | |
| 2010/0200110 A1 | 8/2010 | Segiet et al. | |
| 2010/0280895 A1 | 11/2010 | Mottola | |
| 2010/0286819 A1 | 11/2010 | Walker et al. | |
| 2011/0038474 A1 | 2/2011 | Omiya | |
| 2011/0049180 A1 | 3/2011 | Carpenter et al. | |
| 2011/0121032 A1 | 5/2011 | Deo et al. | |
| 2011/0168290 A1* | 7/2011 | Breitenbach ........... | G06Q 20/20 141/94 |
| 2011/0282723 A1 | 11/2011 | Phillips et al. | |
| 2012/0053426 A1 | 3/2012 | Webster et al. | |
| 2012/0055718 A1 | 3/2012 | Chen | |
| 2012/0150613 A1 | 6/2012 | Insolia et al. | |
| 2012/0190386 A1 | 7/2012 | Anderson | |
| 2012/0325844 A1 | 12/2012 | Quartarone et al. | |
| 2012/0325845 A1 | 12/2012 | Newman et al. | |
| 2013/0002724 A1 | 1/2013 | Heinrich et al. | |
| 2013/0025529 A1 | 1/2013 | Key | |
| 2013/0027060 A1 | 1/2013 | Tralshawala et al. | |
| 2013/0035787 A1 | 2/2013 | Canter | |
| 2013/0037565 A1 | 2/2013 | Newman | |
| 2013/0044042 A1 | 2/2013 | Olsson et al. | |
| 2013/0079117 A1 | 3/2013 | Maskatia et al. | |
| 2013/0079926 A1 | 3/2013 | Peters et al. | |
| 2013/0096715 A1 | 4/2013 | Chung et al. | |
| 2013/0103187 A1 | 4/2013 | Canter et al. | |
| 2013/0220480 A1 | 8/2013 | Angus et al. | |
| 2013/0226338 A1 | 8/2013 | Pickett et al. | |
| 2013/0240559 A1 | 9/2013 | Rudick | |
| 2013/0245819 A1 | 9/2013 | Davenport et al. | |
| 2013/0248560 A1 | 9/2013 | Carpenter et al. | |
| 2013/0282169 A1 | 10/2013 | Moore et al. | |
| 2013/0282451 A1 | 10/2013 | Moore et al. | |
| 2013/0304265 A1 | 11/2013 | Deo et al. | |
| 2014/0027502 A1 | 1/2014 | Schwartz | |
| 2014/0040055 A1 | 2/2014 | Quartarone et al. | |
| 2014/0130891 A1 | 5/2014 | Abdelmoteleb et al. | |
| 2014/0135967 A1 | 5/2014 | Bippert | |
| 2014/0212566 A1 | 7/2014 | Herbert et al. | |
| 2014/0246452 A1 | 9/2014 | Roekens et al. | |
| 2014/0255883 A1 | 9/2014 | MacQuet | |
| 2014/0257749 A1 | 9/2014 | Nathanson | |
| 2014/0286123 A1 | 9/2014 | Arnett et al. | |
| 2014/0303774 A1 | 10/2014 | Schwarzli et al. | |
| 2014/0307756 A1 | 10/2014 | Chen et al. | |
| 2014/0356492 A1 | 12/2014 | Merea | |
| 2015/0100152 A1 | 4/2015 | Barragan et al. | |
| 2015/0105901 A1 | 4/2015 | Joshi et al. | |
| 2015/0132722 A1 | 5/2015 | Menczel et al. | |
| 2015/0144650 A1 | 5/2015 | Kline et al. | |
| 2015/0144652 A1 | 5/2015 | Kline et al. | |
| 2015/0144653 A1 | 5/2015 | Kline et al. | |
| 2015/0239724 A1 | 8/2015 | Cronise | |
| 2015/0290795 A1 | 10/2015 | Oleynik | |
| 2015/0305564 A1 | 10/2015 | Jimenez et al. | |
| 2016/0005329 A1 | 1/2016 | Sako et al. | |
| 2016/0012749 A1 | 1/2016 | Connor | |

(56) References Cited

U.S. PATENT DOCUMENTS

| | | |
|---|---|---|
| 2016/0063734 A1 | 3/2016 | Divakaran et al. |
| 2016/0081653 A1 | 3/2016 | Masuda et al. |
| 2016/0148536 A1 | 5/2016 | Ashby |
| 2016/0166096 A1 | 6/2016 | Dimaria-Ghalili et al. |
| 2016/0220973 A1 | 8/2016 | Kolar et al. |
| 2016/0242455 A1 | 8/2016 | Evans et al. |
| 2016/0260351 A1 | 9/2016 | Okuma et al. |
| 2016/0379520 A1 | 12/2016 | Borel et al. |

FOREIGN PATENT DOCUMENTS

| | | |
|---|---|---|
| TW | 200505381 A | 2/2005 |
| TW | I238704 B | 9/2005 |
| WO | 98/45766 A1 | 10/1998 |
| WO | 2013/077895 A1 | 5/2013 |

OTHER PUBLICATIONS

U.S. Appl. No. 15/609,245, filed May 31, 2017.
U.S. Appl. No. 14/335,855, filed Jul. 18, 2014.
U.S. Appl. No. 14/269,741, filed May 5, 2014.
U.S. Appl. No. 14/807,881, filed Nov. 22, 2013.
"Food Labeling: Calorie Labeling of Articles of Food in Vending Machines", Federal Register, Dec. 1, 2014, pp. 1-35.
"Food labeling: Nutrition Labeling of Standard Menu Items in Restaurants and Similar Retail Food Establishments", Federal Register, Dec. 1, 2014, pp. 1-105 [Cited in related U.S. Appl. No. 15/691,428].
"Food labeling: Nutrition Labeling of Standard Menu Items in Restaurants and Similar Retail Food Establishments", Federal Register, Dec. 1, 2014, pp. 1-105.
"Food Labeling: Nutrition Labeling of Standard Menu Items in Restaurants and Similar Retail Food Establishments", Federal Register, Dec. 1, 2014, pp. 1-105, vol. 79, No. 230.
Caprio, "Calories from Soft Drinks—Do They Matter?", The New England Journal of Medicine, Sep. 27, 2012, pp. 1-2.
Caprio, "Calories from Soft Drinks—Do They Matter", The New England Journal of Medicine, Sep. 27, 2012, pp. 1-2 [Cited in related U.S. Appl. No. 15/691,428].
Dietz, "Wireless Liquid Level Sensing for Restaurant Applications", MERL—A Mitsubishi Electric Research Laboratory, Apr. 2002, pp. 1-8.
Dietz, "Wireless Liquid Level Sensing for Restaurant Applications", MERL—A Mitsubishi Electric Research Laboratory, Apr. 2002, pp. 1-8 [Cited in related U.S. Appl. No. 15/691,428].
Food Labeling: Calorie Labeling of Articles of Food in Vending Machines, Federal Register, Dec. 1, 2014, pp. 1-35, vol. 79, No. 230.
International Patent Application No. PCT/US2015/040939: International Search Report and Written Opinion dated Dec. 31, 2015, 13 pages.
Northrup, "The Juicero Was a Terrible Idea That Became a Money-Losing Business", Consumerist, Sep. 8, 2017, 8 Pages [Cited in related U.S. Appl. No. 15/691,428].
U.S. Appl. No. 14/609,241: Non Final Rejection dated Apr. 21, 2017, 12 pages.
U.S. Appl. No. 14/609,247: Final Rejection dated Jun. 30, 2017, 19 pages.
U.S. Appl. No. 14/609,247: Non Final Rejection dated Mar. 10, 2017, 14 pages.

* cited by examiner

FIG. 7
T=2

Nutrition Facts
Serving Size
8 fl. oz. (240 mL)
Servings per current dispense 1.5

Amount Per Current Dispense
Calories 75

| | % Daily Value* |
|---|---|
| Total Fat 0g | 0% |
| Sodium 90mg | 4.5% |
| Potassium 490mg | 15% |
| Total Carbohydrate 20g | 6% |
| Sugars 15g | |
| Protein 0g | |

Calcium 3% • Phosphorus <3%
Magnesium 3%

Not a significant source of calories from fat, Saturated fat, trans fat, cholesterol, dietary fiber, vitamin A, vitamin C, and iron.

*Percent Daily Values are based on a 2,000 calorie diet.

FIG. 8
T=3

Nutrition Facts
Serving Size
8 fl. oz. (240 mL)
Servings per current dispense 2

Amount Per Current Dispense
Calories 100

| | % Daily Value* |
|---|---|
| Total Fat 0g | 0% |
| Sodium 120mg | 6% |
| Potassium 720mg | 20% |
| Total Carbohydrate 26g | 8% |
| Sugars 20g | |
| Protein 0g | |

Calcium 4% • Phosphorus <4%
Magnesium 4%

Not a significant source of calories from fat, Saturated fat, trans fat, cholesterol, dietary fiber, vitamin A, vitamin C, and iron.

*Percent Daily Values are based on a 2,000 calorie diet.

FIG. 9 — CURRENT FORMAT

FIG. 10 — PROPOSED FORMAT

The product you have selected contains 25 grams of added sugar and 89 calories per 330 ml serving. Recent reports suggest that adults should consume no more than 25 grams of sugar per day.

- Reformulate product to contain less added sugar
- Reformulate product to contain more added sugar
- Dispense product as originally formulated

FIG. 12

SYSTEM, METHOD, AND APPARATUS FOR PURCHASING, DISPENSING, OR SAMPLING OF PRODUCTS

CROSS-REFERENCE TO RELATED APPLICATIONS

This application is a division of U.S. patent application Ser. No. 16/749,741 filed Jan. 22, 2020, which is a continuation of U.S. patent application Ser. No. 15/609,245, filed May 31, 2017, now U.S. Pat. No. 10,611,622, granted on Apr. 7, 2020, which is a continuation of U.S. patent application Ser. No. 14/335,855, filed Jul. 18, 2014, now U.S. Pat. No. 9,701,530, granted on Jul. 11, 2017, which is a continuation-in-part of U.S. patent application Ser. No. 14/269,741, filed May 5, 2014, now U.S. Pat. No. 9,527,716, granted on Dec. 27, 2016, which is a continuation-in-part of U.S. patent application Ser. No. 14/087,881, filed Nov. 22, 2013, now U.S. Pat. No. 9,633,504, granted Apr. 25, 2017, all of which are entitled SYSTEM, METHOD, AND APPARATUS FOR PURCHASING, DISPENSING, OR SAMPLING OF PRODUCTS, whose contents are expressly incorporated by their entirety by reference herein.

COPYRIGHT NOTICE

This application contains copyrightable subject matter owned by the named applicants. The applicants reserved all rights in such copyrightable subject matter to the full extent provided under the copyright laws of the United States of America and any comparable international laws.

BACKGROUND

Consumers are becoming increasingly savvy in their product purchasing behaviors. They use their smart phones to perform price comparisons. They select, at point of purchase, from several available options. For example, users may select from one of several different car washes available at a gasoline kiosk. And, when shopping for food or other products, consumers frequently ask the seller to try a free sample of the food or other product, such as perfume, being sold or displayed. There exists an opportunity and need to provide consumers with a greater range of options when making their purchasing decisions.

The Coca-Cola Company currently markets and sells non-alcoholic beverages through various outlets and dispensing and vending equipment. One such type of dispensing equipment is known as the Freestyle® dispensing machine, which permits customers to select from over one hundred different product and flavor combinations. Such dispensing machines are often placed in fast food restaurants, convenience stores, malls, and other venues that tend to attract consumers. An example of the apparatus, processes, methods, and systems potentially associated with the Freestyle® dispensing machine is disclosed in, inter alia, U.S. Pat. No. 8,744,618, to Peters, et al., and U.S. Pat. No. 8,340,815, to Peters, et al., incorporated in their entirety by reference herein. While such patents as incorporated by reference herein may pertain to a particular commercial embodiment, such as the Coca-Cola Freestyle® vending machine, it will be readily appreciated that the teachings thereof, as incorporated by reference herein, may, with respect to the disclosure herein, be applied to other devices, for example, Pepsi Spire vending machines, traditional bottle/can vending machines, legacy fountain machines, and vending machines for dispensing food, candy, personal care and personal hygiene items, etc. The disclosure herein is in some aspects described in relation to the Freestyle vending machine for convenience only, it being understood that the present disclosure may be applied to any product dispenser.

Frequently, a consumer attempting to use a Freestyle® vending machine may be uncertain as to which of the over one hundred offerings to choose. This can lead to not only an unhappy consumer who may select an offering that he or she does not enjoy, but also may lead to other unhappy consumers waiting in line for such uncertain consumers to make a flavor selection.

The Coca-Cola Company currently provides a Freestyle® smart phone application that may be directed at addressing this problem by permitting consumers to pre-select on the application their favorite flavor offerings. The application permits consumers to consult a selection of over one hundred choices, mix their own virtual flavors, and start adding favorite brands and mixes to the application user's favorites list. The application provides for push notifications, locates Freestyle® machines in proximity to the application user, and offers a "Mobile App Sweepstakes."

The Coca-Cola Company, and other entities that sell products, are continuously looking for new ways to market their products and demonstrate their attributes relative to competitive products and to encourage consumers to try both existing and new product offerings. Moreover, given the well-publicized global obesity epidemic, companies that sell calorie-containing products are working hard to offer lower calorie options and to demonstrate to the consuming public, as well as governmental agencies, their efforts in this regard.

Often, sellers of consumer products, in order to increase consumer awareness of their brands, offer—sometimes for a limited time—non-standard product variants or line extensions of such brands; one example, in the context of beverages, is Mountain Dew® "Kickstart," currently being offered by PepsiCo, Inc., in Black Cherry and Limeade flavors. But often, consumers will be reluctant to commit to purchasing a six or 12-pack of such a line extension, or even to purchase a single serving thereof. For this reason, products—particularly new products or variants of existing products—are often marketed with promotions, including free product sampling at venues attracting numerous consumers, such as sporting events, concerts, etc. Other products, such as health, beauty, and personal care products marketed, for example, by Procter & Gamble, are sometimes sampled in drug stores, supermarkets, etc., or by sending small free samples to potential consumers in the mail.

But such promotions often require hiring numerous promotions staff, and/or employees to hand out free product samples, for example, and do not typically provide an option for consumers to purchase the sampled products immediately after sampling, when there exists the greatest opportunity to make a product sale, or to obtain and/or transmit and store post-sampling market research data.

In the context of consumer products, the period of time after which a consumer first notices or is presented with an offered product and makes a purchasing decision is sometimes referred to as "the first moment of truth," also referred to as "FMOT," a term generally recognized as having been coined by Procter and Gamble circa 2005. FMOT is generally recognized as the few seconds after a shopper first encounters a product on a store shelf. It is in these precious few seconds, P&G contends, that marketers have the best chance of converting a browser into a buyer by appealing to their senses, values and emotions.

The first moment of truth may vary, of course, by individual, by type of store, and/or type of product. For example, some consumers take longer than others to make a purchasing decision. Some products, such as high-priced items like automobiles, are only purchased after an extended period of time, perhaps an hour or more. As used herein, the term "first moment of truth" is intended to mean a generally recognized period of time, which may comprise a range of time, during which marketers of particular products understand that they have the best opportunity to convert a potential purchaser into a purchaser of such products by appealing to their senses, values, and/or emotions. In the context of consumer products, such as health and personal care, food, beverage, and similar items, particularly those being offered at grocery stores, supermarkets, pharmacies, convenience stores, "big-box" stores, etc., the first moment of truth is typically recognized as being about three-to-seven seconds.

Recent marketing theory suggests, however, that there may actually be four "moments of truth" in the marketing context, as illustrated by the following:

Zero Moment of Truth or ZMOT: Potential purchaser recognizes the need for a product or service and may seek out additional information for it, for example by going online. This term, coined by Google, may include face-to-face meetings as well as online information acquisition. In a 2011 study, Google reported that different categories of shoppers are influenced by the Zero Moment of Truth or "ZMOT." For example, 99% of those making travel purchases were found to be influenced by ZMOT, while only 61% of consumers of packaged grocery products and only 63% of consumers of packaged goods in health, beauty, and personal care were so influenced. Such data, in the context of consumer packaged goods, indicates a need to either provide additional opportunities or incentives to influence consumers at the ZMOT, and/or to influence consumers of such products to more quickly get from the ZMOT to the FMOT.

First Moment of Truth or FMOT: The potential purchaser makes a purchasing decision when presented with the product or service, whether online, on shelf, or otherwise. Traditionally, this moment occurred at the store shelf, and may now occur on a "virtual shelf," i.e., online.

Second Moment of Truth or SMOT: The purchaser has purchased and used the product or service; ideally the experience supports any pre-purchase promises or promotional inducements. This is often the purchaser's first use of the product.

Third Moment of Truth or TMOT: The purchaser becomes a "follower" of the purchased product or service, sharing positive messaging about it with others via word of mouth, social media, etc. The purchaser may also rate the product or service and/or provide reviews therefor. This is often the point at which the brand's message reaches the purchaser in a memorable or reinforcing way, and was traditionally accomplished with television advertising.

One attempt to provide consumers information with respect to one or more of these moments of truth can be found, for example, in U.S. Patent Application No. 2013/0035787 to Canter. This published application provides a two-dimensional bar code at the vending machine for a consumer to link to an informational page on a website. This disclosure fails, however, to teach control of the vending machine from a smartphone or other communication device, and fails to provide any physical enticement through product sampling to a prospective purchaser of the products being supplied by the vending machine.

There exists a need to provide consumers with product sampling opportunities and product purchasing opportunities that are proximate in time and location to one another and ideally commensurate with the first moment of truth for a particular product. There exists a need to compress the four moments of truth into a shorter time span than occurs with traditional marketing methods of radio, television, and print advertising, and online shopping, and to take full advantage of the market research opportunities of product sampling by positioning the four moments of truth about a common purchasing experience and/or purchasing location. There exists a need to more readily incentivize consumers to sample product offerings and share their experiences, for example, with providers of such products and on social media, promptly following product sampling experiences.

Non-alcoholic beverage companies are struggling mightily to increase sales of, or at least slow the rate at which the consuming public is turning its back on, carbonated soft drinks and other beverages perceived as containing too much sugar, too much caffeine, too many calories, too little nutrition, or too few healthful ingredients such as juice or fiber. According to Beverage Digest, soft drink consumption fell 3% in the U.S. in 2013, the ninth year in a row of decline. One of the possible reasons for such decline in soft drink popularity is the perception that such products, particularly if sugar-sweetened, have contributed to the global obesity epidemic. And companies that sell sugar-sweetened products, such as The Coca-Cola Company, are taking notice.

One effort that non-alcoholic beverage companies have taken, in conjunction with the American Beverage Association, is a campaign to more prominently display calorie and calorie per serving information at point of sale. Information concerning such campaign, known as "Clear on Calories," can be found at http://www.ameribev.org/files/332_FINAL %20ABA %20CLEAR %20ON %20CALORIES-%20 (Calorie %20Label %20Initiative %20and %20Style %20Guide).pdf.

While "Clear on Calories" makes strides on providing industry-voluntary standards for displaying important product information on labels, vending machines and the like, it does little to assist consumers faced with product selection decisions at fountain-type dispensing equipment points of sale, and does nothing to help a consumer know, in real time, how many calories or other ingredients of a product he or she is dispensing at any given time. Moreover, the companies' commitment to display calories "prominently" for fountain beverages only applies to "company-controlled" fountain equipment. And the commitment to display total calorie counts per container on selection buttons on vending machines or, when infeasible, in "close proximity" to the specific selection also only applies to company-controlled vending machines. Such commitments, moreover, totally ignore, and fail to inform the consuming public of, the risks associated with consuming too much added sugar, too many calories, or too many other potentially harmful ingredients such as caffeine.

One way companies such as The Coca-Cola Company are attempting to halt such sales declines and perceptions that their products lead to health issues is through the sale of new, lower calorie offerings, such as the recently unveiled "Coca-Cola Life," a Coke beverage sweetened with a combination of sugar and stevia leaf extract that yields less calories than 100% sugar-sweetened versions of the brand. A 330 ml (11.16 ounce) can of Coca-Cola Life reportedly has 89 calories compared to 140 calories in a 12-ounce can of regular Coke. Coca-Cola Life, first piloted in Argentina and Chile in 2013, is sweetened from natural ingredients rather than artificial sweeteners, and will launch in the UK in the autumn of 2014, and in the U.S. as well. Coca-Cola Life is the first new Coca-Cola to be launched in the UK since the arrival of Coca-Cola Zero in 2006, a low-calorie version targeted at men.

The Coca-Cola Company says the new Coca-Cola Life drink would help meet its pledges made under the UK government's voluntary anti-obesity drive—the so-called "responsibility deal"—and would offer consumers a greater choice. In the UK, The Cola-Cola Company is a signatory to the government's controversial responsibility deal, which aims to improve public health, and has committed the company to reduce the average calories per liter in its range of sparkling drinks by 5% by the end of 2014.

But health campaigners argue that the company is misleading shoppers, as the new Coca-Cola Life product is still laden with sugar—more than four teaspoons of sugar per 330 ml can. The World Health Organization ("WHO") recently dropped its sugar intake recommendations from 10 percent of one's daily calorie intake to 5 percent. For an adult of a normal body mass index (BMI), that works out to about 6 teaspoons—or 25 grams—of sugar per day. Thus, even just one 330 ml can of Coca-Cola Life, with its lower sugar content, would still represent about ⅔ of the WHO's daily sugar intake recommendations. One 12-ounce can of regular Coca-Cola, however, contains 39 grams of added sugar, 156% of the WHO's recommended daily maximum.

The problem with sugar-sweetened beverages is particularly acute when such beverages are dispensed from fountain equipment or other dispensers such as the Coca-Cola Freestyle® dispensing machine. One perhaps extreme example of this problem is with "supersized" portions, such as the "Coca-Cola 7-Eleven 64 Ounce Double Gulp," which contains 186 grams of sugar (more than 7 times the WHO's recommended daily amount) and 744 calories, all from sugar:

Coca-Cola
7-Eleven 64 oz. Double Gulp
(55 oz. soda+9 oz. ice)
Sugars, total: 186 g
Calories, total: 744
Calories from sugar: 744

Perhaps in recognition of problems associated with runaway sugar intake, the FDA has proposed new Nutrition Facts labels that more prominently display caloric content, and not just the amount of sugar, but also the amount of added sugar in a product serving. An exemplary comparison of the current FDA Nutrition Facts label and that being proposed by the FDA is attached as FIGS. 9 and 10, respectively. The current label, represented in FIG. 9, requires declaration of "Sugars." The proposed rule, represented in FIG. 10, would require declaration of "Added sugars" as well, indented under "Sugars," to help consumers understand how much sugar is naturally occurring and how much has been added to the product. According to the FDA, this proposal takes into account new data and information, including recommendations from federal agencies and information from other expert groups, citizen petitions, and public comments. For example, the Dietary Guidelines for Americans recommend reducing caloric intake from added sugars and solid fats because eating these can cause people to eat less of nutrient-rich foods and can also increase how many calories they take in overall. Added sugars provide no additional nutrient value, and are often referred to as "empty calories." Expert groups such as the American Heart Association, the American Academy of Pediatrics, the Institute of Medicine and the World Health Organization also recommend decreasing intake of added sugars. On average, according to the FDA, Americans get 16 percent of their total calories from added sugars. The major sources of added sugars in the diet (with the highest sources listed first) are soda, energy and sports drinks, grain-based desserts, sugar-sweetened fruit drinks, dairy-based desserts, and candy.

Even if government agencies or state and local governments succeed in banning large portions of sugar-sweetened products, or require signage or labels displaying the sugar, added sugar, and/or calorie content thereof, the machines that dispense such products do not currently enable one to know precisely how many calories or grams of sugar or other ingredient or product attribute of interest are being dispensed at any given time, such that the consumer may halt a dispensing operation, for example, once a predetermined quantity of calories or grams of sugar has been dispensed.

Another way that consumer products companies, such as beverage companies, are attempting to woo consumers to their products is by enabling them to customize their product selections. For example, PepsiCo recently announced a beverage dispenser known as "Pepsi Spire," which purportedly allows customers to make over 1,000 different product selections based on mixing different flavors, different brands, etc. The Coca-Cola Company, through its Freestyle dispensing machine, recently announced a limited time offering in which consumers can use the Freestyle mobile app to customize up to three drink mixes and pour them at participating outlets using the Freestyle app. Such customers are sent a push notification, via the mobile Freestyle app, and are encouraged to log into the app using Facebook Connect, and then scan a Quick Response Code (QR code) on one of the participating Coca-Cola Freestyle dispensers to pour the custom mixes.

Currently, however, both the Pepsi Spire and the Coca-Cola Freestyle app only permit limited customization. For example, using the app a user as a first step may select from a palette of brands, for example, Coca-Cola, Coke Zero, Diet Coke, Dasani water, Barq's root beer, Fanta, Fanta Zero, Sprite, Sprite Zero, and so on. As a second step, the user may select from one or more flavorings for such brands, for example, Coca-Cola lime-flavored cola, and may then drag the selected brand to a "mix" button to create a unique mix. Currently, the user may make up to three such selections to customize the mix. Then, in a third step, the user may select the percentage of each of the selected mixes to pour, name the resulting mix, save it, and share it, for example, on Facebook.

As an example, a user may select Coke Vanilla, Coke Zero Orange, and Coke Zero Raspberry colas as the mix selected by dragging and dropping each brand to the mix icons currently available on the Freestyle mobile app. Then by using the "Go Mix!" button the user may vary the proportion of each of the three chosen brands within limited ranges. Currently, the user is limited, when three brands are selected, to a maximum of 50% of the total mix for any one brand, and a minimum of 25% for any one brand, with any combination between those limits adding up to 100% total. As one example, a custom mix could comprise 25% Coca-Cola Orange-flavored cola, 43% Coca-Cola Zero Vanilla-flavored cola, and 32% Coca-Cola Zero Raspberry-flavored cola. When two brands are selected to mix, one brand may be selected to a maximum of 75% and a minimum of 25%, and may be varied up to an equal 50%-50% blend. But the user making such flavor mixes is not informed if the mixes are based on a volume percent or a weight percent. Most significant, the user is not informed of the calories per serving, the amount of juice, if any, contained in the fruit-flavored brands, or the amount of sugar, caffeine, or other ingredients contained in either the individually selected brands or the total mix. In the case of Coca-Cola Freestyle, for example, only the Minute Maid Lemonade and Light versions disclose that such brands contain 0% juice.

Currently, however, FDA labeling laws do not require manufacturers of beverage products to disclose the contents of ingredients contained in their products being dispensed from dispensing equipment such as the Freestyle dispensing machine. But certain decisions, such as the one by the Supreme Court in POM Wonderful v. The Coca-Cola Company, 134 S. Ct. 2228 (2014), suggest that the FDA does not have exclusive jurisdiction over product labeling requirements. The Lanham Act, which protects competitors from misleading product advertising, may give rise to a cause of action against competitors' labeling and advertising even if in compliance with FDA regulations. And there is evidence that various governing bodies are contemplating new laws and regulations targeting manufacturers in an effort to promote greater awareness on behalf of the consuming public and greater responsibility among those advertising their food and beverage brands.

One highly publicized example of the war on soft drinks involves former New York City Mayor Michael Bloomberg's controversial ban on sugar-containing soft drinks in larger than 16-ounce cups at city food service establishments. That ban, adopted in September 2013, was overturned by a New York Supreme Court judge as "arbitrary and capricious." But the city has appealed that ruling, and reportedly dozens of community groups and minority organizations have signed amicus briefs in support of the ban. Even though the appellate court in New York recently denied the city's appeal, and thus beverage companies have won the most recent battle, it is doubtful the war is over.

Recently, as another example of how state governments are responding to one perceived problem of sugar-sweetened calorie-containing beverages, California Senate Bill 1000 passed the state senate, but was not thereafter enacted. Yet the bill is illustrative of the concerns many have over the health implications of food and beverage products and the labeling thereof.

The California Senate bill cites data suggesting a nearly three-fold increase in obesity rates in California over the period from 1984 (8.9%) to 2012 (25%), and that low-income communities and communities of color are disproportionately impacted by the obesity crisis. The bill further cites "overwhelming evidence" of the link between obesity and the consumption of sugar-sweetened beverages, such as soft drinks, energy drinks, sweet teas, and sports drinks. It states that a 20-ounce bottle of sugar-sweetened soda contains 17 teaspoons of sugar, while the American Heart Association recommends that Americans consume no more than 5-9 teaspoons of sugar per day, (which is comparable to the WHO's recommended 6 teaspoons per day). The California Senate bill cites troubling data concerning the ethnic disparity in consumption of sugar-sweetened beverages among minority adolescents in California: 74% of African American adolescents drink at least one sugar-sweetened beverage each day, compared to 73% of Latinos, 63% of Asians, and 56% of whites. The bill further cites the connection between consumption of sugar-sweetened beverages and increased risk of type II diabetes, noting that diabetes complications include: heart disease, nerve damage, gum infections, kidney disease, hearing impairment, blindness, amputation of toes, feet, or legs, and increased risk of Alzheimer's disease.

Had California Senate Bill 1000 been passed, the resulting legislation would have become known as the "Sugar-Sweetened Beverage Safety Warning Act." This act would have required a warning label to be placed on many beverage product labels for sealed beverage containers and multipacks containing sugar-sweetened beverages; the warning would have read:

STATE OF CALIFORNIA SAFETY WARNING

Drinking Beverages with Added Sugar(s)
Contributes to Obesity, Diabetes, and Tooth Decay But California Senate Bill 1000's warning requirement would not have been limited to sugar-sweetened beverages packaged in sealed beverage containers and multipacks. As the bill states:

The bill also would require every person who owns, leases, or otherwise legally controls the premises where a vending machine or beverage dispensing machine is located, or where a sugar-sweetened beverage is sold in an unsealed container to place a specified safety warning in certain locations, including, on the exterior of any vending machine that includes a sugar-sweetened beverage for sale.

Currently, the FDA requires that food products sold in packages contain a nutrition label, displayed as "Nutrition Facts," that must conform to certain visual requirements and must include certain information, such as serving size, servings per container, calories per serving, fat calories per serving, etc. The same food or beverage sold in and dispensed from a dispenser such as the Freestyle dispensing machine or the PepsiCo Spire dispenser, however, currently need not display such information. But given the heightened sense of urgency surrounding societal problems such as obesity, diabetes, heart disease, etc., and the current societal war on food and beverage companies, such companies may now wish, employing the disclosures set forth herein, to demonstrate their commitment to providing full and fair disclosure of the ingredients that all of their products contain, no matter how they are offered, sold, or dispensed.

On Mar. 23, 2010, the President signed the health care reform legislation into law. Section 4205 of the Patient Protection and Affordable Care Act of 2010 requires restaurants and similar retail food establishments with 20 or more locations to list calorie content information for standard menu items on restaurant menus and menu boards, including drive-through menu boards. Other nutrient information—total calories, fat, saturated fat, cholesterol, sodium, total carbohydrates, sugars, fiber and total protein—would have to be made available in writing upon request. The Act also requires vending machine operators who own or operate 20 or more vending machines to disclose calorie content for certain items.

In response to these and other calls from consumers—who vote with their wallets—to offer more low-calorie products, The Coca-Cola Company has recently launched a lower calorie version of its flagship Coke product, under the banner "Coca-Cola Life," discussed above.

The FDA has issued a Federal Register notice that explains how restaurants and similar retail food establishments with fewer than 20 locations and vending machine operators with fewer than 20 vending machines can voluntarily register to become subject to new federal menu labeling requirements. That notice provides, inter alia:

The FDA is considering a proposed rule requiring the labeling of calorie content for products dispensed from vending machines. Section 403(q)(5)(H)(viii) of the FD&C Act sets forth labeling requirements for certain vending machine food but does not define the term "vending machine." The FDA has proposed that in Sec. 101.8(a) the term "vending machine" means a self-service device that, upon insertion of a coin, paper currency, token, card, or key, or by optional manual operation, dispenses servings of food in bulk, in packages, or prepared by the machine, without the necessity of replenishing the device between each vending operation. This definition is almost identical to the definition of "vending machine" in the FDA Food Code 2009.\1\ Examples of food dispensed from vending machines may include pre-packaged foods (e.g., candy, snacks, gum, bottled or canned soft drinks), unpackaged bulk foods (e.g., handful of gum, candy, or mixed nuts), prepared foods (e.g., sandwiches or fresh fruit), multi-serving foods (e.g., gallon of milk), or foods prepared in the machine and dispensed in bulk (e.g., coffee, soup, or popcorn).

As used herein, the term "vending machine" is intended to have substantially the same meaning as that proposed above by the FDA, and to include, by way of example, but not limitation, beverage dispensing machines, fountain dispensers, vending equipment, cold drink coolers, and Coca-Cola Freestyle® and Pepsi Spire-type dispensers, as well as machines configured to dispense personal care products such as contraceptives, medications, toiletries, snacks, deserts, and other food products, but to also include such machines configured to dispense products using alternative "cashless" payment vehicles or apps such as "Google Wallet."

The FDA's proposed Requirements for Vending Machines are as follows:
Proposed Requirements for Vending Machines
Vending Machines Covered Vending machine operators that own or operate 20 or more vending machines would disclose calorie information for food sold from a vending machine unless certain nutrition information is visible to consumers on individual packages of food while inside the machine.

Operators of vending machines not covered (for example, operators with fewer than 20 vending machines) may opt-in to the Federal requirements by registering with FDA every other year.

Calorie Display

Calorie information would be required to be displayed clearly and prominently.

The term "Calories" or "Cal" would be required to be posted next to the number of calories for the food.

Calorie information would be posted on a sign in close proximity to the article of food, i.e., adjacent to the vending machine, but not necessarily attached to the vending machine, so long as the sign is visible at the same time as the food, its description name, price, or selection button number. In other words, the sign declaring calorie information would be in the same field of vision as the food items in the machine.

Such proposed FDA requirements seek to close the current loophole that requires calorie information on labels for packaged goods sold at retail, i.e., on store shelves, but not from vending machines. But such proposed requirements are potentially unworkable in situations where the consumer is given the ability to mix his or her own product, such as a beverage, at the point of purchase, in a potentially infinite number of combinations, or to pour any quantity of beverage, limited only by the size of the receptacle. And by only requiring that the caloric information be posted on a sign posted in proximity, i.e., adjacent to the vending machine, or "in the same field of vision as the food items in the machine," such requirements invite legalistic interpretation and the potential for vending machine operators to comply with the letter, but not the spirit, of the requirement, for example, by posting barely readable signs with miniscule type font, by interpreting "proximity" in expansive ways, etc.

Given such multiple attacks on consumer products such as calorie-containing, caffeine-containing, low-percentage-of-juice-containing and/or fruit-flavored beverages, it is possible that non-governmental organizations such as the Center for Science and the Public Interest (CSPI), government organizations and regulators such as the FDA, private, third-party organizations such as the National Advertising Division of the Better Business Bureau, state and federal legislatures, consumer groups, and even competitors, may further pressure or require consumer product manufacturers to be even more transparent and fulsome in advertising their products and the ingredients they contain than FDA rules currently require.

For example, consumers may wish to know, in the case of fruit-flavored brands, precisely how much fruit juice, if any, is contained in such products—currently FDA labeling regulations do not require this. They may also wish to know, as another example, when dispensing a calorie-containing beverage, how many calories they are dispensing into a waiting beverage container, in real time, enabling the dispensing operation to be discontinued once a desired number of calories has been dispensed. The same is true for specific ingredients that consumers may wish to manage in real time during a dispensing operation, such as caffeine, salt, sugar, fat, carbohydrates, protein, cholesterol, etc. being dispensed from a product dispenser.

If it is possible to pre-mix and dispense a customized beverage containing, for example, 25% Coca-Cola Orange-flavored cola, 43% Coca-Cola Zero Vanilla-flavored cola, and 32% Coca-Cola Zero Raspberry-flavored cola, it should now be possible, using the teachings of the present disclosure, to request, for example, a Coca-Cola Freestyle® dispenser, a PepsiCo Spire dispenser, or any other vending machine or product dispenser, to dispense a product containing a specific amount of desired ingredients and reduce or even to eliminate any undesired ingredients from the resulting product mix being dispensed.

Moreover, now that consumer product manufacturers are giving consumers the ability to customize their product mixes, it may be advantageous to give consumers the ability to customize how much of one or more product ingredients or attributes they wish to dispense.

And now that state legislatures are contemplating requiring warning labels be placed on sugar-sweetened beverage dispensing machines, such as in California, and given the correlation between America's obesity epidemic and sugar consumption, it may be desirable to require on a national level that similar warnings be displayed at the point of sale of sugar-sweetened products being dispensed from a product dispenser.

But if such warning labels are required to be displayed, it may be desirable that they only be displayed in response to a consumer selecting a product to which a warning label is relevant. Using California Senate Bill 1000 as an example, such legislation would require that a warning be placed on the exterior of any vending machine or beverage dispensing machine that dispenses sugar-sweetened beverages. But such a requirement is arguably overbroad, as most vending machines and beverage dispensing machines also dispense products that likely would not be subject to such warnings, such as unsweetened water, 100% natural fruit juice and 100% natural vegetable juice, diet beverages, milk beverages, whole fruit, etc. Such warnings might deter hurried consumers from purchasing all foods or beverages from such vending and beverage dispensing machines, to the detriment of both the consumer—who may need rehydration/nourishment at a time and place only conveniently served by such machines—and the seller of products from the vending and food/beverage dispensing machines.

Vending and dispensing machines currently employ large display panels configured to display product brand indicia, product selection icons, marketing graphics and messaging, and other indicia, icons, graphics, and messaging. As an example, The Coca-Cola Company currently markets and sells packaged products through vending machines promoted as the Coca-Cola "Thirst Station," a vending machine manufactured by Royal Vendors, Inc., under the brand "Econo-Cool." Such machines comprise a graphical display with a user interface that allows a consumer to select one or more beverages, and displays an image of a package corresponding to the selected product, such as a can or bottle, that spins on the screen. The spinning package may be "frozen" to enable the consumer to read "Nutrition Facts" labeling contained on a virtual Nutrition Facts label that is representative of an actual label that appears on the package to be dispensed from the vending machine. Such machines also include videos, games, and promotions such as "mycokerewards" that can be displayed through user interface (touch screen) technology. Such machines may also display signage, such as "Calories Count Then Choose." As is known, such machines may also accept payment using coins, bills, credit card swipes, etc.

Other known vending equipment includes the so-called Diji-Touch® vending machine marketed by Mondelez International. Such machines offer touchscreen technology that allows users to customize content by the machine for emergency alerts and information, displays nutritional information by allowing a user to tap the screen to see snack packaging close up, view nutritional information, and check ingredients, and permits purchasing products with credit cards and smart phone payment vehicles such as Google Wallet. Such vending equipment also displays customized pricing based on the product selected.

Other vending machines may dispense personal care, personal hygiene, or other products that are subject to warning or other labeling requirements, such as pain medication, contraceptive products, cigarettes, alcoholic beverages, etc. Such products may be vended or dispensed from a machine specific to such products, or from machines that also include other products not subject to the same warning or labeling requirements. In either situation, the product warning or other labeling requirement might not be visible to the consumer at the time of product selection, and may only become visible or known after the product has been dispensed, and therefore after the consumer might ideally wish to have had such information disclosed in the product warning or other labeling requirement.

Such known vending machines do not, however, provide product warning notices or other product labeling requirement notices in response to a consumer selecting a product from the machine that is subject to such requirements, while withholding the warning notice in response to consumers selecting a product not subject to such requirements. And such vending machines do not query a consumer, in response to selection of a product that is subject to a warning or other labeling requirement, or that contains an ingredient, such as added sugar, in an amount exceeding recommended values, if an alternative product, also available from the same vending machine, is desired instead. And such vending machines do not enable real time display of product attributes, such as calories and/or added sugar, as such products are being dispensed.

Caloric content and sugar-sweetened beverages and foods are not the only perceived health/ingredient issues facing food and beverage product manufacturers. Another is caffeine. While there is no recommended daily value for caffeine consumption, there are published reports suggesting levels that can be considered too high or even dangerous for certain persons. And a recent CNN Health report indicates that caffeine affects boys more than girls. Up to 400 milligrams (mg) of caffeine a day appears to be safe for most healthy adults. That quantity is roughly the amount of caffeine in four cups of brewed coffee, 10 cans of cola or two "energy shot" drinks.

Although caffeine use may be safe for adults, it is not considered a good idea for children. According to the Mayo Clinic, for example, http://www.mayoclinic.org/healthy-living/nutrition-and-healthy-eating/in-depth/caffeine/art-20045678, adolescents should limit themselves to no more than 100 mg of caffeine a day. Even among adults, however, heavy caffeine use can cause unpleasant side effects. And caffeine may not be a good choice for people who are highly sensitive to its effects or who take certain medications. Heavy daily caffeine use—for example, more than 500 to 600 mg a day (or three energy shot beverages)—may cause side effects such as insomnia, nervousness, restlessness, irritability, an upset stomach, a fast heartbeat, and muscle tremors.

Additionally, the Mayo Clinic states, certain medications and herbal supplements may interact with caffeine. Here are some examples the Mayo Clinic provides:

"Some antibiotics. Ciprofloxacin (Cipro) and norfloxacin (Noroxin)—types of antibacterial medications—can interfere with the breakdown of caffeine. This may increase the length of time caffeine remains in the body and amplify its unwanted effects.

Theophylline. Theophylline (Theo-24, Elixophyllin, others) is a medication that opens up bronchial airways by relaxing the surrounding muscles (bronchodilator). It tends to have some caffeine-like effects. Thus, taking it with caffeinated foods and beverages may increase the concentration of theophylline in the blood. This can cause adverse effects, such as nausea, vomiting and heart palpitations.

Echinacea. This herbal supplement, which is sometimes used to prevent colds or other infections, may increase the concentration of caffeine in the blood and may increase caffeine's unpleasant effects."

Excessive caffeine can become especially dangerous when consumed in beverages that contain or are mixed with, alcohol. There have been cases of young, healthy consumers dying from consuming such beverages. There have been some reports suggesting that caffeine may be addictive.

Caffeine is, however, generally recognized as safe for regular consumption. Coca-Cola UK provides a lookup table and calculator that allows consumers to determine their daily intake of caffeine by selecting the drinks they've consumed and performing a daily addition step: http://www.coca-cola.co.uk/health/caffeine-counter.html. There are no recommended daily upper limits for caffeine consumption in the European Union, or in the UK, except for pregnant women. Pregnant women are advised to limit their daily intake of caffeine to 200 mg a day.

For healthy adults with no medical issues, it is generally agreed that 300 mg-400 mg of caffeine can be consumed daily without any adverse effects. For a discussion of this, see Heckman, M. A., Weil, J. and De Mejia, E. G. (2010), Caffeine (1, 3, 7-trimethylxanthine) in Foods: A Comprehensive Review on Consumption, Functionality, Safety, and Regulatory Matters. Journal of Food Science, 75: R77-R87. doi: 10.1111/j.1750-3841.2010.01561, available online at http://onlinelibrary.wiley.com/doi/10.1111/j.1750-3841.2010.01561.x/full. Such quantities, however, may vary depending on the individual, sex, age, tolerance, etc.

This (300-400 mg of caffeine dose) is equivalent to about:
5.2 Shots of espresso
Two 5 Hour Energy Shots
1 Starbucks Venti brewed coffee
2.5 16 fl. oz. Monster Energy Drinks
5 8 fl. oz. Red Bulls drinks
11.7 12 fl. oz. Coke Because of caffeine's potential negative side effects if consumed in large doses, and/or its interaction with certain medications and herbal supplements, it may be desirable for companies dispensing caffeine-containing products to provide warning labels on such products. But such warning labels are not typically provided at the point of sale of a product dispensed from a dispensing machine.

SUMMARY

Employing the teachings of the present disclosure, vending machine and other product dispensing equipment or mobile device display panels may be configured to display a product warning message. They may further be configured to only display the product warning at a relevant time, for example, after a user of the product dispenser has selected a product that is subject to consumer warning label or other labeling requirements. Such dispenser might be further configured to query a prospective purchaser, following receiving information indicative that a prospective purchaser has selected for dispensing a product subject to a warning label or other labeling requirement, if the purchaser wishes—notwithstanding the warning—to purchase such product or might rather purchase a similar product also contained within the product dispenser that is not subject to a warning label or other labeling requirement as a substitute. The vending machine or product dispenser might be further configured to transmit information providing positive reinforcement if, as a result of the query, a consumer who had previously requested, for example, a sugar-sweetened beverage, changes his or her mind and requests the beverage dispensing machine to dispense a beverage that is not sugar-sweetened, contains less added sugar, or that contains no or fewer calories.

According to another aspect of the disclosure, a product dispenser may be configured to dispense a product and display, in real time, nutrition facts, calories, or other product-specific information as the product is being dispensed. In this way, the consumer may choose for himself or herself how much of a given product to dispense. In another aspect, the product dispenser may be configured to permit the consumer to mix a customized blend of not only different pre-selected brands, but also different ingredients, for example, reducing the amount of caffeine, sugar, salt, etc., that a product might contain.

According to another aspect of the disclosure, there may be provided a method comprising initiating a push notification offering a free product sampling, receiving a response to the push notification indicative of an acceptance of the offering, and authorizing the dispensing of the free product sampling. The push notification may be provided via a mobile device application.

According to another aspect of the disclosure, there may be provided a product dispenser configured to dispense one or more products, the product dispenser may be further configured to dispense a sample size of the one or more products. The product dispenser may further comprise a user interface configured to permit a customer to request a free sample from the product dispenser, and a product size discriminator configured to discriminate between and dispense the one or more products according to whether a purchased product size or a sample product size has been selected for dispensing.

According to another aspect of the disclosure, there may be provided a system comprising a product dispenser configured to dispense a purchased product and a free sample of a product corresponding to the purchased product; and a mobile application configured to receive push notifications offering to dispense free samples of product from the dispenser.

BRIEF DESCRIPTION OF THE DRAWINGS

FIG. 7 illustrates another schematic representation of real time Nutrition Facts labeling at a point in time T=2 following initiation of product dispensing achievable employing systems, methods and/or apparatus of the present disclosure.

FIG. 8 illustrates another schematic representation of real time Nutrition Facts labeling at a point in time T=3, after T=2 of FIG. 7, achievable employing systems, methods and/or apparatus of the present disclosure.

Figures 9, 10:
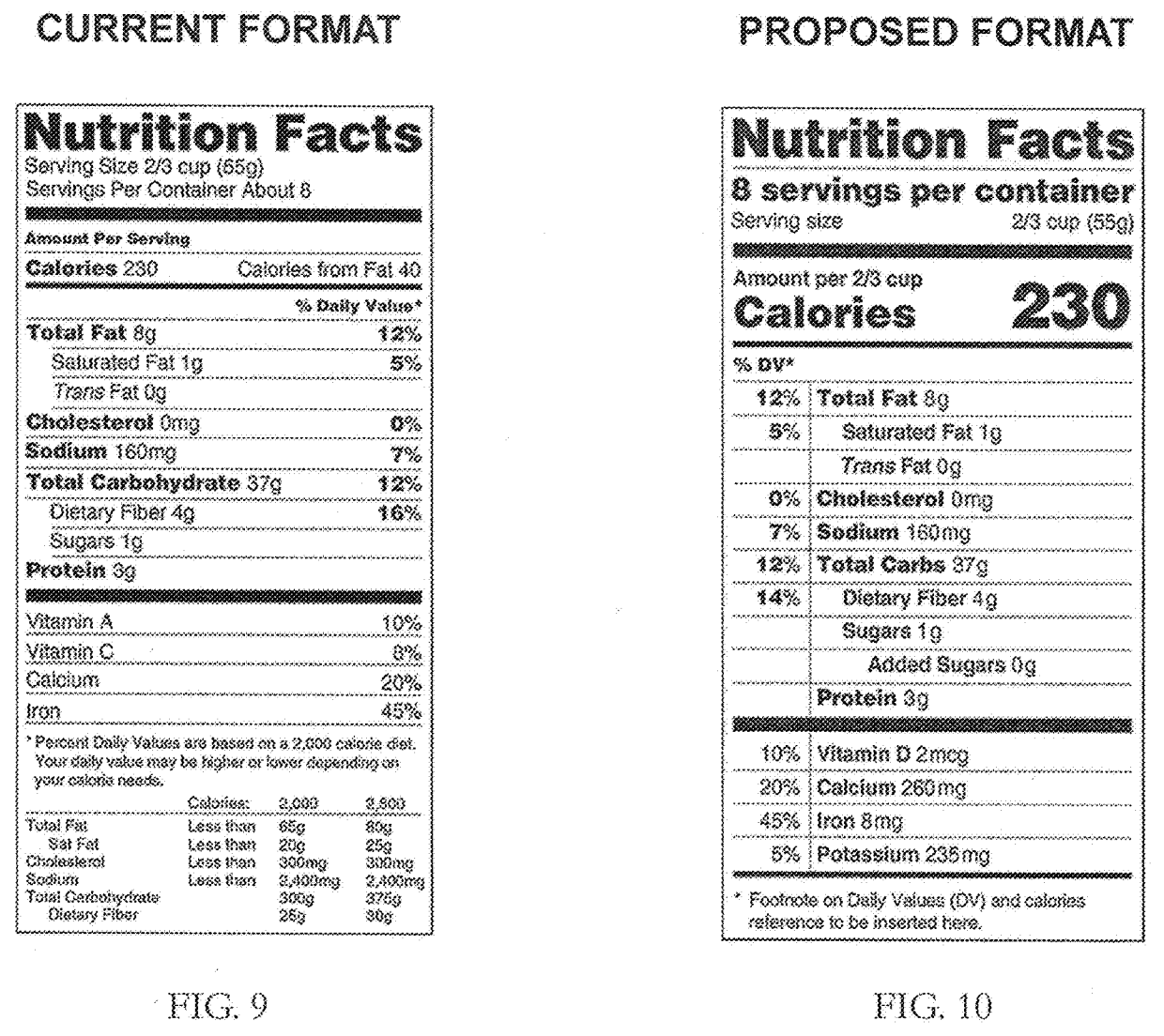

FIG. 9 illustrates the FDA's current "Nutrition Facts" content and format.

FIG. 10 illustrates the FDA's proposed new "Nutrition Facts" content and format.

FIG. 12 illustrates exemplary methods, systems, and apparatus for reformulating products according to the present disclosure.

DETAILED DESCRIPTION

Figure 1:
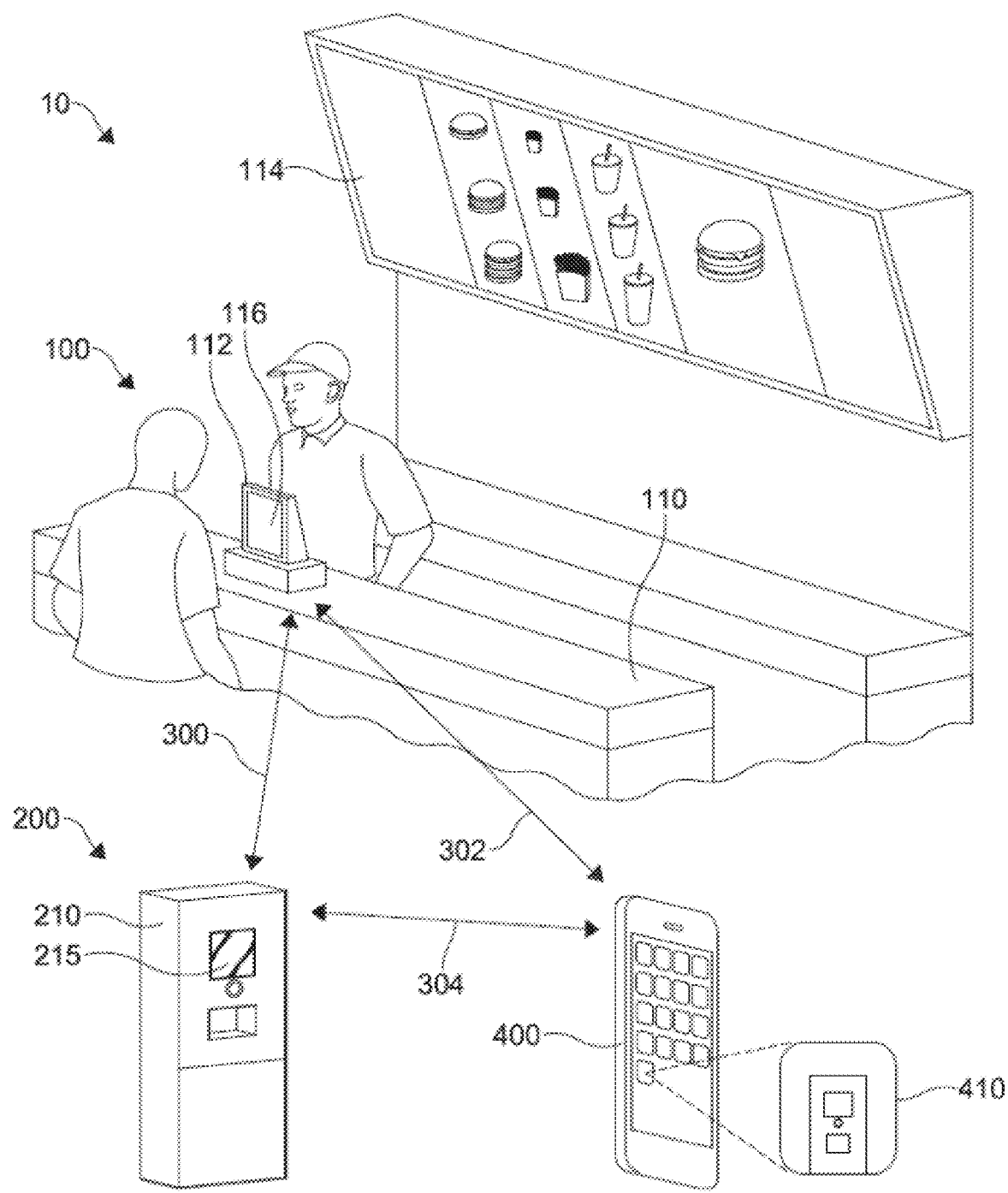
FIG. 1 illustrates a schematic representation of systems, methods, and/or apparatus of the present disclosure.

In one aspect of the disclosure illustrated in FIG. 1, a system, generally 10, comprising a point of sale, generally 100, and a dispensing area, generally 200, may be provided. The point of point of sale 100 may, for example, include one or more of a counter 110, a cash register 112, and a menu 114. Additionally or optionally, the point of sale 100 may include a display 116, such as are commonly used in connection with drive-through areas of fast food restaurants, gas stations, banks, and pharmacies, for example.

The dispensing area 200 may comprise one or more apparatus for dispensing products. For example the dispensing area 200 may comprise a dispensing machine 210 such as a Freestyle® type beverage dispenser that provides Freestyle® type beverage products of The Coca-Cola Company. Such dispensing machine 210 may comprise a keypad, touchscreen, or graphical user interface 215 configured to permit a consumer to make purchasing decisions and/or product selections from the dispensing area 200. Additionally or alternatively, the dispensing area 200 may comprise a vending machine, such as those used for vending packaged or unpackaged products, such as beverages in bottles or cans, toiletries, laundry products, pharmaceutical products, electronic products, golf balls at driving ranges, coffee beans, and the like. As another example, the dispensing machine 210 may provide products such as Apple® smart phones, tablets, and related accessories sold by Apple Computer Company, or software products such as those sold by Microsoft Corporation.

In one aspect of the disclosure, the point of point of sale 100 may be in communication with the dispensing area 200, either through a wired or wireless connection, generally 300. Indeed, the point of point of sale 100 may be in close proximity or even comprise the dispensing area 200, as in the case of a vending machine. The connection 300 may permit the point of point of sale 100 to communicate information to the dispensing area 200. Such information may, for example, include information that a purchase has been made, that the purchase, if made with a credit card, has been validated, and/or that a particular product has been selected.

One or more of the point of point of sale 100 and dispensing area 200 may communicate with a handheld or mobile device, such as a consumer's smart phone, generally 400, e.g., via a wired or wireless connection 302 between the point of sale 100 and the smart phone 400 (or other mobile device) and/or between the smart phone 400 and the dispensing area 200, via a wired or wireless connection 304. The smart phone 400 may include one or more applications 410 that may be provided by or on behalf of a merchant, such as the owner of a restaurant, store, gas station, or other location in which a dispensing area is placed, or may be provided by the entity that markets or sells the products being dispensed, such as The Coca-Cola Company in the case of a dispensing area 200 comprising a Freestyle® dispensing machine 210, and the Freestyle smart phone application, for example. Although the embodiment of the disclosure illustrated in FIG. 1 contemplates a smart phone 400 as the mobile device, it will now be appreciated that any device capable of being enabled with a user application, or capable of providing communication of information, data, and/or instructions and/or push notifications, including, for example "Google Glass" devices, Bluetooth®-enabled devices, tablets, or even implantable computer chips, may be employed according to the teachings set forth herein in keeping with the subject matter claimed herein.

In one aspect of the disclosure, a consumer may register with a provider of products or services, such as The Coca-Cola Company, using the application 410. Such registration may be used to set up an account with the provider, verify credit accounts, set limits on purchase amounts, etc. Such registration may further provide the consumer with permissions to access the dispensing area, either by using credit accounts, by using bank accounts, or by using a code or other identifier that may be provided, for example, by the provider of products or services, by the smart phone application provider, by the smart phone service provider, or at the point of purchase, for example, by the operator of the restaurant in which the point of point of sale 100 resides.

In another aspect of the disclosure, the dispensing area 200 may comprise apparatus, systems, and/or components 220 configured to permit a consumer to try a free sample of product. In the case of a Freestyle® dispensing machine 210, a free sample module 230 may be included within the dispensing machine 210. The free sample module 230 may include an area, such as a virtual button 240 on the graphical user interface 215 of the dispensing machine 210. The free sample module 230 may also include a dispenser for dispensing a free sample cup. The free sample cup may be of a size that may hold a free sample that is significantly less than a standard serving size, i.e., less than 8 fluid ounces. In one aspect, the free sample cup may hold one or two fluid ounces or less. Unless used otherwise herein, the term "sample size", in the context of liquid beverage samples, is intended to mean a single serving of less than about 8 fluid ounces (about 240 ml). In the case of other liquid products, such as laundry detergent, the term "sample size" is intended to mean sufficient liquid to perform a single operation, such as washing a typical load of clothing. As another example, in the case of contact lens solution, the term "sample size" is intended to mean several drops for one or two doses to enable application of the solution to one or two contact lenses. As another example, in the case of a cosmetic, perfume, or cologne sample, the term "sample size" is intended to mean a volume of cosmetic, perfume, or cologne roughly corresponding to the volume contained in a commercially available sample vial, packet, or other container, i.e., generally sufficient quantity for a single use.

In one aspect, it has been found that a sample size of about 2 fluid ounces (about 30 ml) of a beverage may provide sufficient sampling for a consumer to determine whether he or she wishes to dispense a full-sized single serve drink. Consumers are accustomed to being accorded free samples, for example, in supermarkets at the deli case, where such samples are provided in small disposable cups, sometimes with disposable forks or spoons. As with the supermarket example, a vendor or provider of other products, including liquid products such as beverages (both alcoholic and non-alcoholic), liquid soap, liquid detergent, lotion (hand lotion, body lotion, etc.), perfume, mouthwash, contact lens solution etc., may find it advantageous when promoting its products to provide consumers with free samples such as described herein.

The system of the present disclosure may permit a consumer to access a free sample in a number of ways. For example, the consumer may purchase a beverage of unspecified type at the point of point of sale 100. After making the purchase, the consumer may receive a code, for example on the sales receipt, that the consumer may input at the dispensing machine 210 in order to access one or more free samples. Alternatively, the consumer may have previously registered with the provider of products or services and created a password, for example, on a smart phone application, such as application 410, giving the consumer access to make purchases via his or her smart phone application. The same code or other type of access authorization may also grant the consumer authorization to select a full-size single serve beverage, or may grant the consumer authorization to access a predetermined number of servings of predetermined size. The code, or other authorization, may be input in different ways. For example, the dispensing machine 210 may comprise a virtual keypad that is part of the graphical user interface, or an actual keypad that is part of the dispensing machine 210. Alternatively, as described above, the authorization may be achieved merely by the user inputting his or her password into a smart phone application, such as application 410, which grants wireless access to the dispensing machine 210.

As another example, the consumer may have on his or her smart phone an application 410 provided by the seller of products such as, for example, The Coca-Cola Company. This application may include a user identification system that may recognize the user, based on a unique identifier provided by the seller, by the application provider, by the smart phone 400, or by a wireless service provider with whom the consumer has an account. Such identification system may, for example, permit the uses to enter his or her unique password as part of the application log on process. After log on is completed, the application 410 may, for example through wireless communication, instruct the dispensing machine 210 that the user has permission to dispense a free sample. Once permission has been granted, the consumer may be notified, i.e., via the graphical user interface on the dispensing machine 210, and/or on the smart phone 400 display, that permission has been granted to pour a free sample from the dispensing machine 210. The same identification system may also be employed to purchase products and/or dispense purchased products from the dispensing machine 210.

The systems, apparatus, and methods of the present disclosure may also be employed with more traditional beverage dispensing equipment, sometimes known as "legacy" fountain dispensing equipment, such as that used by outlets serving beverages marketed by PepsiCo. When used with legacy equipment, such equipment may be retrofitted with wireless communication components and portion control apparatus to enable dispensing of product as described herein.

In another aspect of the disclosure, the smart phone application may include, for example, push notifications that alert the consumer to new offerings, such as new flavors being offered by the product provider. Such notifications may additionally, or alternatively, make free product samples available for a limited time, at limited locations, for predetermined brands or flavors, and/or in predetermined quantities, for example.

Figure 2:
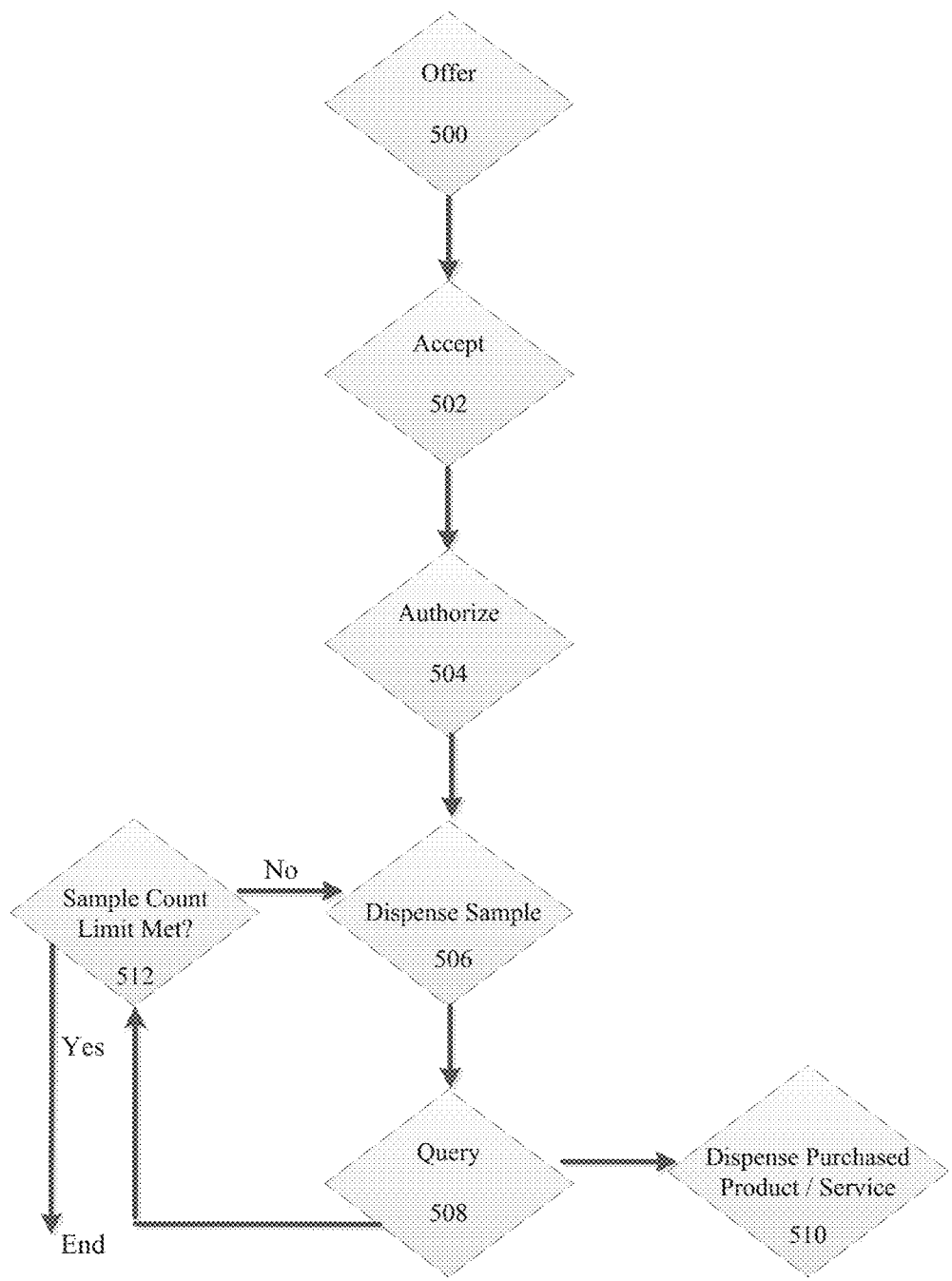
FIG. 2 illustrates operations that may be used for carrying out one or more methods of the present disclosure.

Referring now to FIG. 2, there is illustrated a method of practicing an embodiment of the present disclosure. At operation 500, a notification, such as a push notification, may be initiated, for example, by a product seller, by a service provider, by an application provider, by a mobile device such as a smart phone, or by a wireless service provider with whom a consumer has an account. This notification may be intended for one or more intended recipients, such as consumers, for example, advising them of a product or service offering and providing them an opportunity to accept a free sample of a product or a service.

At operation 502, the initiator of the notification may receive a response indicative of an acceptance of the offer, for example, from the one or more intended recipients. Such response may require the intended recipient(s) to register with the initiator of the notification, for example, by joining or downloading the smart phone application 410 onto their smart phone 400. Such registration may also require the intended recipient(s) to provide customer information such as location, demographic information, product preferences, and/or provide payment information such as a credit card number.

At operation 504, the initiator of the offer may authorize the dispensing of a free product sample or a free sample of a service. Such authorization operation may include receiving information from one or more intended recipients indicative of the one or more intended recipients having joined or downloaded a mobile application, such as mobile application 410. Such authorization may include verifying that the intended recipient accepting the offer has registered with the initiator of the offer, that the intended recipient has created an account capable of paying for a product or service corresponding to the sample product or service, or merely verifying that the intended recipient is in close proximity to the dispensing area 200.

In an alternative method, the free product or service may be authorized for dispensing at a point of sale 100. For example, if a customer purchases products such as food items at a point of sale 100, he or she may be given an offer to try a free sample of products, such as beverages, at the dispensing area 200. Such offer may include a personal identifier for the customer, such as a password or code that the customer may input, either wirelessly via a handheld device, or using a touch screen or touch pad associated with the dispensing machine 210. Alternatively, an operator at the point of sale 100 may instruct the dispensing machine 210, for example, via the wired or wireless connection 300, to permit the customer to dispense the free sample.

As another alternative, a customer may employ a mobile device, such as a smart phone 400 to place an order for a free product and/or a purchased product via the wired or wireless connection 302 to the point of sale 100. In this embodiment, the customer may or may not be responding to a push notification, rather, may initiate the communication that enables the dispensing of a free sample. In still another alternative, the customer may bypass the point of sale 100 entirely, for example, by using a mobile device, such as a smart phone 400, to connect via the wired or wireless connection 304 directly with the dispensing machine 210. As illustrated, the wired or wireless connections 300, 302, 304 may be one-way or two-way connections.

At operation 506, information indicative that the free product sampling has been dispensed may be received, for example, by the initiator of the offer. Receipt of such information may be followed up with additional push notifications. For example, after the recipient has sampled the free product sample, as evidenced by the information obtained at operation 506, at operation 508 a query or second push may be initiated, for example by sending to the one or more intended recipients a query asking if they would like to purchase the product corresponding to the sampled product. Additionally or alternatively at operation 508, the second query may ask for feedback, such as asking such recipients to rate their experience in sampling the free product, for example, indicating on a scale of 1 to 10 how much they liked the product. Depending on the feedback received, for example, if the sample was highly rated, the intended recipient may be asked if he or she would like to purchase the product corresponding to the free sample. On the other hand, if the sample was not highly rated, the intended recipient may be offered one or more additional free product samplings.

Depending on the second push or query sent at operation 508, and the response received at operation 510, the dispensing of one or more free samples and/or the dispensing of purchased product corresponding to the sampled product may be authorized. For example, if at operation 508 a response to the second push notification reveals negative feedback relative to the initial product sampling and/or that the intended recipient would like to sample one or more additional free samples, then operation 510 may authorize the dispensing of one or more additional free samples. In order to avoid an "endless loop" of negative feedback by intended recipients merely trying to "game the system" by obtaining unlimited free product samples, a counter operation may be interposed, i.e., at operation 512, to cut off the opportunity for additional free samples after a predetermined number, for example three free samples. Thus, operation 512 may count the number of requests for free samples made in response to the query operation 508 and if a predetermined number of free sample requests has not be met, may authorize the dispensing of additional free samples. Alternatively, if a predetermined number of free sample requests have been met, then operation 512 may indicate that this is the case and end the free sample query. Alternatively, the counter operation 512 may be interposed prior to the query operation 508 to indicate prior to the query being made that the predetermined number of free samples has been dispensed, and end the free sample offering.

As indicated, the query or second push operation 512 may ask the intended recipient to indicate if he or she is interested in purchasing the product or service corresponding to the free sample. If an affirmative indication is received, then the dispensing of the purchased product or service may be authorized at operation 510.

The product dispensing machine, when used for dispensing liquid product, may be of the general configuration of The Coca-Cola Company Freestyle® dispensing machine, improved according to the teachings described herein. As is well known, the Freestyle® dispensing machine stores beverage concentrates, such as Coke®, Sprite®, and other beverage concentrates and flavor concentrates, such as lemon, cherry, etc., in multiple cartridges housed within the body of the machine. These various concentrates, as is also well known, are mixed and dispensed by the Freestyle® dispensing machine in microliter doses with carbonated water to produce a finished beverage. In order to retain the desired flavor and quality profile of the concentrates, the cartridges may be chilled and/or periodically agitated by the machine. The Freestyle® vending machine is currently configured to pour a selected purchased beverage into a customer's glass, cup, or other receptacle without discriminating as to the size of the pour. Thus, a customer could currently pour a one-ounce, eight-ounce, or thirty-two-ounce serving of purchased product, but cannot currently request a sample size of a free product sample or a purchased beverage of a predetermined size.

The Freestyle® dispensing machine may be modified, however, to limit the size or quantity of the pour in response to the size of beverage being purchased and/or the size or quantity of a free sample to be dispensed. Such discrimination may be achieved using known portion control apparatus and/or software configured to limit portion sizes. In this way, a consumer might determine, due to calorie count of a caloric beverage, that he or she only wishes to purchase a smaller than standard serving size, such as a six ounce serving, for example.

The Freestyle® dispensing machine may be further configured to offer and/or display the price of a beverage based on serving size. For example, a consumer might be permitted to order any size beverage in one-ounce increments, based on a price schedule that might offer a variable price per fluid ounce based on the volume selected. Given the current obesity epidemic worldwide, but particularly in the United States, where the Freestyle® vending machine is most prominent, consumers may appreciate the option of buying only as much product as they want at a Freestyle® dispenser, particularly in the case of children, who often cannot finish a standard eight-ounce serving, and for whom obesity concerns may be particularly acute.

A sample price schedule, which may be displayed by the Freestyle® vending machine on the user interface or touchscreen 215 might appear as set forth in the following example, termed for illustrative purposes as "Freestyle® Variserve™ Pricing:

| Freestyle ® Variserve ™ Pricing | | | |
|---|---|---|---|
| Serving Size (Oz.) | Price Per Oz. ($) | Price Per Serving ($) | Calories Per Serving |
| 1 | 0.20 | 0.20 | 12.5 |
| 2 | 0.20 | 0.40 | 25 |
| 3 | 0.20 | 0.60 | 37.5 |
| 4 | 0.1625 | 0.65 | 50 |
| 5 | 0.014 | 0.70 | 62.5 |
| 6 | 0.133 | 0.80 | 75 |
| 7 | 0.129 | 0.90 | 87.5 |
| 8 | 0.125 | 1.00 | 100 |

The user interface may be configured to permit the consumer to select the serving size desired simply by pressing a touch screen section on the graphical user interface 215 corresponding to the desired serving size, i.e., as displayed on the Freestyle® Variserve™ Pricing menu illustrated above.

In another aspect of the disclosure, the seller of calorie containing products may, in order to encourage consumption of lower calorie offerings, and/or demonstrate to governmental organizations and/or the public generally their commitment to combatting the obesity epidemic, use the systems, methods, and/or apparatus disclosed herein to price their products with variable pricing based on the caloric content of the products being dispensed, for example, pricing products at a fixed price per calorie, or according to a pricing schedule that prices product being dispensed at a lower price per unit weight or volume for lower calorie products relative to products that contain a greater number of products per serving. Indeed, the variable price concept of the present disclosure may be used in combination with the portion control concept, creating a "double bonus" by offering even lower prices when both lower calorie and lower serving size selections are made. Other combinations are, of course possible.

Moms and people trying to control their weight by counting calories would benefit from being able to dispense food and beverage products based on the number of calories, such as one hundred calories' worth of beverage, nuts, seeds, yogurt, etc. Accordingly, another aspect of the disclosure may employ the teachings herein to dispense a predetermined number of calories of food or beverage product, for example, at the consumer's choosing. The dispensing apparatus may also be configured to price the product thus dispensed according to the total number of calories dispensed, rather than the weight or volume of product being dispensed.

A dispensing machine 210, such as a Freestyle® dispensing machine, may be modified to allow pricing and sales based on caloric content of the beverages offered. A price per calorie or additional surcharge per calorie may be established. In one embodiment, a discount or rebate is applied for low-calorie or zero-calorie selections. The price per calorie may be set and updated based on, individually or in combination: geographic region, type of establishment the dispensing machine 210 is located in, government regulation, third-party standards, owner/lessee preference, etc. For example, a price per calorie for a dispensing machine 210 located in a high school may be higher than the price per calorie for a dispensing machine 210 located in a fast-food restaurant. A user-customized beverage may vary in caloric content based on the particular combination of beverages and/or flavorings used to create the custom beverage. For example, a user may select on a Freestyle® dispensing machine to combine a zero-calorie cola with a high-calorie fruit flavored beverage. The combination chosen, and/or the quantity of the beverage chosen to be dispensed by the consumer, may permit the consumer to determine the amount of calories in the beverage. In one embodiment, a user may make selections for a beverage on the graphic user interface 215. A price per unit of volume, such as a fluid ounce, based on the caloric content of the selected beverage combination may then be calculated and displayed to the user on the graphic user interface 215. Additionally or alternatively to a price per unit volume, a total caloric content and price may be displayed based on a predetermined receptacle size. For example, in one embodiment, receptacles of "small", "medium", and "large" sizes may be made available to a user where the dispensing machine is located. A price based on the calories of the selected beverage may be based on the volumes of the receptacles provided and may be displayed on the graphic user interface 215 in addition to or in place of a price per fluid ounce. In one embodiment, the receptacle chosen may be detected and the price for the beverage based on the set size of the receptacle communicated to the dispensing machine 210 and the caloric content of the user-defined beverage.

In another aspect of the disclosure, a parental and/or governmental control feature may be employed. Many types of products, such as alcoholic beverages, pharmaceuticals, birth control products, adult reading materials and videos and the like, and in some venues even calorie-containing beverages, may not be legally sold to minors. Yet it may be desirable for a seller of such products, referred to generally herein as "adult products," to be able to dispense them via a product dispenser or vending machine such as those described and referenced herein. Such sale of adult products might be accomplished, for example, by incorporating an age verification operation to verify that a consumer dispensing a product is old enough to purchase the product, such as in the case of an alcoholic beverage, a calorie-containing beverage, or any "adult product" that might be dispensed, such as birth control products, adult reading materials, via a Freestyle® type dispenser, yogurt dispenser, vending machine, etc. Such age verification operation may, for example, include face recognition modules, fingerprint identification technology, or any other known means of verifying the identity and/or age of an individual.

While the above example illustrates a variable price per unit volume, i.e., fluid ounces, it should be readily appreciated that the product dispenser of the present disclosure may be configured to dispense product by weight, by volume, or, in the case of solid products such as pharmaceuticals, by number of units, such as pills. Also, the variable pricing menu may be configured to vary the pricing per unit quantity based on the type of product being dispensed. For example, in the case of perfume, some brands may be more expensive per unit quantity than other brands, but the dispenser may be configured to dispense both higher and lower cost perfumes with variable pricing based on quantity purchased.

It should be here noted that variable pricing at a dispenser of product may be used to encourage, or discourage, more or less consumption of a product. Thus, if the product being dispensed is gasoline, the dispenser may be configured to charge a higher price per gallon the greater the quantity of gasoline being purchased, for example, during a finite purchasing operation by a single customer. Similarly, if the product being dispensed is an alcoholic beverage, the price per ounce of alcoholic beverage being dispensed from the dispenser may be configured to increase as greater volumes of beverage are purchased. Indeed, the dispenser may be configured to recognize a particular consumer has having purchased, during a finite time period, a quantity of alcohol that approaches the legal limit for alcoholic consumption for an adult of typical weight. In such situations, the dispenser may be configured to halt the sale or dispensing of alcohol to such consumer until a predetermined period of time has lapsed. Such dispenser might be of particular use at a bar or restaurant, where a server may not always be able to perceive the relative intoxication of a customer. Product dispensers, such as beer taps, in such establishments, may be configured to record the quantity of alcoholic beverages, such as beer, being poured for a particular consumer. The product dispensers may be configured to track alcohol consumption using radio-frequency identification (RFID)

chips embedded in each consumer's cup, mug, or glass that are coded for each individual customer. The dispenser may include, for example, an RFID reader or other type of reader that recognizes and counts each pour of beer for a particular customer and halts additional pours after a predetermined number of servings have been recorded.

The system may similarly be used to discourage overconsumption of caloric products, such as sugar-containing beverages. Thus, if the system detects that a particular consumer has, in a predetermined time period, one hour for example, consumed an excessive number of calories, it may issue a warning to the consumer, either at the point of sale, the dispensing area, and/or via the consumer's handheld device, i.e., smart phone or tablet. Similarly, the system may be configured to disallow continued dispensing of purchased or free samples of product to a consumer that has exceeded a predetermined quantity of product and/or a predetermined number of calories consumed.

In other contexts, of course, the dispenser may be configured, as illustrated above, to decrease the price per ounce as the volume being purchased increases, according to volume discount pricing protocols employed, for example, by volume discount establishments such as Costco®.

The system of the present disclosure may be configured to permit a customer to communicate with the product dispensing machine 210, such as a Freestyle® machine, for example, using a smart phone 400 in place of, or in augmentation of, the touchscreen panel display 215 of the dispensing machine 210. Thus, the customer may, employing the systems, methods, and apparatus described herein, be able to request a custom mix of a beverage to sample as a free sample. Such enablement may be achievable with relatively inexpensive and/or commonly understood software upgrades to existing Freestyle® machine software and/or the Freestyle® mobile application 410.

The same technology employed in the existing Freestyle® machine to dispense beverage products may be repurposed to dispense other liquid products, such as perfume, cologne, cosmetics, etc., either as free samples and/or as purchased products per the disclosures contained herein. One particularly attractive use of the Freestyle® dispensing technology, given its micro-dosing capabilities, may be in the area of sampling highly volatile and/or expensive liquids such as perfumes, as such samples normally must be made in small quantities. Just as consumers may mix their own blends of beverages using the Freestyle® vending machine, they may do the same, employing the teachings herein to mix, for example, their own blends of cosmetics, perfumes, colognes, etc.

According to an aspect of the present disclosure, the four moments of truth may be compressed in time and space. For example, a push notification may be provided, i.e., via a smartphone or other mobile device, to a potential consumer, providing that consumer with the type of information the consumer might otherwise seek out during the zero moment of truth. The push notification may be sent to a user's communication device irrespective of the user's or the device's location. Alternatively, the push notification may be sent to the user or the user's communication device when the user is determined to be in close proximity to a product dispenser offering products with which the push notification is concerned. Such proximity may be determined using known location determination systems, such as those enabled on smart phones such as the Apple® iPhone. The push notification may provide information including product attributes, market survey data, such as how other consumers have rated the offered product, how long the product will be offered, at what locations, for what price, etc.

The push notification may offer the prospective purchaser a free product sample at a designated location, essentially bypassing the first moment of truth, as the potential purchaser does not need, at this stage, to make a purchase decision. It is generally recognized that the most useful information concerning why a purchasing decision was made is that gathered proximate in time to the making of that decision. The push notification may thus include a requirement that the potential purchaser complete a survey, such as a pre-sample and/or post-sample survey, as a condition of being provided the free sample. The potential purchaser may then be provided a free sample and queried immediately thereafter to take a survey, for example, a multi-modal survey over a hand-held or other mobile device, or otherwise share the experience of the product or service, compressing the second and third moments of truth into a timeframe proximate the sampling experience. The prospective purchaser may be incentivized to complete a market research or data acquisition operation, i.e., by taking a survey, following the sampling experience by being offered another free sample after confirmation that the consumer has completed the data acquisition operation. In another embodiment, a potential purchaser may receive a sample and also a post-sample survey, with completion of the survey incentivized by the offer of a discount on a purchased product corresponding to the sampled product or a related product.

The seller of the product or service may capture experiential data, such as whether or not the free sample met expectations, how the potential purchaser rates the sample, etc. The potential purchaser may then be queried as to whether or not the purchase of a packaged product or service corresponding to the free sample is desired. If so, the packaged product may be dispensed or service provided. If not, the potential purchaser may be queried as to why no purchase is desired, with the information being captured for providing valuable marketing information to the seller of the product or service being offered. Such information may be captured by the seller of the product, or may, for example, be captured by known methods, including via data acquisition providers that provide online surveys, such as Toluna, which may employ social media such as Facebook, Twitter, and other apps for the purpose.

In the case of a sampled beverage, for example, being promoted by the Coca-Cola Freestyle® or PepsiCo "Touch Tower" dispensing machines, the apparatus, systems, and methods of the present disclosure may be used to capture consumer preference data that may be shared with other prospective consumers. For example, a 50-50 blend of Orange-flavored Coke and Vanilla-flavored Coke, sometimes referred to as a "Cream-side," might show a favorability rating of 92% "likes," while a less popular sample or purchased product might indicate a much lower rating. Such ratings may be displayed prior to the potential purchaser accepting the push notification offer, and/or prior to the potential purchaser being queried as to whether the purchase of a product corresponding to the sampled product is desired. The consumer may, either following sampling the product to be sampled, also be asked to rate the product for additional marketing data capture.

Figure 3:
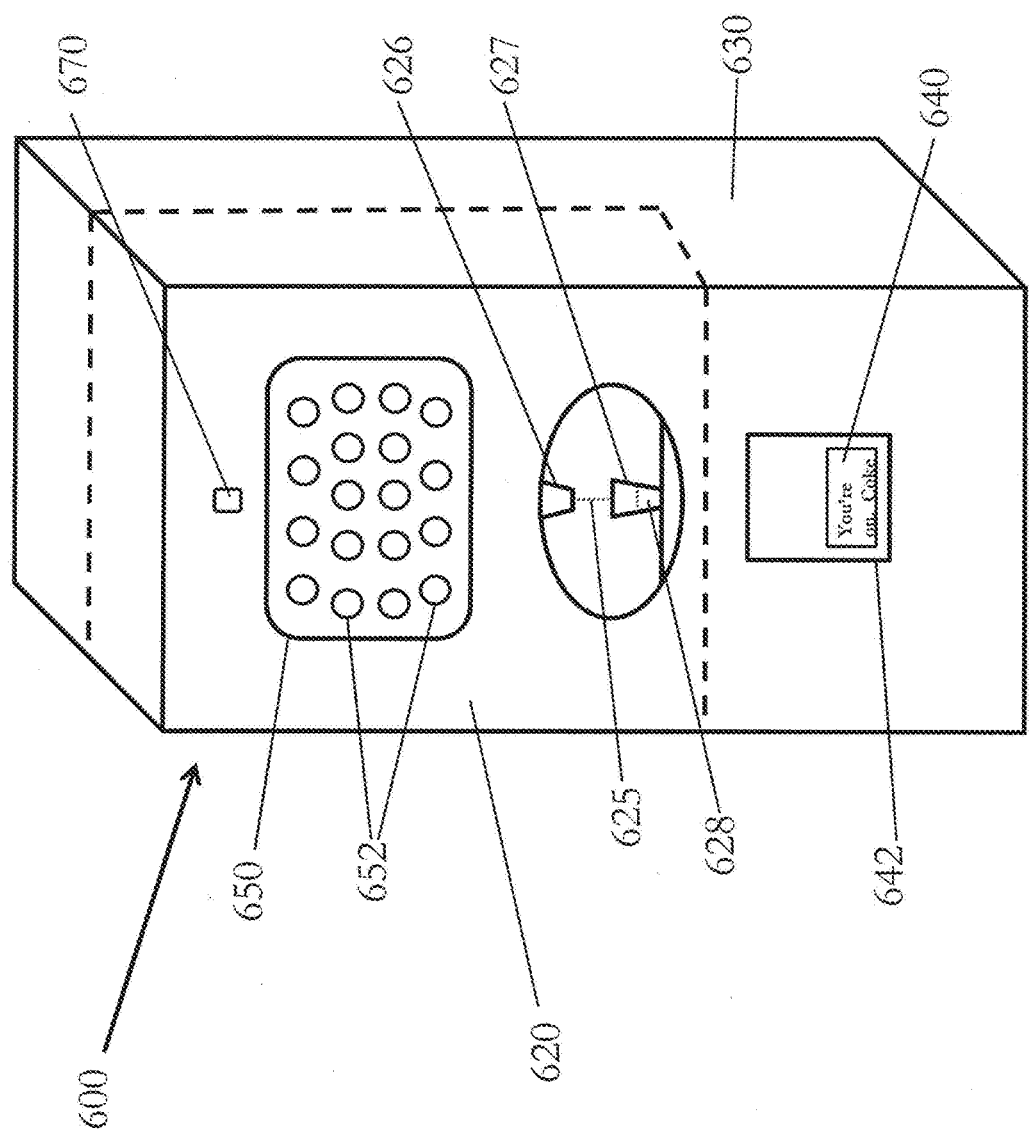
FIG. 3 illustrates a product dispenser of the present disclosure.

Another aspect of the disclosure is illustrated in FIG. 3. In this aspect, a product dispenser, generally 600, may comprise both a product sampling portion, 620 and a packaged product portion, 630, which may be configured to dispense a packaged product 640 corresponding to a product to be sampled 625 from the sampling portion 620, as will now be described. In this aspect, the product sampling portion 620 may, for example, comprise a legacy-type fountain dispenser, a Freestyle®-type dispenser as previously described, or a "Touch Tower" dispenser such as those promoted by PepsiCo, Inc., or any other device that may be configured to dispense a product sample. The product sampling portion 620 may, as another example, comprise a dispenser of solid products, subsequently described.

The product sampling portion 620 may be configured to contain a product to be sampled, 625. The product to be sampled 625 may, for example, comprise a liquid, such as a beverage, a semi-liquid, such as a yogurt product or a cosmetic lotion, cream or paste, or a solid, such as nuts, potato chips, corn chips, cookies, cookie pieces, pretzels, candy, candy pieces, pharmaceutical-type products such as pills, tablets, or lozenges, etc.

The product to be sampled 625 may be dispensed through a product sample dispenser 626, which may comprise, for example, in the case of a liquid or semi-liquid product a dispensing mechanism such as a nozzle that may further comprise a known volumetric or weight control mechanism to limit the size of the sample to a predetermined quantity, such as those commonly used, for example to fill beverage bottles at bottling plants, yogurt containers, toothpaste, pharmaceutical cream, and cosmetic tubes, etc.

In the case of a solid product to be sampled 625, the product sample dispenser 626 may comprise dispensing equipment such as used to fill potato chip bags and other snack food bags in known form, fill, and seal packaging processes, such as disclosed in U.S. Pat. Nos. 4,534,818 and 8,656,690 (assigned to Frito-Lay North America, Inc.), incorporated by reference herein. Such equipment, employed in conventional form, fill, and seal packaging machines, first weigh and measure the product in a weigher. The weighers collect and discharge a specified charge of product. Each charge represents the amount of product that will, in the case of a packaged solid food product such as potato chips, nuts, seeds, etc., occupy a single bag. Downstream from the weigher is typically a funnel or a series of funnels, which direct the product to complete the packaging operation. In this context, solid products to be sampled according to the present disclosure may be dispensed in a predetermined weight or volume employing known weighing and dispensing equipment that may be modified to dispense smaller quantities and/or fit within the confines of a product dispenser 600, which may occupy roughly the same footprint as a standard beverage or salty snack vending machine.

In one aspect of the present disclosure in which solid product samples are being dispensed, such products may be contained in storage bins within the product dispenser 600, may be portioned using a weigher, and may be conveyed, dropped, funneled, or otherwise dispensed into a sample cup or other sample receptacle, 627, or may be dispensed into the waiting hand of a consumer. When a sample receptacle 627 is employed, it may be stored, for example, in a nearby cup holder, or may be dispensed from the product sample dispenser 626 in a manner similar to that in which beverage cups are dispensed using conventional coffee vending machines.

The product sampling portion 620 may be configured to dispense liquid, semi-liquid, and solid product samples from the same product dispenser 600. Similarly, the packaged product portion 630 may be configured to dispense liquid, semi-liquid, and solid products from the same packaged product dispenser 630, corresponding to the liquid, semi-liquid, and solid products samples, respectively. The product dispenser 600 may be configured to store and serve hot, cold, and ambient temperature products, both as samples and as packaged, purchased products.

The product to be sampled, 625, may be dispensed in a sample size 628, which may be a smaller, larger, or the same quantity as the size of a corresponding purchased packaged product. In the case of a beverage, an eight or twelve-ounce can, or a 16-ounce bottle, are typical sizes of purchased packaged products that are dispensed through conventional vending machines. In the case of a solid purchased packaged product dispensed through conventional vending machines, sizes vary widely, depending upon the density of the product in question and the desired calories per serving desired within a single-serve package. In a preferred aspect of the disclosure, the sample size 628 may be smaller than the typical size of corresponding purchased packaged product, particularly when a free sample is being offered, to minimize the cost of providing a free sample. In this aspect, the sample size 628 may be predetermined to be of a size (by weight or volume) that is large enough to provide a testing consumer sufficient quantity to determine whether or not to purchase a corresponding packaged product, and ideally and preferably no larger. Such sample size 628 will obviously vary by phase of product, i.e., liquid, semi-liquid, or solid, and by product type, i.e., food, beverage, cosmetic, perfume, etc.

The product dispenser 600 of the present disclosure may comprise a packaged product portion 630 positioned in proximity to, or integral with, the product sampling portion 620. The packaged product portion 630 may comprise apparatus configured for packaged product storage, chilling or heating, and dispensing according to conventional vending machines, but may differ therefrom insofar as the packaged product portion 630 may communicate physically and/or wirelessly with the product sampling portion 620 as illustrated and described. As further illustrated, the packaged product portion 630 may be configured to dispense a packaged product, 640, such as a canned or bottled beverage or a sealed salty snack package via a packaged product dispensing bin 642, which may be conventional. The packaged product 640 may correspond to the product to be sampled 625. As used herein, the term "a packaged product corresponding to the product to be sampled" is intended to mean a product contained in a package, the packaged product being branded the same as, generally equivalent to, and in certain preferred embodiments, in all material aspects (except, perhaps, quantity) identical to, the product to be sampled in terms of product formula, quality, and physical properties.

In some embodiments, however, a packaged product may be considered to "correspond to the product to be sampled" even if not identical in formulation. For example, assume that the product to be sampled is raspberry-flavored Fanta® soft drinks, but that precise flavor is temporarily out of stock within the storage area of the packaged product portion 630. In that situation, a user of the product dispenser 600 may receive an out of stock notice and a query concerning whether a substitute product, i.e., strawberry-flavored Fanta®, is desired instead. Given the similarity of brand and product experience in this example, the strawberry-flavored Fanta® packaged soft drink is considered to "correspond to the product to be sampled," i.e., a raspberry-flavored Fanta® soft drink. As another example, diet products such as diet Coke® may utilize a slightly different sweetener system when dispensed via legacy fountain equipment relative to the sweetener system used in the canned or bottled version. But according to the present disclosure, the bottle or can formulation of diet Coke®, i.e., the packaged product, is intended to "correspond to the product to be sampled," for example, a diet Coke® formulation dispensed from legacy fountain equipment, even if having a slightly different sweetener system.

In an alternative aspect of the disclosure, the product to be sampled 625 may be packaged in a sample package, and dispensed through the packaged product portion 630 of the dispensing apparatus 600. In this aspect, the packaged product to be sampled may, for example, be packaged in a smaller size than a corresponding packaged product to be purchased. Common examples of packaged product sizes that are smaller than package sizes dispensed after purchase from a vending machine includes peanuts and pretzels served on commercial aircraft, and "travel sizes" of health, beauty, and personal consumer products, i.e., 24-gram packages of Crest® toothpaste, or small packets of products such as sun screen lotion, shaving lotion, etc., sometimes provided, i.e., by hotels to patrons who have forgotten such items. In the case of a packaged product to be sampled, i.e., a 24-gram travel size of Crest® toothpaste, it may be desirable to configure the product dispenser 600 to dispense both the packaged product to be sampled and the packaged product to be purchased through the same product dispenser 600, such as the product dispensing bin 642.

As further illustrated in FIG. 3, the product dispenser 600 may comprise a user interface 650, which may be a graphical user interface such as used on the Freestyle® or "Touch Tower" dispensing machines. Alternatively or additionally, the user interface may comprise product selection buttons such as employed on conventional vending machines. Such user interface 650 may comprise one or more buttons 652, which may be actual (mechanical) or virtual (graphical) buttons, for making a product offering and/or selection.

The user interface 650 may communicate, either via wired or wireless communication, with the product sampling portion 620 and/or the packaged product portion 630. In this aspect, a consumer may be given an opportunity to sample a product, either for free or for a fee, and may then, after having sampled the product, be given an opportunity to purchase a product corresponding to the sampled product. For example, the product dispenser user interface 650 may display an offer to try a free sample of one or more products that may be dispensed from the product dispenser 600 as herein described. The consumer may be prompted, for example, through the user interface 650, to select one or more products for sampling. Upon selection of the product to be sampled, for example, by a consumer selecting a particular button 652, the product dispenser 650 may dispense the selected sample product.

The product dispenser 650 may, after dispensing the selected sample product, query the consumer if the purchase of a packaged product corresponding to the sampled product is desired. Such purchase may, for example, be accomplished employing a conventional vending machine purchasing operation, which may occur with either a cash or cashless (credit card, i.e.) vending operation.

In a preferred aspect of the disclosure, the first moment of truth for the product being offered may be used to incentivize a purchase of the product and/or obtain market research data concerning consumers' purchase decisions. For example, if it is known that a consumer typically takes 5 seconds or less after sampling a free beverage sample before making a decision to purchase a product corresponding to that sample, the product dispenser 600 may query the user, for example, via the user interface 650, within 5 seconds of dispensing a sample, if the consumer wishes to purchase a dispensed or packaged product corresponding to the sampled product. While the consumer may, within that 5-second first moment of truth have already determined to purchase the product, the query may serve to reinforce the purchase decision. Similarly, if, during the 5-second first moment of truth, the consumer has determined not to purchase a dispensed or packaged product corresponding to the sampled product, a query nonetheless asking the consumer if a purchase is desired may encourage the consumer to change his or her mind by virtue of the query. But even if the consumer who has made a negative purchase decision is not encouraged to change his or her mind by the query, this too may be the source of useful market research information for the vendor of the sampled product. In that case, the product dispenser 600 (or smartphone app or other communication vehicle) may ask the consumer why he or she is unwilling to purchase the product, providing one or more possible answers the consumer may enter, i.e., on a touch screen associated with the user interface 650, or via a cell phone app, i.e., the Freestyle® app. Similarly, a consumer who answers the query affirmatively and purchases a product corresponding to the sampled product, may be surveyed as to why he or she purchased the product, whether he or she would do so again, etc.

Figure 4:
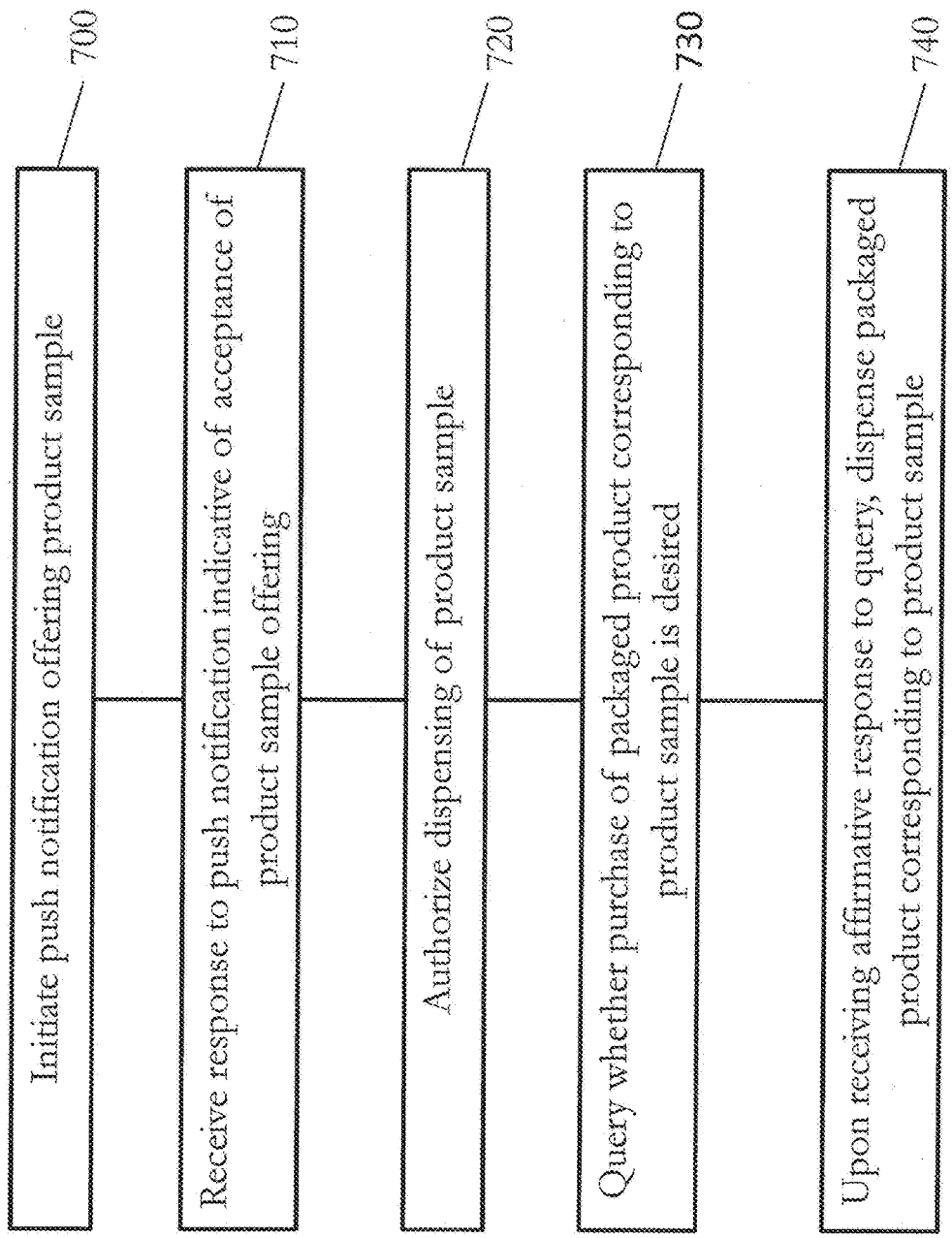
FIG. 4 illustrates a preferred method according to the present disclosure.

In an alternative embodiment of the disclosure, illustrated in FIG. 4, a push notification may be initiated at operation 700. Such a push notification may take the form previously described herein, i.e., via a wireless communication device, for example the Freestyle® smartphone app. Such notification may alert users to nearby locations at which a promotional product sampling offer is valid.

At operation 710, a response to the push notification may be received, for example indicative of an acceptance of the offering.

At operation 720, dispensing of a product sample may be authorized in response to the acceptance of operation 710.

At operation 730, a query may be provided to a source of the response to the push notification of operation 710, for example, a consumer using a smartphone app. The query may ask the consumer if there is a desire to obtain a product corresponding to the product just sampled, whether for purchase, reward redemption, as a free prize, or otherwise.

At operation 740, upon receiving affirmative response to the query of operation 730, instructions may be provided to dispense a packaged product corresponding to the product sample.

In another aspect of the disclosure, the first moment of truth (or indeed all four moments of truth) may be lengthened or shortened by providing time-sensitive incentives to the prospective purchaser. For example, assume at time=0 a sample product is dispensed for a product generally recognized as having a 7-second first moment of truth. At time=5 seconds following sample product dispensing, the consumer may be queried if a purchase of the sampled product is desired, and may be incentivized with a lesser price if the purchaser makes an affirmative decision within a period of time, say, 10 seconds after the query, following which time, the price offered may increase to the standard price of the purchased product.

As an example, this method may look like this:
1. Consumer receives a push notification offer to sample a free beverage product at a nearby Freestyle® vending machine.
2. Consumer accepts the push notification offer and receives the free sample.
3. Five seconds after the free sample is dispensed, the Freestyle® vending machine queries the consumer if he or she would like to purchase a packaged beverage corresponding to the free sample, informing the consumer that a 16-ounce packaged beverage normally costs $2.50 from vending machines, but that for the next 10 seconds, the consumer may purchase the same 16-ounce packaged beverage for $2.00. This information may be displayed on the Freestyle® user interface, with a 10-second countdown and a "purchase product" button or graphical interface positioned nearby, possibly in a flashing, blinking, or otherwise in a manner to attract attention. If the "purchase product" button is pressed, the counter may stop counting, and lock in the $2.00 purchase price for the product in issue. The dispenser may then receive payment using known methods and authorize the dispensing of a 16-ounce packaged beverage, charging the consumer $2.00 for the transaction.

The methods, systems, and apparatus of the present disclosure can be used to accomplish a wide range of possible combinations, as illustrated below. These possible combinations can be even further multiplied by varying the type of product, i.e., solid, semi-solid, or liquid. Such combinations may further be employed in conjunction with customer loyalty programs, sweepstakes, or other promotions designed to provide incentives for consumers to try products, whether for free or for a fee, and receive rewards, including free products for which payment would ordinarily be required.

Figure 5:
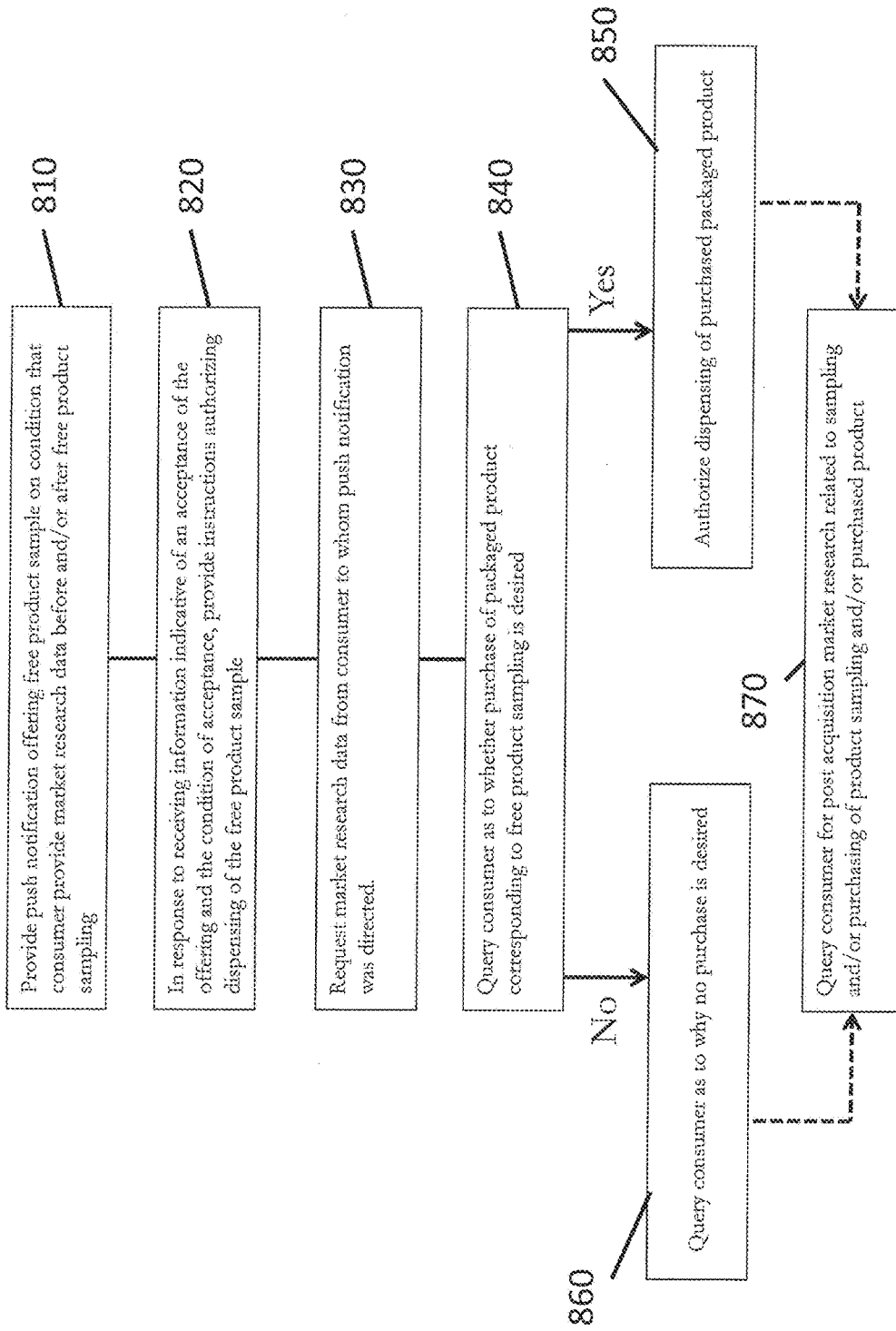
FIG. 5 illustrates another preferred method according to the present disclosure.

Possible combinations of sample and product:
1. Free unpackaged sample, purchased packaged product
2. Free unpackaged sample, free packaged product
3. Free unpackaged sample, purchased unpackaged product
4. Free unpackaged sample, free unpackaged product
5. Free packaged sample, purchased packaged product
6. Free packaged sample, free packaged product
7. Free packaged sample, purchased unpackaged product
8. Free packaged sample, free unpackaged product
9. Purchased unpackaged sample, purchased packaged product
10. Purchased unpackaged sample, free packaged product
11. Purchased unpackaged sample, purchased unpackaged product
12. Purchased unpackaged sample, free unpackaged product
13. Purchased packaged sample, purchased packaged product
14. Purchased packaged sample, free packaged product
15. Purchased packaged sample, purchased unpackaged product
16. Purchased packaged sample, free unpackaged product Referring now to FIG. 5, there is illustrated another preferred method of practicing an aspect of the present disclosure. As illustrated at operation 810, there may be provided a push notification, for example using a smartphone app such as the Freestyle® smartphone app, or other known push notification medium, to notify one or more intended recipients of a free product sampling being offered, for example, at designated locations and/or for limited times. The offer of a free sample may be conditioned on the intended recipient(s) providing market research data or other information, either before, during, and/or after the free product sampling.

At operation 820, in response to receiving information indicative of an acceptance of the offering and the condition of acceptance, instructions may be provided authorizing dispensing of the free product sample.

At operation 830, a request for market research data from the intended recipient of the push notification may be made, in an effort to collect market research data, i.e., whether the sampled product met expectations, why or why not, etc.

At operation 840, a query may be made to the intended recipient as to whether purchase of packaged product corresponding to free product sampling is desired.

In response to a positive response to the query, instructions authorizing dispensing of packaged product corresponding to free product sampled may be provided at operation 850, for example, after payment has been received from the intended recipient. In response to a negative response to the query, at operation 860, the intended recipient may be queried as to why a negative response was provided. This information may, in turn, be stored by the product dispenser 600, may be transmitted to the product supplier, or may be otherwise stored or transmitted for further use, aggregation, etc.

In either the case of a positive response or a negative response to the query at operation 840, the product dispensing system may initiate a query at operation 870 for post-acquisition market research related to sampling and/or purchasing of product sampling and/or purchased product from the intended recipient. Such query 870 might include surveys related to consumer satisfaction with the product sampling experience, effectiveness of the product sampling in leading to a purchase decision, what the consumer liked most/least about the product sampling experience, etc.

In another aspect of the disclosure, the dispenser illustrated in FIG. 3 may be configured with known facial recognition or similar data acquisition software and/or devices, represented in FIG. 3 as element 670, which may include a camera or other imaging module positioned at a location on the product dispenser corresponding to that needed to capture within its field of view a consumer standing proximate the product dispenser 600 and to enable the dispenser 600 to either recognize a particular consumer, and/or to determine, in the case of cosmetic products, for example, a recommended color palette of cosmetic products for that particular consumer. For example, women making purchasing decisions at cosmetics counters in department stores often seek cosmetic colors that match their particular skin tone, complement their eye or hair color, etc. According to the present disclosure, the sample product dispenser may be configured to determine, based on one or more of these color parameters, i.e., skin tone, eye color, teeth color, hair color, lip color, etc., a recommended color for a particular product of interest, i.e., a lipstick, a face cream concealer, a hair color, etc., and may "counsel" the customer as to the recommended product based on such recommended color. In the case of a liquid product, such as a face cream concealer, for example, the dispenser may be configured to mix a sample thereof in a color corresponding to the recommended color, which may, in a preferred aspect, be a color that matches as nearly as possible to the consumer's natural skin color. In another aspect, a recommended cosmetic or hair color may be determined by categorizing the consumer, based on a facial data acquisition step, whether that consumer presents with "Winter," "Spring," "Summer," or "Autumn" skin, eye, and/or hair tones. Alternatively, the dispenser may be configured to offer and dispense a purchased cosmetic product or hair color corresponding to a recommended color for the particular consumer after accessing data pertaining to the consumer's unique color parameters. In an alternative aspect, such facial recognition devices may be employed with the methods, apparatus, and/or systems of the present disclosure to offer product to be sampled and/or purchased based on one or more of the consumer's facially recognized age, sex, ethnicity, size, prior purchases (in the case of a recognized prior purchaser), etc.

For purposes of this disclosure, unless the context clearly requires otherwise, the following definitions shall apply:
(a) "Beverage container" means any sealed or unsealed container regardless of size or shape, including without limitation, those made of glass, metal, paper, plastic, or any other material or combination of materials that is used or intended to be used to hold a beverage for individual sale to a consumer.
(b) "Beverage dispensing machine" means any device that mixes concentrate with any one or more other ingredients and dispenses the resulting mixture into an unsealed container as a ready-to-drink beverage.
(c) "Caloric sweetener" means any substance containing calories, suitable for human consumption, that humans perceive as sweet and includes, without limitation, sucrose, fructose, glucose, and other sugars and fruit juice concentrates. "Caloric" means a substance that adds calories to the diet of a person who consumes that substance.
(d) "Concentrate" means a syrup or powder that is used or intended to be used for mixing, compounding, or making a sugar-sweetened beverage.
(e) "Consumer" means a person who purchases a sugar-sweetened beverage for a purpose other than resale in the ordinary course of business.
(f) "Natural fruit juice" means the original liquid resulting from the pressing of fruit, the liquid resulting from the reconstitution of natural fruit juice concentrate, or the liquid resulting from the restoration of water to dehydrated natural fruit juice.
(g) "Natural vegetable juice" means the original liquid resulting from the pressing of vegetables, the liquid resulting from the reconstitution of natural vegetable juice concentrate, or the liquid resulting from the restoration of water to dehydrated natural vegetable juice.
(h) "Powder" means a solid mixture with added caloric sweetener used in making, mixing, or compounding a sugar-sweetened beverage by mixing the powder with any one or more other ingredients, including, without limitation, water, ice, syrup, simple syrup, fruits, vegetables, fruit juice, or carbonation or other gas.
(i) "Sale" or "sell" means any distribution or transfer for a business purpose, whether or not consideration is received.
(j) "Sealed beverage container" means a beverage container holding a beverage that is closed or sealed before being offered for sale to a consumer.
(k) (1) "Sugar-sweetened beverage" means any sweetened nonalcoholic beverage, carbonated or noncarbonated, sold for human consumption that has added caloric sweeteners and contains 75 calories or more per 12 fluid ounces. "Nonalcoholic beverage" means any beverage that contains less than one-half of 1 percent alcohol per volume.
(2) "Sugar-sweetened beverage" does not include any of the following:
(A) Any beverage containing 100 percent natural fruit juice or natural vegetable juice with no added caloric sweeteners.
(B) Any liquid product manufactured for any of the following uses and commonly referred to as a "dietary aid":
(i) An oral nutritional therapy for persons who cannot absorb or metabolize dietary nutrients from food or beverages.
(ii) A source of necessary nutrition used as a result of a medical condition.
(iii) An oral electrolyte solution for infants and children formulated to prevent dehydration due to illness.
(C) Any product for consumption by infants and that is commonly referred to as "infant formula."
(D) Any beverage whose principal ingredient by weight is milk. "Milk" means (i) natural liquid milk, regardless of the animal source, plant source, or butterfat content, (ii) natural milk concentrate, whether or not reconstituted and regardless of animal source, plant source, or butterfat content, or (iii) dehydrated natural milk, whether or not reconstituted and regardless of animal source, plant source, or butterfat content.
(k) "Syrup" means a liquid mixture with added caloric sweetener used in making, mixing, or compounding a sugar-sweetened beverage by mixing the syrup with any one or more other ingredients, including, without limitation, water, ice, a powder, simple syrup, fruits, vegetables, fruit juice, vegetable juice, or carbonation or other gas.
(l) "Unsealed beverage container" means a beverage container into which a beverage is dispensed or poured at the business premises where the beverage is purchased, including, without limitation, a container for fountain drinks.

As used herein, the term "controlled ingredient" is intended to mean a food or beverage product ingredient that is either subject to FDA recommended daily maximum or minimum values with an understanding that such ingredients should be limited to a maximum or minimum represented by such values, as circumstances dictate, or is known to impart health, safety, adverse side effects, and/or adverse drug or herbal supplement interactions, particularly if consumed in quantities exceeding generally recognized safe amounts. "Controlled ingredients," as that term is used herein, thus includes, without limitation, alcohol, sugar, (both added and naturally occurring) fat, sodium, caffeine, saturated fat, trans fat, cholesterol, gluten, aspartame, vitamins, minerals, protein, etc.

Figure 6:
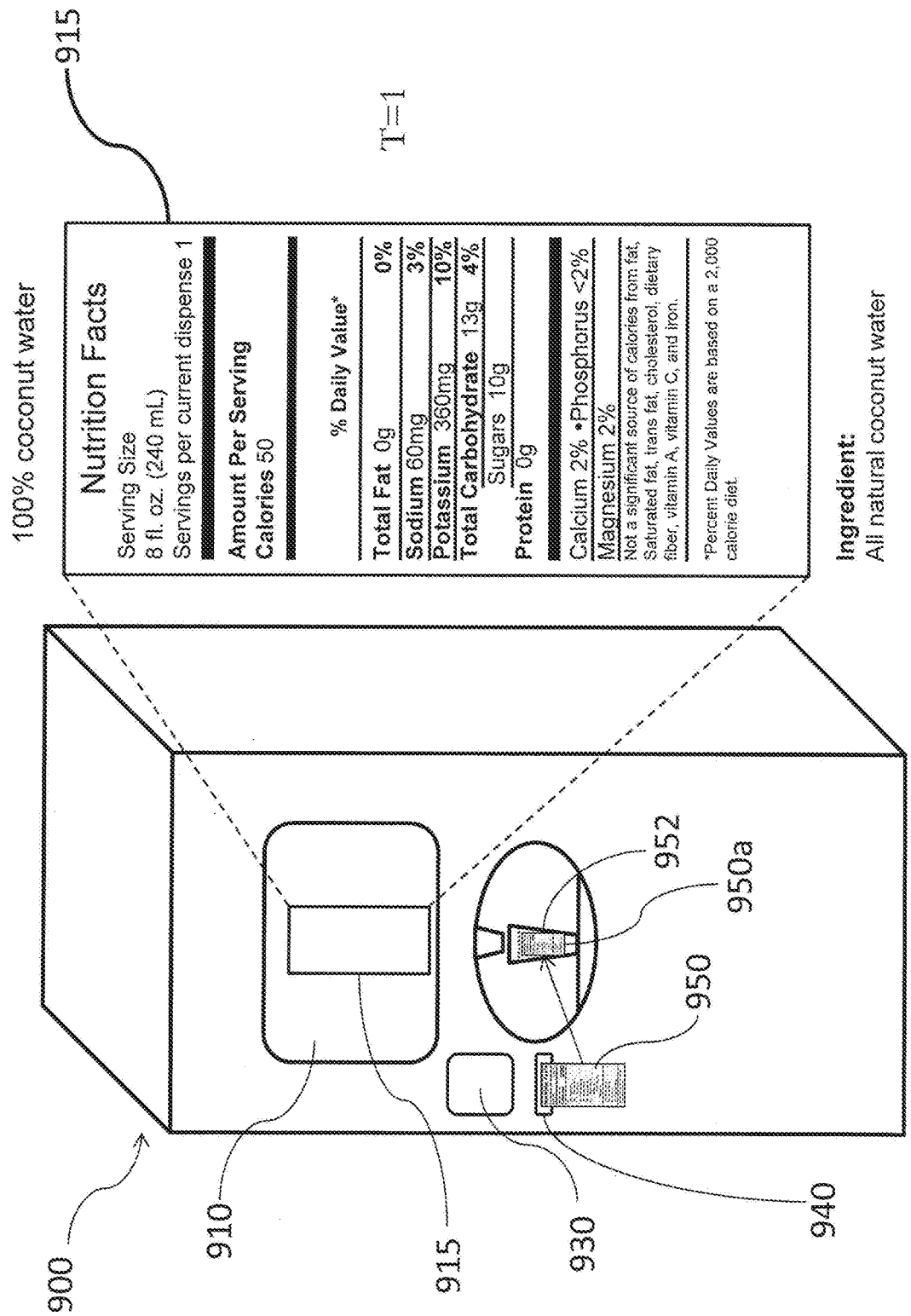
FIG. 6 illustrates another schematic representation of systems, methods and/or apparatus of the present disclosure.

In one aspect of the disclosure, illustrated in FIG. 6, a product dispenser or vending machine, generally 900, may be configured with a display panel 910 that may provide nutrition information 915 to a consumer who wishes to dispense product from such machine. Except as modified or improved upon by the teachings herein, such product dispenser 900 and associated methods and systems may, for example, be of substantially the form illustrated and described in U.S. Pat. No. 8,744,618, incorporated in its entirety by reference herein. In this aspect, the vending machine or product dispenser, generally 900, may be generally of the form previously described, and may include a display 910 configured to display information related to the products to be dispensed therefrom. The display 910 may, but need not, also comprise graphical user interface or "touch screen" technology to enable a user to make product selections. The display 910 may, as illustrated, be integral with the vending machine or product dispenser 900, but may in alternative embodiments be separate from, but still proximate the vending machine or product dispenser 900. Moreover, although the disclosure herein, for purposes of convenience, discusses the display 910 with reference to a display connected to the vending machine or product dispenser 900, it should be distinctly understood that the display 910 need not be so connected, and is intended to include any user interface that may communicate with the vending machine or product dispenser 900, including interfaces configured to communicate with the vending machine or product dispenser remotely, for example, via a mobile device display, a cell phone app, a remote display, and the like.

In one aspect, the display 910 may be configured to display a product "Nutrition Facts" label 915 that may meet current and/or future FDA requirements for packaged products and/or may meet future FDA or other governing bodies' requirements for vending machine or product dispenser product labeling. The product label 915 illustrated in FIG. 6 contains current information from the Nutrition Facts label for packaged Zico® coconut water, and is illustrative only.

As illustrated in FIG. 6, at time T=1, i.e., following selection of a product to be dispensed from the vending machine or product dispenser 900, the display 910 may display the product attributes of the product selected, assuming an 8-ounce serving will be dispensed. In another aspect of the disclosure, such information may be displayed in real time, for example, at time zero showing that 0 calories have been dispensed, (or showing a virtual label 915 of how many calories, or other nutrition facts would be dispensed in a single serving); at time 2 seconds after dispensing has begun that 5 calories, 1 grams sugar, 6 milligrams of sodium, etc., have been dispensed, and at time 4 seconds 10 calories, 2 grams of sugar, and 12 milligrams of sodium, etc. have been dispensed. This aspect is further illustrated in FIGS. 7 and 8, which are intended to represent other times, i.e., T=2 and T=3, respectively of a product dispense operation.

In this way, a product dispenser, whose serving size may only be limited by the size of the receptacle into which product is being dispensed, may display in real time precisely how much of one or more ingredients, nutrients, or other product attributes are being dispensed. A consumer thus may be fully informed at the point of sale as to exactly what is being dispensed. Moreover, vending machines, such as the Coca-Cola Freestyle machine and the Pepsi Spire machine, may be configured with appropriate lookup tables permitting the machine to determine, based on the known ingredients, ingredient ratios, and other recipe specific information for the products being dispensed, precisely how much of any ingredient and/or nutrient is contained in any formulation of its products, whether dispensed as formulated by the seller of such products, or whether dispensed as reformulated by the consumer. Therefore, even if a user of such machines is permitted to blend his or her own mix of product, the vending machine may be configured to determine precisely the amount of calories, sugar, etc., contained in the product being dispensed, and/or to display such amounts in real time during the dispensing operation.

Such an operation may be conducted, for example, by first determining the amount of an ingredient contained in a known volume or weight of a product to be dispensed, for example, "Brix" (Degrees Brix (symbol ° Bx) is the sugar content of an aqueous solution. One degree Brix is 1 gram of sucrose in 100 grams of solution and represents the strength of the solution as percentage by weight (% w/w). If the solution contains dissolved solids other than pure sucrose, then the ° Bx only approximates the dissolved solid content). If, for example, a product manufacturer knows the grams of sugar per milliliter of a product formulation of interest, the vending machine or product dispenser 900 may be configured to access a lookup table or other database where such information is stored. The vending machine or product dispenser may be further configured to determine, based on recipe information, ingredient, nutrition, and other information even for custom blends. For example, if a consumer wishes to blend a 50%-50% mix of regular Coke and diet Coke, the vending machine may be configured to determine that the resulting pour would contain exactly half the ingredients, calories, and nutrition of each of regular Coke and diet Coke's formulations, and to display the resulting product reformulation attributes. Other combinations are of course possible.

The vending machine or product dispenser 900 may be further configured to determine the rate at which the product is being dispensed, i.e., ml/second, using known flow control, volumetric measuring or weighing apparatus. From this information, the vending machine or product dispenser 900 may be further configured to determine, for example the grams of sugar being dispensed per unit of time. From this information, the vending machine may be further configured to determine in real time the grams of sugar being dispensed, for example, in the selected pour of beverage. This same procedure may be employed for determining other product parameters, such as total calories, calories dispensed per unit of time, amount of controlled ingredients being dispensed per unit of time, % of Daily Value of ingredients being dispensed in real time, etc. This information, in turn, may be displayed on the vending machine display, in real time, for example, as virtual Nutrition Facts labels 915, as illustrated in FIGS. 6, 7, and 8.

As is known, product dispensers such as the Coca-Cola Freestyle vending machine are configured to allow a user of the machine to halt the dispensing operation, for example, when a receptacle into which the product is being dispensed is full, or partially full. But even if the user knows the size of a cup into which a product is being dispensed, and the calories per serving of a dispensed product, the user may not be able to accurately determine product information such as total calories dispensed, for example, if only a portion of the cup is filled. Similarly, as is known, product dispensers such as the Coca-Cola Freestyle machine and the Pepsi Spire machine allow users of such machines to halt dispensing a first selected beverage and initiate dispensing of a second, third, etc., beverage into the same receptacle for customized mixing.

Currently, however, there is no way for a user to know precisely the total quantity of ingredients or calories are dispensed into such a customized mix. Accordingly another aspect of the present disclosure comprises a system, method, and apparatus whereby the vending machine or product dispenser 900 may be configured to enable a user to halt dispensing a first product from the dispenser and halt the real time information, for example, a virtual Nutrition Facts label 915, from progressing commensurate with halting the dispensing of the first product, as illustrated at time T=2 of FIG. 7. The vending machine or product dispenser 900 may be further configured to enable a user to initiate, after halting dispensing of the first product, dispensing a second product from the dispenser, and to display in real time an updated virtual Nutrition Facts label that displays a summation of real time information attributable to the first product and real time information attributable to the second product. Such summation may be achieved using known summation programs based on the known product attributes for the products being dispensed, as well as the quantity and rate of product dispense. At any time the dispensing operation is halted, the displayed quantities may be represented as follows:

$$\Sigma_{first} \text{ dispensed product attribute(s)}^+$$
$$\Sigma_{second} \text{ dispensed product attribute(s)}^+$$
$$\Sigma_{all} \text{ subsequent dispensed product attributes}=$$
$$\Sigma_{final} \text{ dispensed product attribute(s)}$$

Where the dispensed product attributes comprise, for example, calories, grams of sugar, grams of added sugar, etc., being dispensed at any point in time. It is to be understood that this summation technique may be used to sum the total dispensed product attributes for any number of different products being dispensed or any number of halting/initiating sequences.

Another aspect of the disclosure is illustrated in FIGS. 11-14. In this aspect, a product dispenser, such as a Freestyle-type dispensing machine, may be configured to enable a consumer to vary not just the proportion of different pre-formulated products being blended with one another, but also, or in the alternative, may be configured to enable a consumer to vary one or more ingredients in a product mix selected by the consumer. As an example, assume a Coca-Cola Freestyle vending machine offers for sale the newly launched Coca-Cola Life beverage. The consumer may be provided information, in real time, as set forth in FIGS. 6,7, and 8 concerning Nutrition Facts for such beverage, assuming it is dispensed in the standard formulation for the beverage.

But the consumer may be advantageously given the ability to reformulate the beverage (or other product) to his or her liking. For example, if the consumer is advised that the Coca-Cola Life beverage contains, based on a 330 ml serving, 89 calories, and 25 grams of sugar, but the consumer would prefer more (or less) sugar, according to an aspect of the present disclosure, the consumer may be enabled to "dial in" the sugar content desired to be dispensed from the beverage dispenser. This may be achieved using known formulation parameters, including grams of sugar per unit volume of sugar sweetener used at the beverage dispenser and known flow control, volumetric control, or weight control metering equipment, to vary the amount of sugar dispensed in response to the consumer's custom mix dispense request.

But if the consumer requests a product dispense formulation that varies from the standard mix in any way, with no limitations, the resulting product as dispensed may exhibit undesirable taste profiles that could be both unpleasant to the consumer and reflect poorly on the brand of product being dispensed. For this reason, if the consumer is given the option to create his or her own product mix, it may be advantageous for the dispensing equipment to include an ingredient compensator module configured to compensate for variations in taste profile occasioned by the requested custom formulation change. For example, assume that a consumer requests a Coca-Cola Life beverage to be dispensed from a Freestyle-type dispenser, but requests that the product to be dispensed contain only half of the normal sugar amount, in this example, 25 grams. The ingredient compensator module may be configured to determine that 12.5 grams of sugar per 330 ml of product being dispensed should be blended with enough additional stevia leaf extract to compensate for the loss of sweetness due to the halving of sugar content. The ingredient compensator module might be further configured, in particular cases, to further compensate for taste profile changes (for example, the anticipated aftertaste of added stevia leaf extract) by adding additional sweeteners to the sweetener system, for example, erythritol, aspartame, ace-K, perhaps giving the consumer the option concerning selecting which additional sweetener to add and/or avoid. For example, some people (for example those with Phenylketonuria (PKU)) should not consume aspartame, and the product dispenser or related system might, upon the consumer selecting a product formulation including aspartame, be queried to so advise the consumer and insure that the consumer does not have PKU or is otherwise not adverse to consuming aspartame.

The ingredient compensator may employ created or known taste profile maps or similar data for different brands or ingredients in order to most closely approximate the consumer's selected reformulated product to the taste profile of the original brand being dispensed. Such taste profile maps are commonly used in the food and beverage industry to map and compare the taste profile of different products and compare the relative taste prominence of different taste attributes or flavor notes within a given product. For example, a soft drink beverage might include as taste attributes or flavor note parameters such as "citrus," "sweetness," "salt," "bitter," etc.

Figure 11:
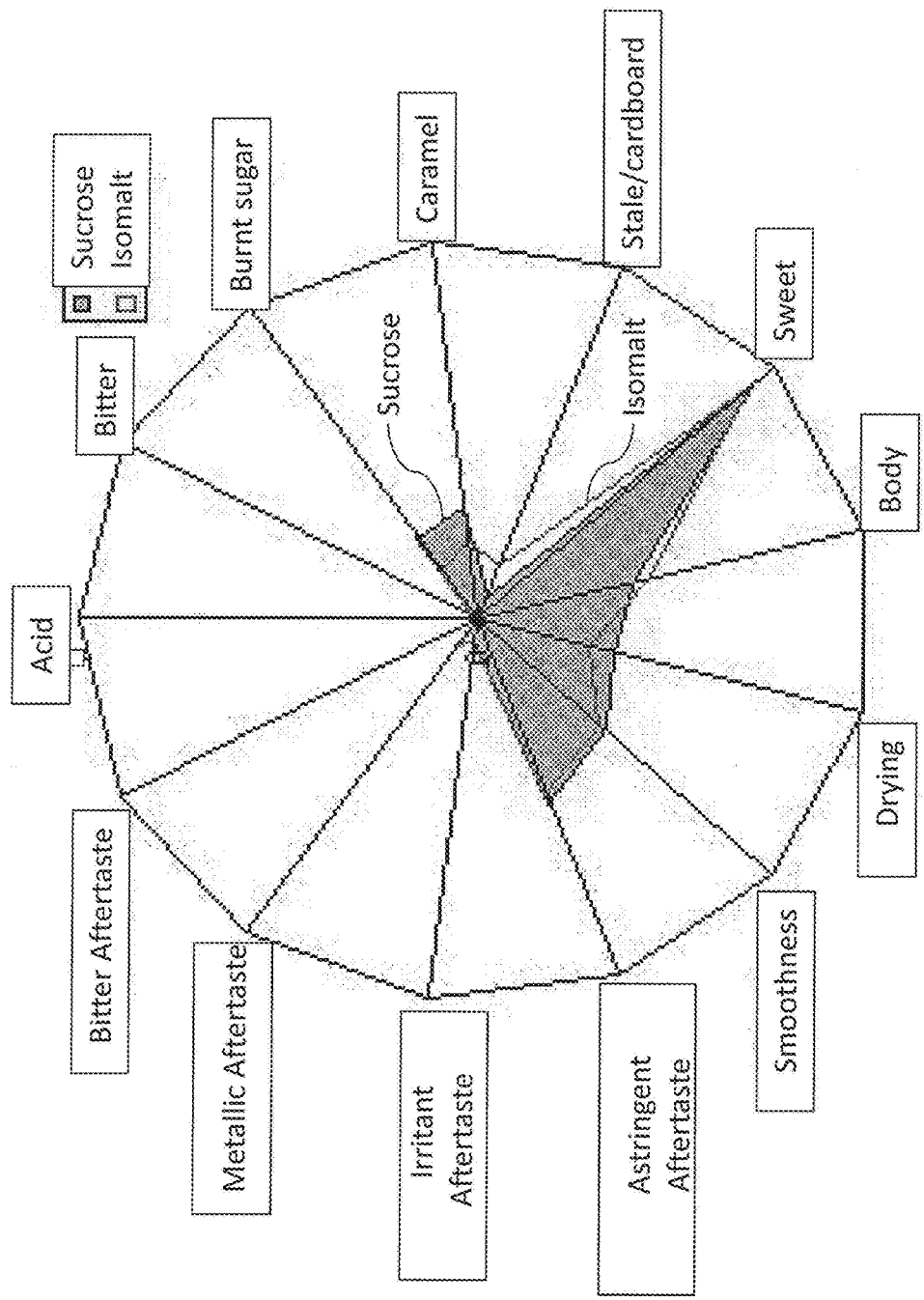
FIG. 11 illustrates a taste profile for an ingredient, isomalt, showing various flavor notes.

An exemplary taste profile map is illustrated in FIG. 11, in this case, comparing a taste profile for sucrose to a different sweetener, isomalt, a low-calorie sugar alcohol and a sugar substitute that has about half the calories of sucrose, has a low impact on blood sugar, and does not promote tooth decay. But as with many sugar substitutes, isomalt has its own drawbacks, including a tendency, when used above certain levels, (50 grams per day for adults, 25 grams per day for children) to promote flatulence and diarrhea. Thus, it may be desirable, when using an ingredient compensator such as taught herein, to limit certain ingredients used to compensate for other ingredients to levels that are safe, effective, and/or below threshold amounts known to cause adverse reactions.

The ingredient compensator module may include, in addition to or in place of taste profile mapping data such as illustrated in FIG. 11, a database or formulation lookup table, such as that illustrated in Table 1 below, to be used by a product dispenser or associated system in determining a preferred reformulated product formula in response to a consumer requesting a formulation or ingredient change relative to a standard formulation. In this example, product example 1 represents the standard formulation for Coca-Cola Life, for a 330 ml serving, reported to have 25 grams of sugar and stevia leaf extract in unreported amounts, but represented in Table 1 as "x" milligrams. As illustrated, the standard Coca-Cola Life product would be expected to have no other sweetener, but would be expected to also contain other ingredients, such as caffeine, represented as "y" milligrams.

At the point of sale, on a mobile device containing a smart phone app such as a modified Freestyle smart phone app, or on a display for a dispensing machine such as a Freestyle vending machine, a user may be given an opportunity to purchase a standard beverage such as example 1 illustrated in Table 1. The mobile device or dispensing machine display may be configured to disclose, as described herein, relevant "Nutrition Facts" information for such a product, such as calories per serving, serving size, grams of sugar, grams of added sugar, etc., for example, on a "virtual" Nutrition Facts label such as illustrated in FIGS. 7-10. At this stage of the dispensing operation, the user may be queried or otherwise given a cue to reformulate the offered or displayed beverage, for example, by reducing the grams of added sugar, reducing the calories, etc. Such reformulation cue might take the form similar to the current Freestyle smart phone app "favorite" and "mix" modules, but with the added functionality of permitting the consumer to customize not just flavors, but nutritional parameters of the resulting formulation such as calories and/or sugar, caffeine, salt, or other ingredient content. Alternatively, such reformulation cue might take the form of a query following an initial product selection, appearing on the dispenser display 910, in an information box, for example, as illustrated as element 915 in FIGS. 6 and 12. While the information box 915 in FIG. 6 is illustrated as containing Nutrition Information, it may alternatively contain other information such as warning messages, and user interface indicia, such as buttons 916, 917, 918, enabling a user, for example to understand how much sugar (or calories or other ingredients) a serving size of a requested product contains, and to, for example, select to reduce the amount of added sugar using interface 916, increase the amount of added sugar using interface 917, or dispense to product as formulated, using interface 918. In one aspect, the information box 915 may, depending upon the button 916, 917, or 918 selected, respond with either positive or negative reinforcement depending upon the selection. For example, if the user interface 916 is selected, indicating the user wishes to decrease the amount of added sugar, the information box may be configured to convey a message such as "Good for you. Some organizations, such as the World Health Organization, recommend reducing the amount of added sugar in your diet." Conversely, if user interface 917 is selected, the information box 915 may be configured to convey a negative reinforcing message, such as "Are you sure you want to increase the amount of added sugar? Some organizations, such as the World Health Organization, recommend reducing the amount of added sugar in your diet to no more than 25 grams per day." In this case, the information box may indicate an opportunity for the consumer to change his or her mind or to proceed with the selected beverage, for example, with appropriate graphical user interface buttons. The beverage dispensing machine may thus be configured, in response to a request received from a consumer that the beverage dispensing machine dispense a sugar-sweetened beverage, to initiate a query, prior to dispensing the sugar-sweetened beverage, asking if the consumer would consider as a substitute for the sugar-sweetened beverage a beverage that is not sugar-sweetened. Other types of similar messaging are of course possible. Also, such positive or negative (or neutral) reinforcing messaging need not be displayed with graphics, rather, may be transmitted audibly, via a prerecorded voice message. While the examples herein are illustrated with reference to beverage dispensing machines, it will be understood that the teachings herein are intended to apply to any product dispenser, i.e., food, beverage, personal care products, electronics, gasoline, etc.

As illustrated in FIG. 12, the message box 915 may be configured to transmit a warning. In this case, the warning states "Recent reports suggest that adults should consume no more than 25 grams of sugar per day," and is transmitted visually. Other transmission messages (for example, a warning similar to that proposed in California Senate Bill 1000) and other methods of transmitting warnings are possible. For example, audible warnings such as prerecorded messages, non-verbal audible warnings such as sirens, flashing lights, etc., may be employed to convey a sense of urgency in the appropriate situation.

Table 1

| Product Example | Standard formula grams sugar | Standard formula milligrams stevia extract | Standard formula milligrams aspartame | Standard formula milligrams acesulfame potassium | Standard formula grams isomalt | Standard formula milligrams caffeine | Calories | Cal per ml |
|---|---|---|---|---|---|---|---|---|
| 1 | 25 | x | 0 | 0 | 0 | y | 89 | .27 |

| | Reformulated grams sugar | Reformulated milligrams stevia extract | Reformulated milligrams aspartame | Reformulated milligrams acesulfame potassium | Reformulated grams isomalt | Reformulated milligrams caffeine | | |
|---|---|---|---|---|---|---|---|---|
| 2 | 20 | 1.25x | 0 | 0 | 0 | y | 71 | .22 |
| 3 | 15 | 1.67x | 0 | 0 | 0 | y | 53 | .16 |
| 4 | 10 | 1.67x | a | 0 | 0 | y | 36 | .11 |
| 5 | 5 | 2.0x | 0 | 0 | b | y | 27 | .08 |
| 6 | 0 | 2.0x | c | d | e | f | 18 | .05 |

Where x, y, a, b, c, d, e, and f are variables selected by the original product formulator, generally the brand owner of the product being dispensed.

If, for example, in response to a query asking a consumer if reformulation of the selected product is desired, the consumer requests that the product be reformulated to contain less added sugar, the dispenser may access a reformulation database that may contain pre-approved alternative formulations that meet acceptable taste profiles for the brand in issue. In this example, various such pre-approved reformulations may be displayed, for example with a table such as Table 1, for the consumer to choose from. The formulations illustrated in Table 1 are illustrative only, and not intended to represent actual formulations or actual calorie count for any product, but merely to demonstrate how the methods, systems, and apparatus of the present disclosure may be configured and advantageously employed.

In this regard, Table 1 is intended to illustrate a product reformulation lookup table that may be either visible or not visible to the consumer. If visible, the table may comprise graphical user interface functionality enabling the user to select from the displayed products, i.e., Product Examples 1-6. Such selection may be based, for example, on the consumer determining the sugar content or caloric content per serving he or she is willing to dispense. As previously described, whether or not the product reformulation lookup table (or other similar reformulation data) is visible to the consumer, the dispensing machine 900 may be advantageously configured to display, either on the display 910, whether on the dispensing machine 900 or on a remote display 910, i.e., on a mobile device such as the user's smart phone, in real time, information concerning the product being dispensed, such as sugar, calories, etc.

Alternatively, for example, where a product reformulation lookup table or similar database is not visible to the consumer, the consumer may simply be queried, following receipt of an affirmative response to a reformulation query, how many calories per serving or how much added sugar per serving is desired, in any convenient increment, for example, 10's of calories, grams of sugar, etc. The dispenser may then be configured, upon receiving the desired reformulation parameter, to access an appropriate lookup table or other database to determine what blend of ingredients should be used to match the requested product reformulation parameter to an acceptable taste profile for the brand to be dispensed.

Figure 13:
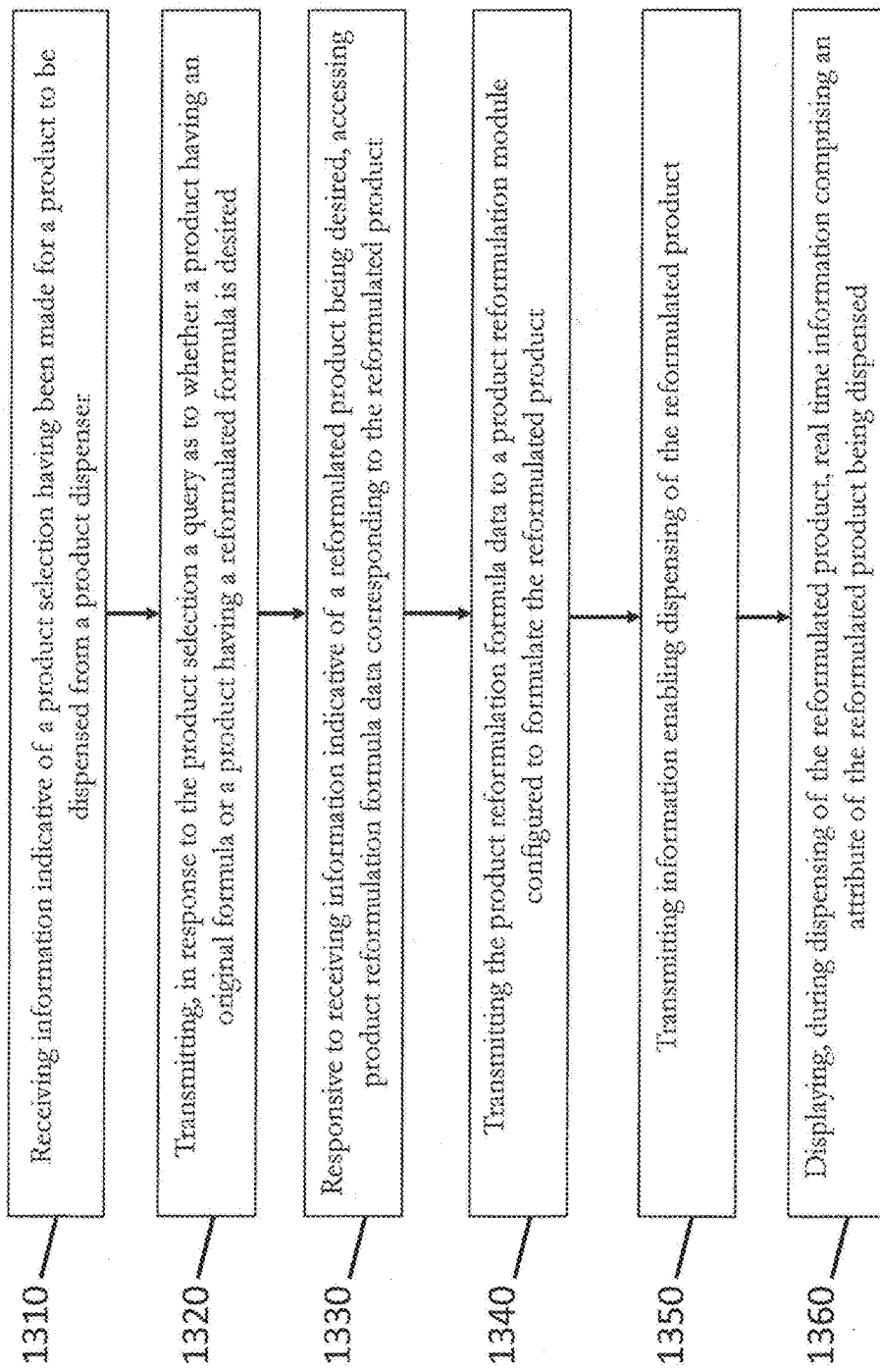
FIG. 13 illustrates a block diagram representative of methods, systems, and apparatus for reformulating products according to the present disclosure.

Referring now to FIG. 13, there is illustrated a flow chart for a method of practicing an embodiment of the present disclosure. Some of all of the methods disclosed herein may be implemented by a system, network, product dispenser, handheld device, combinations thereof, and/or associated components. While such systems, methods, and apparatus are, for convenience, described in general with reference to a product dispenser 900 configured to dispense products for immediate consumption, it will be understood that such teachings may be employed in other contexts, for example, by a consumer requesting that a product formulator blend a custom mix at a remote location, package the custom mix, and ship it to the consumer.

In the example illustrated in FIG. 13, at operation 1310, information indicative of a product selection having been made for a product to be dispensed from a product dispenser may be received. Such information may, for example, take the form of a product selection being made on a mobile device such as a smart phone that may communicate with a product dispenser as previously described, or may, as another non-limiting example, take the form of information received by a product dispenser via a user interface such as a touch screen on a dispensing machine such as a Coca-Cola Freestyle dispensing machine. Such selection may further be made using, for example, a scanned code received by a scanning device associated with the dispenser, represented as element 930 in FIG. 6.

At operation 1320, in response to the product selection, a query as to whether a product having an original formula or a product having a reformulated formula is desired may be transmitted. For example, such information may be transmitted in a form similar to that illustrated in FIG. 12, via a display such as the display 910 on the product dispenser 900, or on a smart phone display using an app such as the Coca-Cola Freestyle smart phone app, which may be in communication with the dispenser 900. In this aspect, the query may be transmitted to an intended recipient, such as a consumer who has accessed the dispensing machine 900.

At operation 1330, responsive to receiving information indicative of a reformulated product being desired, product reformulation formula data corresponding to the reformulated product may be accessed. As previously described, such product reformulation data may take the form of a product reformulation lookup table or other database. Such database may be housed as local memory associated with the dispensing machine, may reside on a remote network, or may reside on a server. In any case, the product reformulation data may be accessed by a processor or controller in order to provide instructions for blending and dispensing a desired mix of ingredients in the proper ratios.

At operation 1340, the product reformulation formula data may be transmitted to a product reformulation module configured to formulate the reformulated product. Such transmission may occur through wired or wireless connections, and may involve a processor that is configured to translate information from the product reformulation formula data to instructions that the product reformulation module may act upon in order to mix and dispense the reformulated product.

Figure 14:
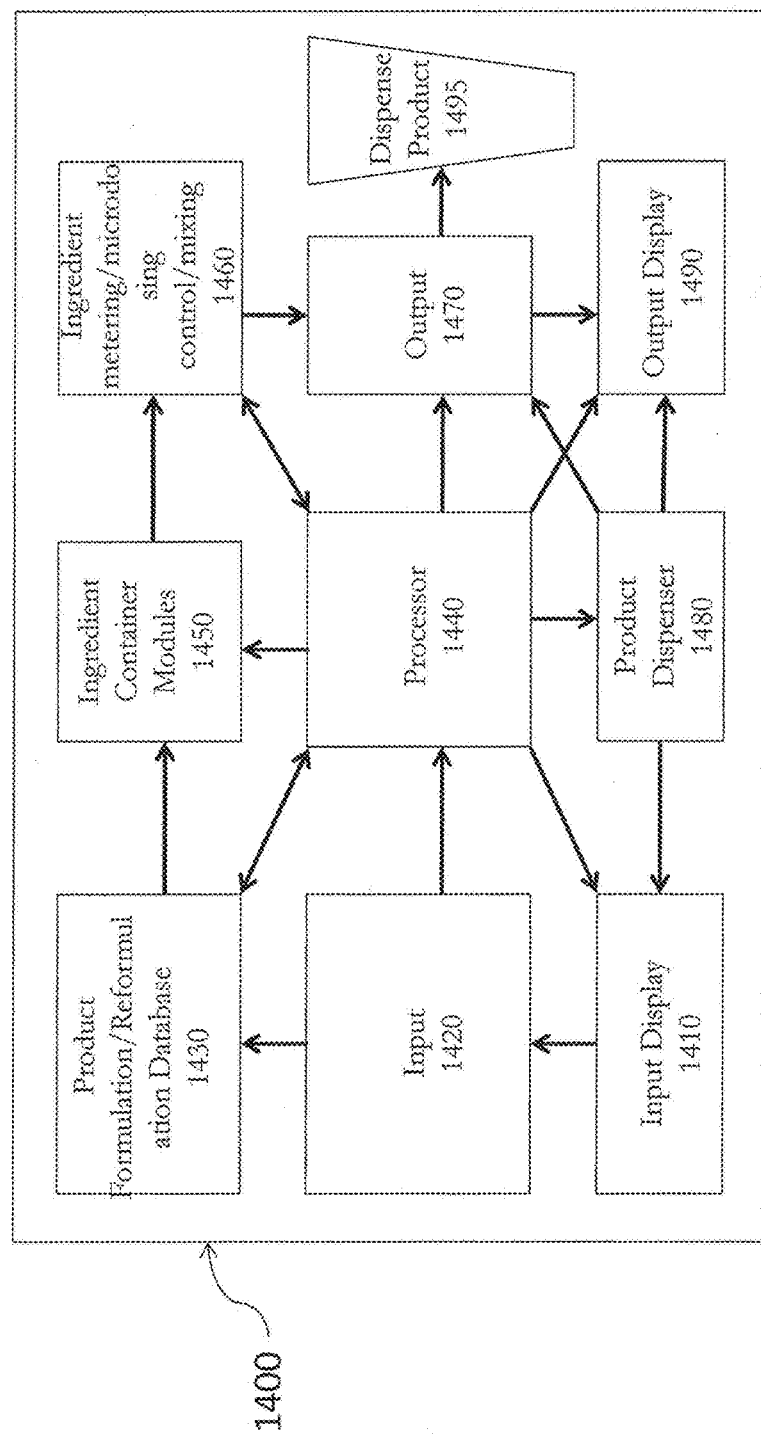
FIG. 14 illustrates a schematic product formulation/reformulation module that may be used according to various methods, systems, and apparatus of the present disclosure.

In this regard, an exemplary product formulation/reformulation module generally 1400 is illustrated in FIG. 14. It should be understood that this product formulation/reformulation module is exemplary only, and that the sub-modules illustrated may be separated into additional modules and/or combined with other illustrated modules. While modules as illustrated communicate in one direction or in both directions between communicating modules, such communications are illustrative only and not exclusive of other communication paths including paths not shown between modules. Because the formulation/reformulation module of FIG. 14 is illustrative only, it will be understood that other versions thereof, comprising fewer or more sub-modules than those illustrated are possible and within the scope of the present disclosure.

In this aspect, the product formulation/reformulation module 1400 may comprise an input display module, 1410, which may comprise a user interface such as previously described configured to receive and communicate inputs, via an input module 1420, for example a product selection module. The input module 1420, i.e. product selection, may be communicated to a product formulation/reformulation database 1430, and/or may be communicated to a processor or controller, 1440, for further processing. The product formulation/reformulation database 1430 may reside in memory associated with the product dispenser, may reside on a local and/or remote server, on a network, or any other convenient location or data storage/processing resource. The database 1430 may include, for example, product formulation lookup tables or similar databases that correlate the product selected via the input display module 1410 to an actual product formula(s), such as illustrated in Table 1. As the selected product and/or product formula is communicated to the processor or controller 1440, the processor or controller, in turn, may communicate formulation information to one or more ingredient container modules 1450, such as micro-dosing pumps associated with ingredient cartridges, pumps associated with bag-in-box containers, or other ingredient storage devices conventionally used, for example with the Coca-Cola Freestyle dispenser and other similar product dispensers.

Based on this communicated formula information, the ingredient container modules 1450 may receive instructions to dispense predetermined quantities of ingredients matching the communicated product formulation parameters. Such ingredient dispensing may be achieved using known apparatus and control systems, which may comprise, for example, ingredient metering, micro-dosing, controlling, and mixing devices, such is pumps, tubing, nozzles, valves, and the like, represented as control module 1460. Such control module 1460, and/or processor 1440 may, however, unlike conventional apparatus, be configured and/or programmed to monitor the product being dispensed in real time, correlating, for example, the volumetric flow rate and or quantity of product being dispensed with known product parameters, such as calories per unit volume, grams of added sugar per unit volume, milligrams of caffeine per unit volume, etc., in order to determine, in real time, product parameters or attributes, such as calories dispensed, in real time. Such determinations may be made, for example, employing lookup tables or other databases similar to that shown in Table 1, which illustrates just one such product attribute or parameter for convenience, i.e., calories per ml.

The processor 1440 may instruct the metering/dosing/mixing control module 1460 to formulate and mix the desired product formulation, and may in turn instruct the dispensing thereof as one of the outputs 1495 via the product dispenser module 1480, which may comprise known dispenser mixing/dispensing valves. This may comprise an operation as illustrated in FIG. 13 as operation 1350. Simultaneously, the processor 1440 may instruct an output module 1470 to transmit in real time information relevant to the product dispensing operation, such as graphical information that may be displayed on an output display module 1490. This operation is schematically illustrated in FIG. 13 as operation 1360. It should be here noted that the input display module 1410 and output display module 1490 may comprise the same interface, i.e., the display 910, or may comprise different, but communicating interfaces, such as a dispensing machine display and a user's mobile device display. Such real time graphical information may, for example, comprise a virtual "Nutrition Facts" label that may display, in real time, one or more, or even all, of the relevant product information required by the FDA to be displayed on static, hard copy labels applied to packaging for similar products. Such real time displays may, similar to a gas pump display that shows both gallons dispensed and price of product dispensed in virtually real time, display product attributes like quantity, calories, grams of added sugar, etc., on such a virtual Nutrition Facts label in real time, as illustrated in FIGS. 7 and 8.

In this example, if the calories per unit volume, i.e., calories per ml are known and accessible via the lookup table or other database 1430, and the volumetric flow rate of product being dispensed, for example, ml/second, or total quantity dispensed, for example, ml, is known, for example, by virtue of the control module 1460, and/or the product dispenser module 1480, then the calories dispensed per unit time, i.e., calories per second, can be determined, i.e., via the processor 1440, and using known summation techniques, total product attributes, for example, total calories dispensed can be determined and displayed in substantially real time via the output display module 1490. The same technique can be used for every other ingredient or nutrition attribute on the virtual Nutrition Facts label, as illustrated in FIGS. 7 and 8. In this way, a consumer may be informed of the quantity of product attributes, such as calories, grams of added sugar, milligrams of caffeine, milligrams of salt, etc., being dispensed in real time, continuously, until the dispensing operation is halted, and the consumer may therefore be in an improved position to halt the dispensing operation once one or more of the real time-displayed product attributes have reached a desired quantity.

Currently, those wishing to monitor their caloric intake can access smart phone applications such as "Lose It!" for such purposes. Such apps permit a user to scan packaged food bar codes in order to upload the food or packaged beverage's calorie count to the user's calorie count consumption data. But such apps have no ability to readily determine or account for dispensed products such as beverages from fountain type dispensers, particularly those dispensed in a customized mix.

In another aspect of the disclosure, a product dispenser or vending machine may be configured to receive information indicative of a calorie count target specific to a user of the vending machine, and to provide, following dispensing of a food product, updated calorie count information. This aspect may be provided, for example using known weight loss and calorie counting apps, such as "Lose It!" People using such apps are generally given a daily calorie target based on a predetermined weight management protocol, i.e., maintaining current weight, losing one pound per week, etc. Such apps currently require the user to either manually enter calorie data or scan a bar code on product packaging to upload such data.

In this embodiment, the product dispenser or vending machine may be configured to communicate, i.e., wirelessly, with a user's calorie counting app or other calorie counting module, and upload information pertaining to a product being dispensed from the vending machine, such as calories dispensed, in order to update the user's calorie count or calorie target for the day and/or to provide updated calorie count information to the user, without the user needing to scan a product or manually calculate or determine calorie data. Such calorie count update may be transmitted to the user's calorie counting app in total, on the assumption that the user will consume the entire dispensed number of calories, or, alternatively, such information may be transmitted to a "holding" location on the user's calorie counting app, enabling the user to record the calories dispensed from the vending machine, but only record the calories consumed based on the portion of the dispensed product actually consumed. The updated calorie count information transmitted by the product dispenser or vending machine to the user and/or the user's calorie counting app may comprise a comparison of calories dispensed from the product dispenser or vending machine and the user's calorie count target. For example, assume that a user using the "Lose It!" app has a daily calorie target of 2010 calories, and has already consumed 1950 calories that day. Assume further that a vending machine such as disclosed herein is configured to (for example, by the user giving permission) access the user's "Lose It!" app for purposes of determining the user's daily calorie target and/or how many calories the user has consumed that day. Assume further that the user requests the vending machine to dispense a can of regular Coke, comprising 140 calories per 12-ounce serving. The vending machine may be configured to determine that if the user consumed a standard 12-ounce serving, the user in this case would exceed his or her daily calorie target by consuming 2090 calories that day, i.e., 1950+140. In this example, the vending machine may be configured, for example, to warn the user that his or her calorie target is about to be exceeded, to query the user whether a low or no-calorie substitute is desired, or both. If the user chooses to dispense the 140-calorie product, the vending machine may communicate with the user's calorie counting app and upload 140 calories to the user's daily calorie count and sum the total.

Thus the methods and apparatus of the disclosure may comprise a system comprising a product dispenser configured to dispense a calorie-containing product, and to communicate a calorie count for the calorie-containing product to a calorie count app, such as "Lose It!," comprising calorie count data specific to a user, upon the user requesting that the product dispenser dispense the calorie containing-product. The system may further be configured to update the user's calorie count data to include the calorie count for the calorie-containing product. The product dispenser may be configured to communicate with the user's calorie counting app, for example, by the user granting the product dispenser permission to gain access thereto for purposes of accessing and/or updating the user's calorie count data.

The user's calorie count data may comprise a daily calorie target specific to the user and a current day's calorie count for the user. The product dispenser may further be configured to compare the calorie count for a calorie-containing product requested by the user to the user's daily calorie target, and to determine if, by consuming the calorie-containing product, the user would exceed the daily calorie target, to provide an alert to the user. Such alert may comprise, for example, providing information indicating a number of calories by which the user will exceed the user's daily calorie target if the user consumes the calorie-containing product requested by the user. If so, the system may further be configured to query the user if a lower calorie product (or no calorie product) is desired as a substitute.

Figure 15:
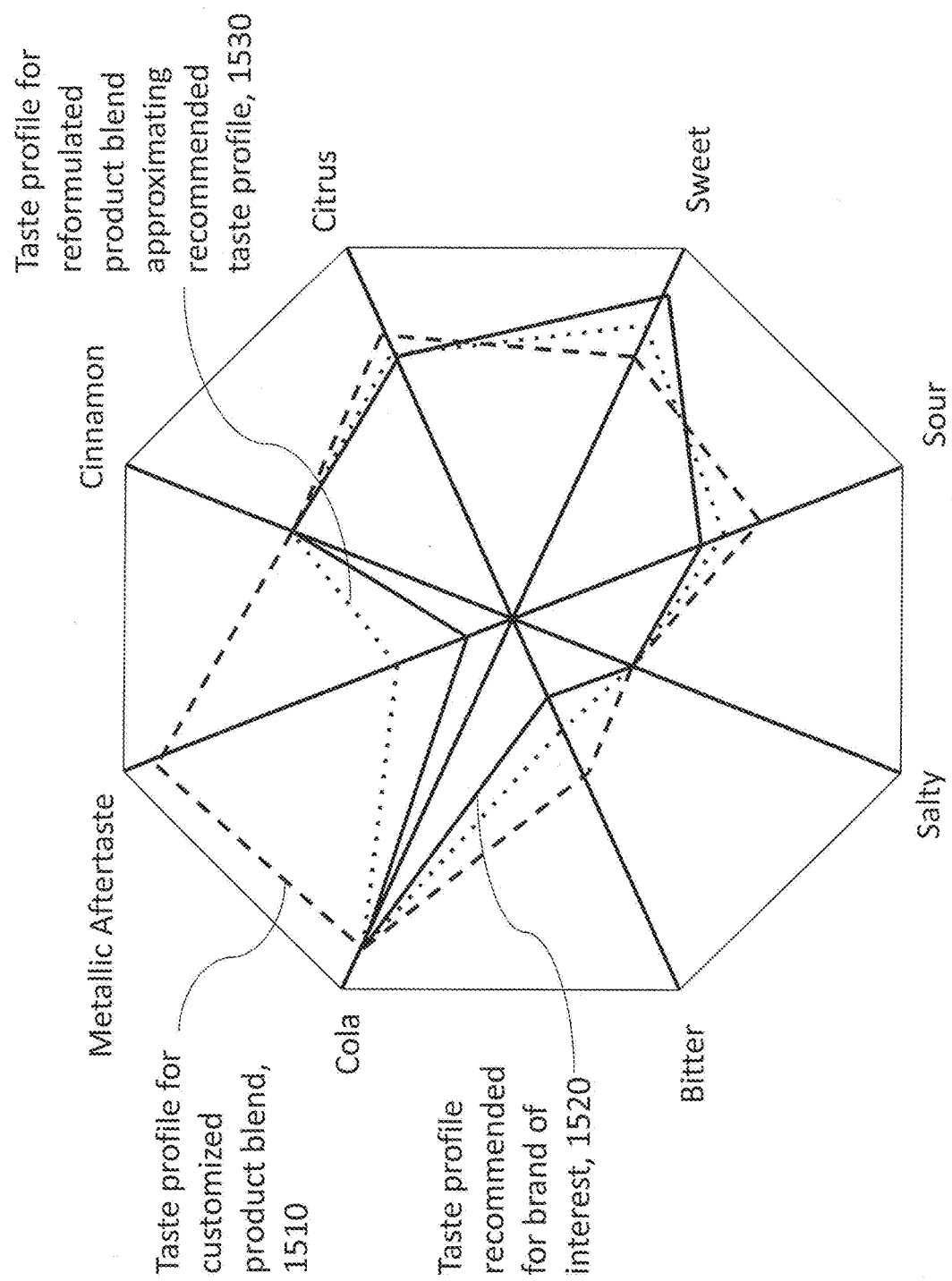
FIG. 15 illustrates a hypothetical taste profile map representing a customized product, a standard product, and a reformulated product having a taste profile approximating the standard product.

Another aspect employing the teachings herein is illustrated in FIG. 15. FIG. 15 illustrates product profile mapping, such as taste profiles for products using eight theoretical taste parameters. In this example, relative strength of any particular taste parameter is indicated by how far from the center of the map a particular product taste parameter or flavor note resides, the farther from the center, the stronger the taste parameter for that product. In this example, a vending machine or product dispenser as described herein may be served by a product selection interface configured to enable a user of the product dispenser to request a customized product blend to be dispensed from the product dispenser. Such customized product blend may comprise, for example, a customized mix as currently being offered by The Coca-Cola Company via its Freestyle dispensing machine and/or Freestyle app, or may comprise other customized product blends as illustrated herein, i.e., to lower added sugar content, lower caloric content, lower caffeine content, etc.

As previously discussed, the product dispenser may include or be served by a product formulation/reformulation module, generally 1400, such as represented schematically in FIG. 14. In this aspect, the product formulation/reformulation module 1400 may be configured to determine or access a first profile for the customized product blend, which may comprise a taste profile, as illustrated by the broken lines 1510 in FIG. 15. Such first profile 1510 may be determined using known relationships between various individual flavor profiles, relative quantities thereof, known consequences of varying ingredients, etc. For example, it might be known that sweetener "A" can be used to replace sugar, but at the expense of increased bitter aftertaste, the severity of which varies as a function of the relative ratio of sweetener "A" to sugar. A database, either internal or remote to the product dispenser may contain flavor profile information for a virtually infinite number of possible product formula combinations. Such flavor profiles may be prepared using actual formulations and taste testing data therefore, or may be prepared using virtual formulations and virtual flavor profiling according to methods known to those skilled in the art, such as Senomyx, Inc., 4767 Nexus Center Drive, San Diego, CA 92121.

The product dispenser may be further configured to compare the first profile to a second idealized profile, represented in FIG. 15 as a solid line 1520, which may comprise a recommended taste profile for a brand of interest, say sugar-sweetened Coca-Cola soft drinks. This second idealized profile 1520 may comprise a known taste profile that may set a taste standard for a brand of interest.

The product dispenser may be further configured to reformulate the customized product blend to a dispensed product blend comprising a third profile approximating the second idealized (recommended) taste profile, as illustrated by the dotted line profile 1530 in FIG. 15. Such reformulation may be achieved using product formulation guidelines, lookup tables such as that illustrated in Table 1, etc., in order to bring the resulting taste profile 1530 that is reformulated from that of the customized blend into closer alignment with the idealized or recommended taste profile 1520. In the example illustrated in FIG. 15, the customized product blend 1510 is illustrated as having a large disparity in terms of metallic aftertaste and bitterness relative to the idealized (recommended) taste profile 1520 for the brand of interest. As further illustrated, the reformulated taste profile brings the various taste profile parameters, such as metallic aftertaste and bitterness into closer alignment with respect to the idealized (recommended) taste profile 1520. In this example, the consumer's primary aim may be to reduce or eliminate added sugar from the brand of interest. The reformulated product, which may exhibit the reformulated taste profile 1530, may be formulated to achieve that goal, i.e., eliminating added sugar, but may need to reformulate the requested customized blend, for example, by including a different sweetener or one or more added sweeteners. The product dispenser may be configured to query a user who has requested a customized blend for permission to dispense such reformulated blend, providing the user with information relevant to the proposed reformulation, such as caloric content, sweetener system being used, whether or not artificial sweeteners are being used, etc.

It should be understood that the profiles illustrated in FIG. 15 are illustrative only, for purposes of explanation and comparison, and are not intended to represent any actual product formula or taste profile.

Figure 16:
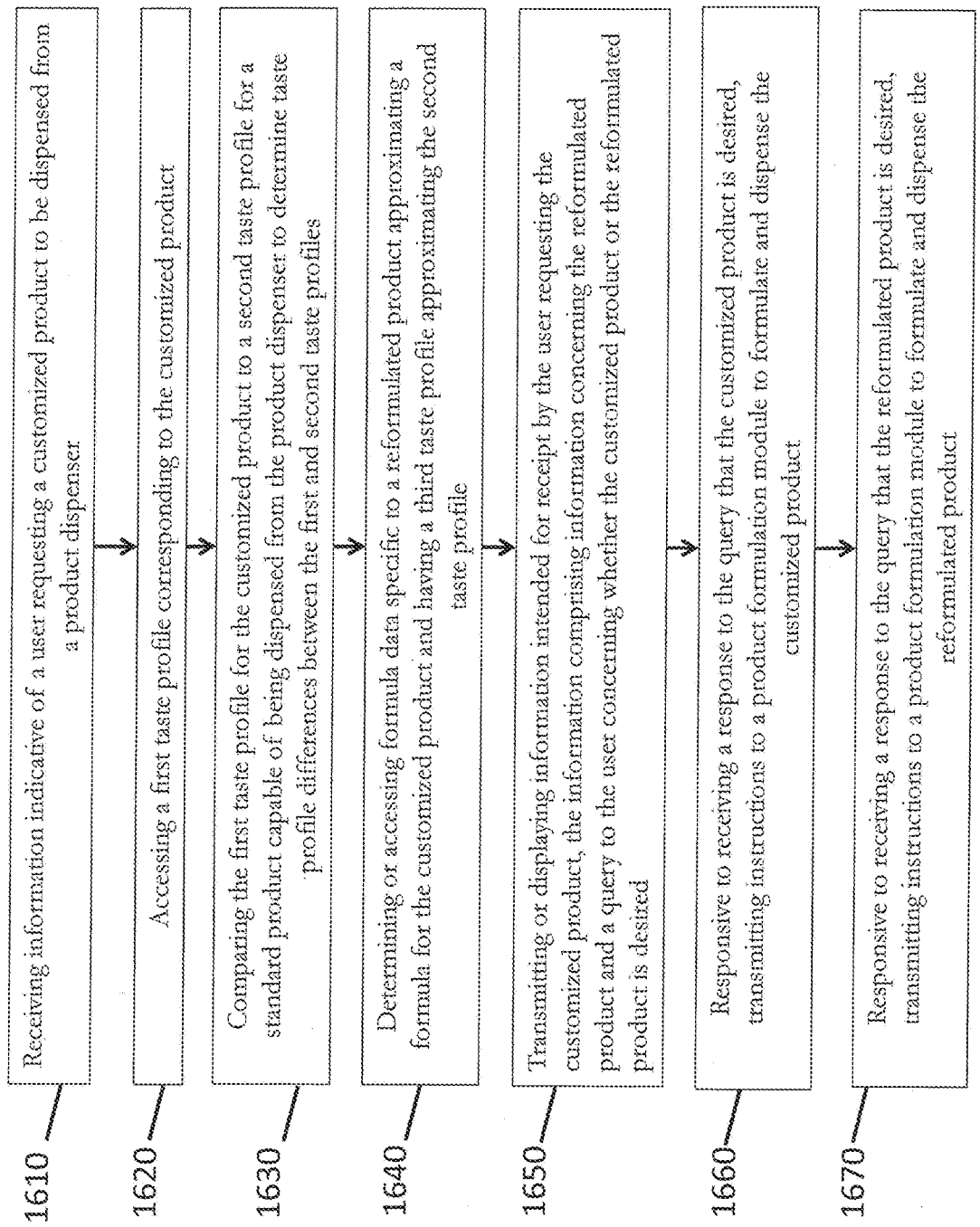
FIG. 16 illustrates a block diagram representative of methods, systems, and apparatus for reformulating products according to an aspect of the present disclosure.

A method for carrying out a product reformulation operation for a requested customized product as illustrated in FIG. 15 is illustrated in FIG. 16, which is a flow chart illustrating one, but not the exclusive, method for carrying out such an operation. As illustrated at block 1610, information may be received, for example, via a transceiver connected to or associated with a product dispenser, the information indicative of a user requesting a customized product to be dispensed from the product dispenser.

As illustrated at block 1620, a first taste profile corresponding to the customized product, such as that illustrated schematically as 1510 in FIG. 15 may be accessed. Such first taste profile may reside on a server, either remote to or contained within, the product dispenser, and may comprise or be associated with a product formulation or formulation lookup table, for example, as Table 1. Such first taste profile may, for example, be pre-existing, or may be determined in response to a customized product selection, for example, provided by a user that has requested a customized product, such as may be accomplished using the Coca-Cola product selection and mix interfaces on the Freestyle smart phone app.

As illustrated at block 1630, the first taste profile for the customized product may be compared to a second taste profile for a standard product or mixture of products, for example, capable of being dispensed from the product dispenser, or employing known product formulas, to determine taste profile differences between the first and second taste profiles. As part of this operation, the product dispenser may be configured to alter at least one flavor note of the customized product to bring the resulting product closer to the ideal, or standard taste profile. In this regard, it should be noted that the product dispenser may comprise a learning module whereby customized product mixes may be stored for future access by the consumer requesting customization. Such learning module may also correlate customized formulations of one consumer with similar customized formulations of other consumers to develop formulation data suggestive of consumer trends and taste preferences. Thus, for example, the learning module may be configured to monitor trends of consumer behavior relating to taste preferences, such as a trend in favor of more pepper flavor, more cinnamon flavor, less lemon flavor, etc., and use such trends to develop standard or limited time formulations based on the trends spotted from customized formulations requested by consumers. In this aspect, a system and method of the disclosure may comprise acquiring data for a plurality of requested customized products, (for example, a plurality of taste profiles), determining product formulation trends based at least in part on the plurality of requested customized products, (for example, a trend toward more cola flavor, less sugar, etc., and formulating a limited time or new standard product formulation based on the determined product formulation trends.

For example, assume that Coca-Cola Life beverage is a standard product available for dispensing from a Coca-Cola Freestyle vending machine, having a standard taste profile represented as profile 1520 in FIG. 15. Assume that such standard product as formulated and dispensed comprises as a sweetener system a blend of stevia leaf extract and sugar. Assume further that the Freestyle vending machine is configured to allow a user to reformulate a product dispensed therefrom to contain less sugar than the standard formula contains. Assume in this example the Freestyle vending machine receives information from a user indicating that the user wishes to dispense a customized Coca-Cola Life beverage that has only half the sugar of the standard formula, and further receives information, i.e., a request, that the sweetness lost by halving the sugar content be made up for by doubling the amount of stevia leaf extract in the customized product. Assume that this customized Coca-Cola Life beverage has a customized taste profile represented by profile 1510 in FIG. 15. As there illustrated, the customized taste profile 1510, as compared to the standard taste profile 1520, would exhibit a far greater degree of metallic aftertaste and bitterness taste notes. In one embodiment, the dispenser may be configured to determine or receive a determination from a remote source, such as a server, that this degree of taste profile difference between the standard Coca-Cola Life beverage and the customized Coca-Cola Life beverage is too severe to be consistent with the brand's taste profile, brand image, and/or other attributes. For example, the dispenser may be configured to recommend a reformulation of the requested customized product if any flavor note of the customized product being requested deviates from the recommended intensity of the same flavor note in a comparable standard product by a certain amount, i.e., 50% or more.

If such taste profile difference between the standard product and the customized product is determined to be too severe, or if the dispenser is configured to assume any requested customized product should be reformulated, formula data specific to a reformulated product may be determined or accessed, as illustrated at block 1640. Such determination or accessing may be performed by accessing a formula database, lookup tables such as Table 1, etc., or may be determined using formulation parameters predetermined by the product to be dispensed. Such reformulated product may approximate the formula for the customized product, for example, have half the sugar of the standard product, and may be formulated to exhibit a third taste profile approximating the second taste profile. This third taste profile, and the formulation represented by it, may be stored for future access, either for the consumer originally requesting it, or for spotting consumer taste preference trends as previously indicated. The product dispenser may be configured to blend and dispense a reformulated product exhibiting this third taste profile by altering at least one attribute of the formula for the customized product. Altering the at least one attribute may comprise one or more of (a) varying a quantity of an ingredient in the customized blended product, (b) eliminating an ingredient from the customized blended product, (c) adding an ingredient to the customized blended product, and/or (d) changing a taste note of the customized blended product. In this example, in order to approximate the customized blended product requested, the reformulated formula data source may make a recommendation that the quantity of sugar be cut in half from the standard formulation (as requested), that the quantity of stevia leaf extract be reduced relative to that of the standard formulation (for example to reduce bitter or metallic aftertaste), and adding a third sweetener, for example, erythritol (for example, to compensate for the lower quantities of sugar and stevia leaf extract), in an effort to achieve a compromise dispensed product that achieves the consumer's goal of cutting the added sugar in half, but retains the product supplier's goal of providing a product retaining desirable taste profiles in order to protect the brand, in this case, Coca-Cola Life. This recommendation may be based, for example, on the product formulator's knowledge of ingredient interaction, lookup tables, and/or on previously recommended product formulations.

As is known, erythritol is considered a non-artificial, low calorie sweetener that is of a broad class of products known as sugar alcohols. Erythritol's caloric load is only 0.24 calories per gram, yet provides 60-70% of the sweetness of table sugar, whose caloric load is around 4 calories per gram. Erythritol is commonly used with low calorie sweeteners such as Truvia® that also contain stevia (Reb A) leaf extract.

On the other hand, if at block 1630 the requested customized product taste profile is determined to be of no or inconsequential difference, or of an acceptable difference relative to a standard product's taste, in this example, a standard Coca-Cola Life formulation, then the product dispenser may be configured to authorize the blending and dispensing of the requested customized product.

As illustrated at block 1650, information intended for receipt by the customer or user requesting the customized product may be transmitted, for example, via a transceiver associated with the product dispenser or the user's mobile device, or displayed, for example, on a product dispenser display. The information transmitted may comprise information concerning the reformulated product. Additionally or alternatively, such transmitted information may comprise a query to the user concerning whether the customized product or the reformulated product is desired. The product dispenser may, as an adjunct to accessing one or more prospective reformulated formulas, for example, at block 1640, advise or recommend to the consumer that his or her customized product formulation should be changed, as an example relevant to the Coca-Cola Life hypothetical, by retaining the same level of stevia leaf extract, and adding erythritol. In some cases, such recommended reformulated formulas may require the addition of one or more products that are more expensive, or exhibit other properties that may be communicated to the consumer, i.e., via the display 910. In this case, the consumer may be given the option to refuse the recommended reformulated formula, or, where a more (or less) expensive ingredient is recommended, be given the option to accept the more (or less) expensive ingredient and pay a higher (or lower) price for the reformulated product.

As illustrated at block 1660, responsive to receiving a response to the query that the customized product is desired, instructions may be transmitted, for example via a transceiver associated with the product dispenser, to a product formulation module to formulate and dispense the customized product.

As illustrated at block 1670, responsive to receiving a response to the query that the reformulated product is desired, instructions may be transmitted to a product formulation module to formulate and dispense the reformulated product.

Figure 17:
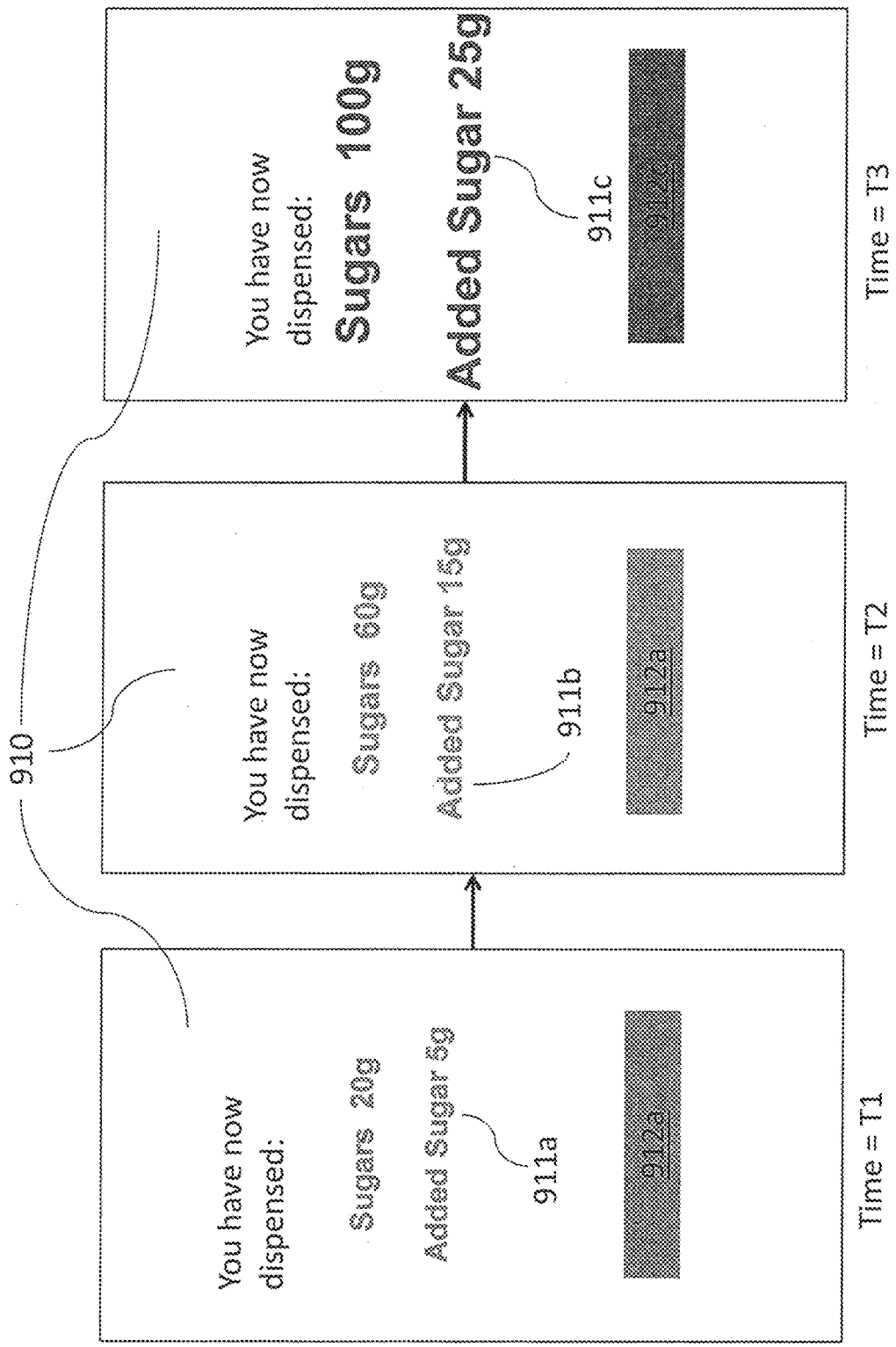
FIG. 17 illustrates a display for practicing methods, systems, and apparatus associated with product dispensing operations of the present disclosure.

FIG. 17 illustrates another aspect of the methods, systems, and apparatus of the disclosure. As illustrated, a product dispenser or vending machine 900 such as illustrated in FIG. 6 may be configured to display, for example on a display 910 on the vending machine (or a display positioned in proximity to the vending machine 900) real time information indicative of at least one attribute of the food or beverage product being dispensed. Such information may comprise information 911*a-c* displayed, for example, as text in a font on a background 912*a-c* having characteristics that may change in relation to a quantity of food or beverage product being dispensed. The characteristics that may change in relation to the quantity of food or beverage product being dispensed may include, for example font size, font style, font color, background color, background intensity, and font intensity. As previously discussed, the attribute(s) of the food or beverage product being dispensed that may be displayed in real time may include one or more of price, number of calories, product quantity, % Daily Values, quantity of sugar, added sugar, sodium, fat, caffeine, protein, cholesterol, total carbohydrates, saturated fat, trans fat, cholesterol, dietary fiber, vitamins, and minerals or any other product attribute for a food or beverage product of interest, including those required by the FDA or any government agency or legislature to be displayed in connection with the sale of food or beverage products.

FIG. 17 illustrates the amount of total sugar and added sugar being dispensed in real time as one example of the food or beverage attribute that may be displayed in real time. As illustrated, at time=T1, the display 910 shows a level of total sugar as 20 grams and added sugar as 5 grams at a point during a food or beverage dispensing operation. As illustrated, such display at time=T1 may have a relatively modest type size and/or "friendly" font 911*a* or background color 912*a*, such as green. As further illustrated, at time T=2, the display may change to show, in real time, updated information, in this case 60 grams of total sugar and 15 grams of added sugar having been dispensed. As illustrated, such information may be displayed in a larger type font and/or different, less "friendly" color 911*b*, or background color 912*b*, such as orange, relative to the display at time=T1. As further illustrated, at time T=3, the display may again change to show, in real time, updated information, in this case 100 grams of total sugar and 25 grams of added sugar. This updated information, representative of a more serious consumption, i.e., approaching WHO recommended guidelines for daily added sugar, may appear in even larger type font, and/or a font or background of a more "serious" color, such as red. While FIG. 17 illustrates these changes to the displayed information as occurring in three discreet steps at time T=1, T=2, and T=3, it should be understood that such changes may occur continuously, in real time, for example, with the type font of the information being displayed continuously increasing in size as more food or beverage product is being dispensed. Such continuous increase in size may be in proportion to the amount of food or beverage product being dispensed, i.e., in direct proportion, for example displaying 100 calories in font size x after y ounces of product have been dispensed, and displaying 200 calories in font size $2x$ after $2y$ ounces of product have been dispensed. Alternatively, the change in information may occur at a faster rate than the rate of food or beverage product dispensed, in relation to, for example, generally understood severity of consumption of the attribute being displayed in relation to the quantity. For example if an alcoholic beverage is being dispensed, the dispenser may be configured to display a level of intoxication or reaction time that may increase non-linearly with respect the volume consumed. As another example, where color is used to indicate an increased variance from a generally recognized acceptable daily level of a product attribute to one that approaches, then exceeds, a generally recognized acceptable daily level, the color may change continuously, for example, smoothly changing from blue to green to yellow to orange to red as more of the product is being dispensed.

Figure 18:
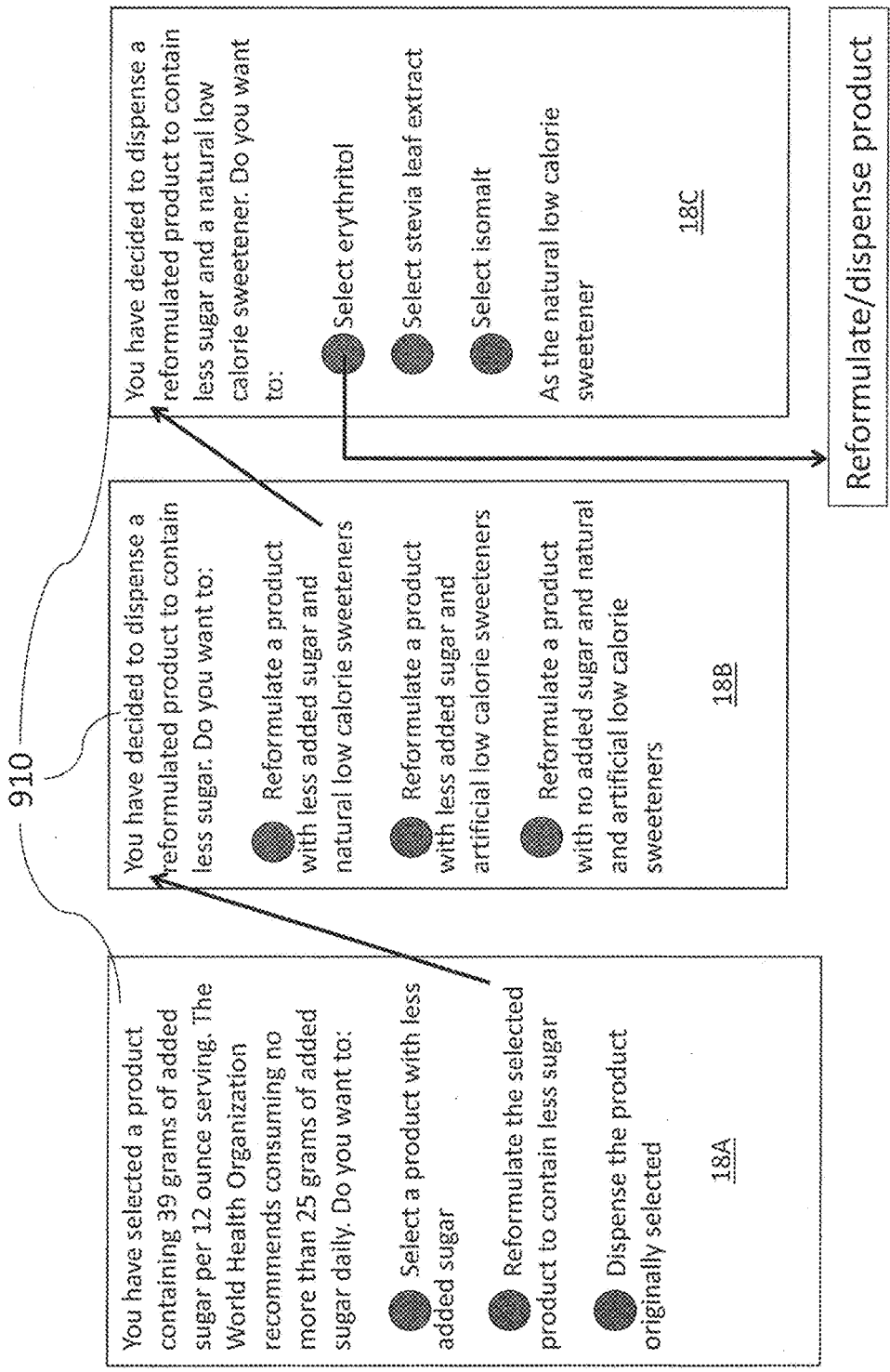
FIG. 18 illustrates a display for practicing methods, systems, and apparatus associated with product dispensing operations of the present disclosure.

FIG. 18 illustrates another aspect of the methods, systems, and apparatus of the disclosure. In this aspect, a product dispenser 900 may be configured to query, for example via its display 910, a user of the dispenser if the user selects to dispense a product from the dispenser that is subject to a warning, or that a seller wishes to provide more candid information concerning. In this example, a product dispenser has been requested to dispense a product that contains 39 grams of sugar per 12-ounce serving. The dispenser may be configured to query, in response to receiving such a request, if a substitute product is desired instead. Such query may include informational messaging, such as WHO or other recommended daily maximums for an attribute of the requested product, as illustrated. As illustrated in box 18A, the user may be given different possible choices in response to the query, including in this example, to dispense a product with less added sugar, for example, from a preexisting list or database which may be contained within the product dispenser 900; to reformulate the product to contain less sugar, for example according to techniques disclosed herein; or to dispense the product originally requested. In this example, the button corresponding to reformulating the product to contain less sugar is selected, leading to the dispenser displaying a new selection box 18B. At this juncture, the dispenser may default to a preselected no or low-calorie substitute for the product originally selected, or may display, for example, a new selection box 18C that may list, in response to a selection from box 18B for natural low calorie sweeteners, to display a list of options, as illustrated. The consumer may then select one of the buttons corresponding to a chosen natural low calorie sweetener, in this case erythritol, and the resulting product may be reformulated and dispensed based on such selections, employing known formulating and dispensing equipment.

Figure 19:
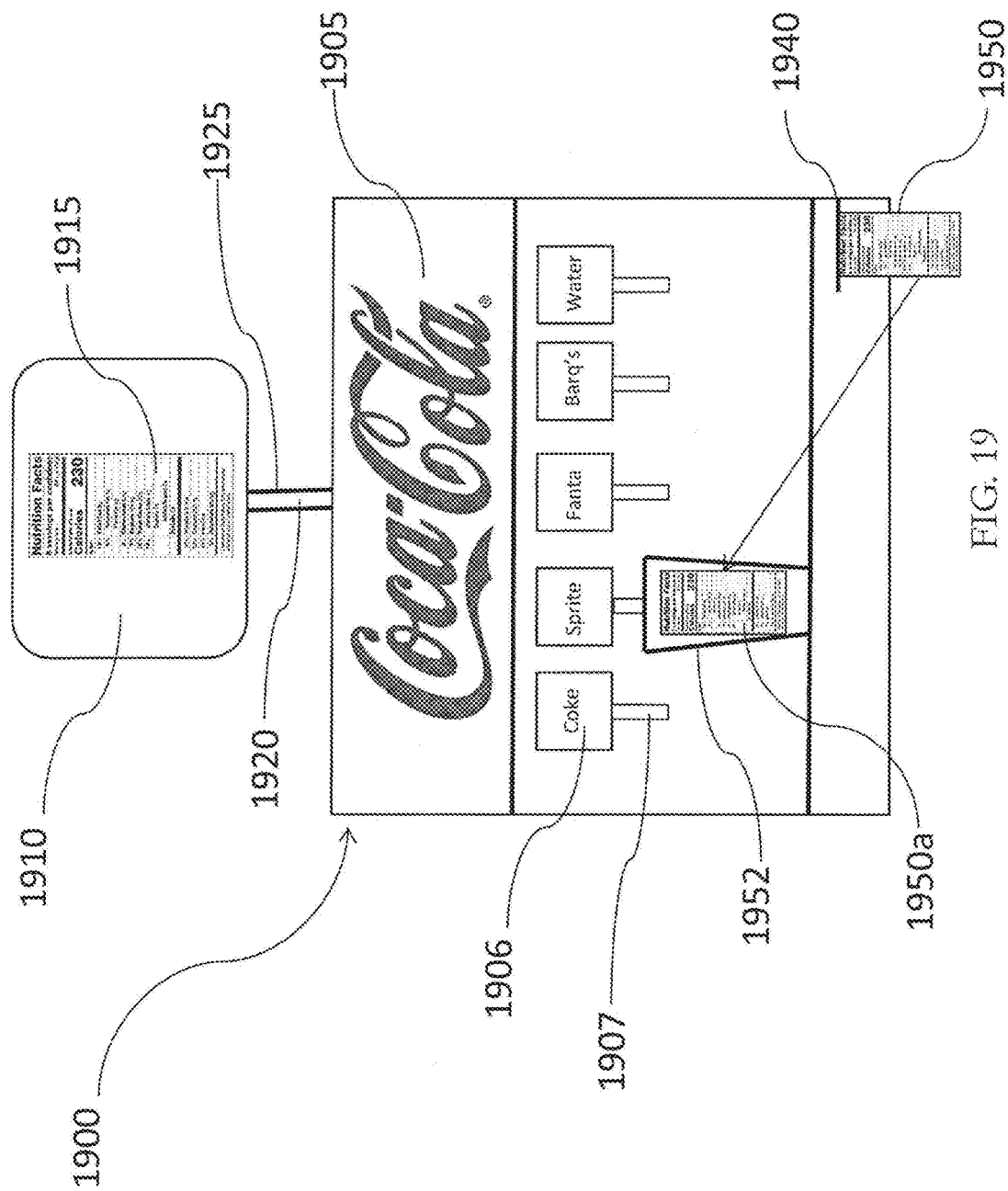
FIG. 19 illustrates a "legacy" fountain dispenser configured according to an aspect of the methods, systems, and apparatus of the present disclosure.

Another aspect of the disclosure is illustrated in FIG. 19. In this aspect, a so-called "legacy" fountain dispenser, generally 1900, is illustrated, and may, except as modified herein, be conventional, for example, including a banner 1905 displaying brand indicia, one or more taps or dispenser heads 1906, which may be actuated by valve levers 1907 to dispense product, as is known. Such dispensers 1900 typically communicate with "bag-in-box" containers of syrup and a carbonated water supply as is known. In this aspect of the disclosure, the fountain dispenser 1900 may be modified, for example, by being built, retrofitted, or associated with a display 1910 capable of displaying real time virtual Nutrition Facts information 1915 as described herein. In this aspect, the display 1910 may communicate with the dispenser 1900 via a wired connection 1920, which may be housed, for example, in a display stand or conduit 1925. Alternatively, the display 1910 may communicate wirelessly with the dispenser 1900, and may be positioned on the dispenser 1900 as illustrated, or on a wall, stand, or other location proximate the dispenser 1900, preferably such that the display 1910 is in the field of view of a consumer dispensing product from the dispenser 1900. In another aspect, the display 1910 may comprise a user's mobile device display that is capable of communicating with the dispenser 1900, in much the same way user's mobile device Freestyle app can communicate with Freestyle dispensers.

The display 1910 may comprise or communicate with a product formulation/reformulation module similar to that described with respect to FIG. 14 herein or other similar product formulation database, which may be housed remotely from the dispenser 1900 or associated proximately therewith. In this aspect, the dispenser may be modified to include volumetric and/or weight flow control devices that can determine the quantity of product being dispensed and communicate such information to a processor configured to determine, based on the quantity or dispensing rate of product being dispensed, in real time, one or more aspects of the product being dispensed, such as calories, sugar, etc. as previously described. Such information may then be communicated to the display 1910 to display, for example, virtual Nutrition Facts information 1915 in real time.

In another aspect of the disclosure, a display such as 910 and 1910 may display a side-by-side comparison of virtual Nutrition Facts representative of a single serving size and a real time display of virtual Nutrition Facts as product is being dispensed. Such comparison may further include a determination of how the product being dispensed deviates from a single serving size. For example, after a product is selected for dispensing, the display 910, 1910 may display that a 20-ounce serving size contains 79 grams of sugar on a static virtual Nutrition Facts label. As the selected product is being dispensed, a second virtual Nutrition Facts label may then be displayed, either with or without the static virtual Nutrition Facts label being shown. In this example, after a consumer has dispensed 10 ounces of product and halted the dispense, the display 910, 1910 may display comparative information, for example, to show the consumer that only half of a serving has been dispensed and/or only 40 grams of sugar have been dispensed.

As used herein, the term "real time" includes an event occurring in actual real time, for example, the displaying of information pertaining to a product dispensing operation, for example, a virtual Nutrition Label, commencing proximate in time with initiating dispensing of the product, and concluding proximate in time with concluding dispensing of the product, and also including slight delays in actual real time displaying occasioned, for example, by a delay caused by accessing formula information, a consumer profile, a product lookup table, processor activity, etc., and further including intermittent updating of information, for example, providing updated real time information every two seconds during a product dispensing operation. A real time display of information may thus include information that is updated continuously, intermittently, and/or progressively, as a product is being dispensed.

One of the problems with food products dispensed in a restaurant is that the consumer often has no control over or knowledge of the amount of product dispensed or a fair understanding of what quantities of product attributes are contained in the ordered product. As one example, a consumer ordering a Starbucks Grande Iced Flavored Latte with 2% milk from a server behind a counter at a Starbucks restaurant may not realize that such a beverage contains about 28 grams of sugar—the equivalent of two-and-a-half Krispy Kreme donuts. Moreover, depending on the amount of ice placed in the container by the server, the consumer may, if too little ice is placed in the container, actually get more sugar than this, or may be "short-changed" by receiving less product than expected if too much ice is placed in the container by the server. Moreover, the consumer may be unable to see the Nutrition Facts for such products even if displayed on a display such as described herein.

Referring again to FIG. 6 and FIG. 19, another aspect of the disclosure is illustrated, in which a product dispenser, 900, 1900, may be configured to print or otherwise dispense a printed label 950, 1950, from a label dispenser 940, 1940 associated with the product dispenser 900, 1900, respectively. Although a label printer/dispenser is preferred, any other known form of label maker may advantageously be employed. As is known, product dispensers, whether, for example, for dispensing gasoline from pump kiosks, or for dispensing beverages, as taught, for example, by U.S. Pat. No. 8,744,618, to Peters, et al., may be configured with printing apparatus. Other conventional examples include, for example, printers that display information related to food that is manually packed at a point of sale, for example, at a supermarket deli counter, based on, for example, a weighing apparatus that determines, for example, the price of the food product and prints same on a label that is applied to a container into which the product is placed. Such printing apparatus are conventionally used to print out a sales receipt, a coupon, or other information post sale to the consumer. Such printing apparatus may now, according to aspects of the present disclosure, be configured to print labels corresponding to product attributes of the product being dispensed, such as Nutrition Facts. In this aspect, the product dispenser 900, 1900 may be configured to default to a "print screen" instruction upon conclusion of the dispensing operation, in order to print the last displayed virtual Nutrition Facts label 915, 1915. Alternatively, the printed label 950, 1950 may be printed out without regard to whether a virtual Nutrition Facts label is displayed, for example, by configuring the printer (not shown) to interface with a product formulation module as previously described in order to account for the product attributes of the product dispensed. The printed label, 950, 1950 may simply comprise an informational piece of paper for the consumer, similar to a receipt, or may comprise an adhesive-backed label, for example, a peel-and-stick label 950*a*, 1950*a* that may be applied, for example, by restaurant service personnel to a container 952, 1952 into which the dispensed product has been dispensed. Alternatively, or additionally, the printed label 950, 1950 may comprise a moisture-activated adhesive (similar to that used for sealing an envelope, for example) that may allow the printed label 950*a*, 1950*a* to more readily adhere to the outer surface of a cold beverage container that may be moist by virtue of condensation thereon. As another alternative, the dispenser 950, 1950 may comprise a shrink-wrap label that may be printed and applied using known apparatus to the container 952, 1952 at the conclusion of the dispensing operation. In this way, the consumer may be provided with a Nutrition Facts label that may actually be applied to the container 952, 1952 into which the product has been dispensed, for example by the server or the consumer, and that may precisely display, for example, the calories dispensed, the number of ounces of product dispensed, the amount of sugar dispensed, etc. Although the printed labels 950, 1950 are illustrated as being printed and dispensed from the product dispenser 900, 1900, it will be readily appreciated that such labels may be printed from any apparatus with which such product dispensers and/or related product formulation databases communicate, even if remote therefrom.

Figure 20:
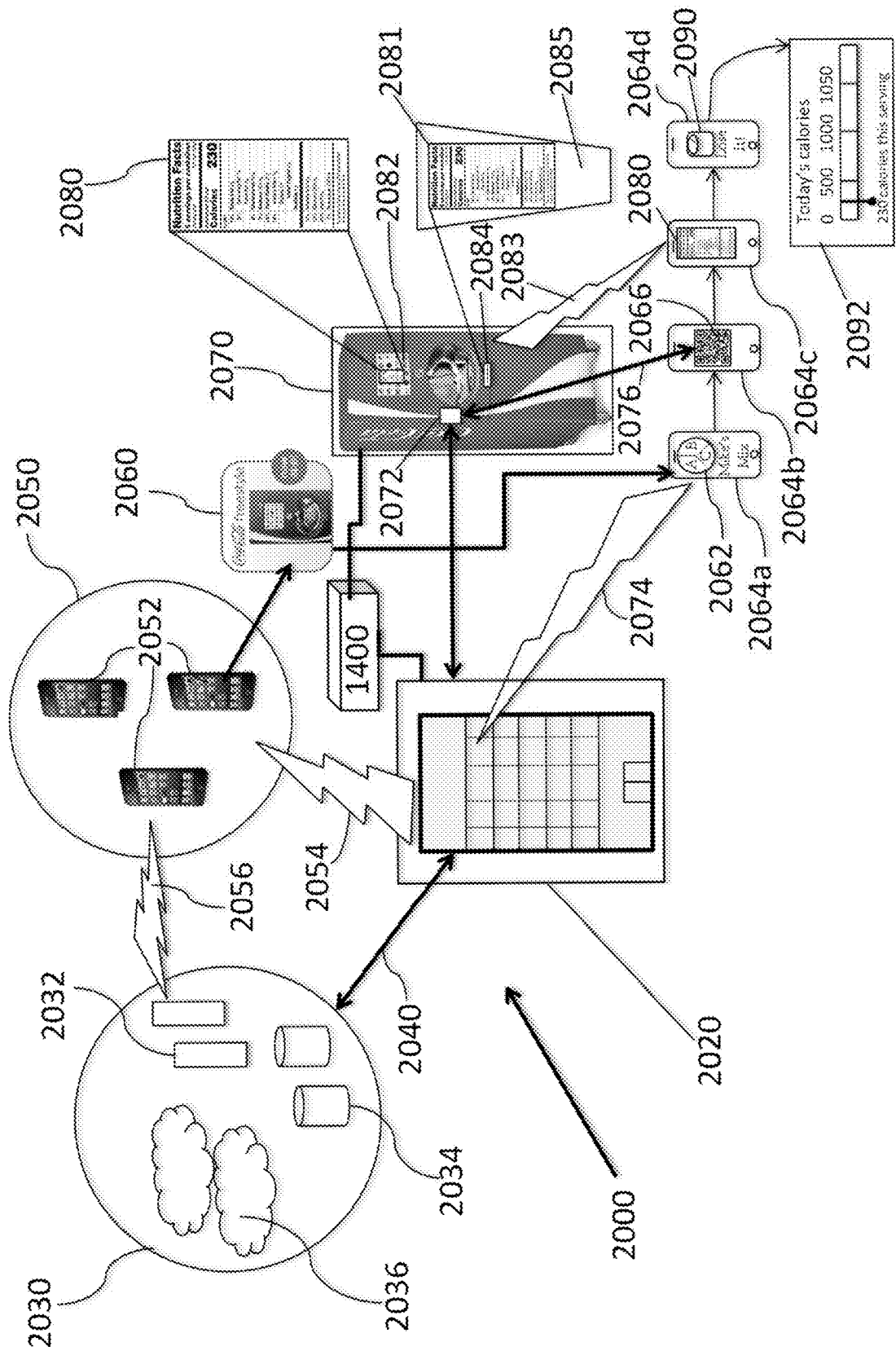
FIG. 20 illustrates exemplary systems and methods for practicing certain aspects of the disclosure.

Referring now to FIG. 20, illustrated are exemplary systems and methods for practicing certain aspects of the disclosure. As illustrated in FIG. 20, a system, generally 2000 of the disclosure may include a product formulator, such as The Coca-Cola Company, 2020. In this exemplary system, the product formulator 2020 may be considered the "brains" or central processing unit of the system 2000, and may be responsible for product formulation, product reformulation, product placement, product sale, product marketing, brand creation, messaging, and image, consumer satisfaction, product dispenser placement and maintenance, consumer data acquisition, FDA label compliance, product advertising, and the like. Such product formulator 2020 may comprise or be associated with a system 2030 of databases of product formulations, lookup tables, product taste/flavor profiles, etc., which may comprise trade secret information of the product formulator, and/or brand information related thereto, some or all of which may be stored and/or accessed on-site with the product formulator 2020, or off-site, in either case, for example, on or via one or more servers, secure networks, secure cloud computers, etc., represented as 2032, 2034, and 2036, respectively, in system 2030. The system 2030 may further comprise transceivers (not shown) for transmitting and/or receiving information, instructions, queries, requests, authorizations, etc., for example via wireless communication 2056. In one aspect, system 2030 may also comprise customer and/or consumer information, including, for example, data concerning loyalty programs, loyalty points "earned" and/or "owned" by specific consumers, preferences for specific consumers, "favorite" formulations for specific consumers, and so on. The product formulator 2020 may communicate with the system 2030 either wirelessly, via wired connections, or any combination thereof, via communication link 2040, which may comprise two-way communication.

The product formulator 2020 may be configured to communicate either directly or via the system 2030 with a plurality of intended recipients, 2050, exemplified/represented by multiple mobile devices 2052 associated with a plurality of users. Such communication may be achieved wirelessly, via communication links 2054 and/or 2056 (which may comprise two-way communications) using known equipment and protocols.

The product formulator 2020 may initiate a push or other notification intended for one or more of the plurality of intended recipients 2050. Such notification may comprise notice of an opportunity to dispense a product, such as a beverage, which product may be custom mixed by the one or more intended recipients 2050. For example, one or more of the intended recipients 2050 may be instructed by the product formulator or its proxy (for example, a service provider, a product promotions agent, or the like) to access a mobile application 2060, in the example illustrated in FIG. 20, the Coca-Cola Freestyle app. As is known, the app 2060 may be employed to formulate a custom mix 2062, albeit constrained by the limited customization currently available, which does not permit a user to modify individual ingredients, such as sugar, salt, caffeine, etc., of the custom mix. In the present example, a user may be able to use the mobile app 2060 not only to mix pre-existing products to create a custom mix as currently done, but also to vary individual ingredients within the resulting mix, illustrated as components "A," "B," and "C" in the custom mix illustrated as "Mike's Mix" 2062, which may be displayed on the user's mobile device 2064a. Such custom mixes, i.e., that vary at least one product attribute, such as an ingredient of pre-existing products or standard products available from the product dispenser 2070, may be formulated using a product reformulator comprising a reformulation module 1400, as previously discussed. The reformulation module may be associated with the product formulator 2020, the product dispenser 2070 or both.

In response to the user selecting a product or creating a custom mix 2062, the product formulator 2020, and/or mobile app 2060 may provide a code, such as a two-dimensional bar code 2066, which may be displayed on the user's mobile device 2064b, as is known. Such code may, for example, according to known methods, be used to request a standard product or a limited customized mix, limited to blending different proportions of standard product mixes from a product dispenser 2070. In this example, the product dispenser comprises a Coca-Cola Freestyle dispensing machine that may include a bar code reader or other code-reading device 2072, which may enable a user to scan the code 2066 to request that a product, such as a customized product, be dispensed from the product dispenser 2070.

As previously described herein, after a product, such as a custom mix, has been requested, for example, via a wireless communication 2074 from the user's mobile device 2062a to the product formulator 2020, or via a scanned communication 2076 from the user's mobile device 2062b to a scanner 2072 associated with the product dispenser 2070, the product formulator 2020 and/or product dispenser 2070 may determine the product attributes of the product, for example, using lookup tables, product formulation databases, etc., in order to determine, for example, Nutrition Facts information for the product being requested and dispensed, and display such information in real time as the product is being dispensed. As illustrated, real time, virtual Nutrition Facts information 2080 may be displayed on the product dispenser display 2082 and/or may be transmitted, i.e., via wireless communication 2083 from the product dispenser 2070 and/or product formulator 2020 to the user's mobile device 2064c. In this aspect, such information, i.e. calories dispensed, may be further communicated to a weight management app associated with the user's mobile device 2064d, such as the Lose It! app 2090. Such information may, in turn be used to update the user's daily calorie count, via a display 2092 as illustrated.

As further illustrated, and previously described, the product dispenser 2070 may include or be associated with a printer (not shown) configured to print a label or sticker 2081, which may be dispensed from a label dispenser or dispensing slot 2084. The label or sticker 2081 may comprise the Nutrition Facts information for the dispensed product, and may in turn be placed on a cup 2085, cup lid, cup holder, or other product receptacle, for example, at the point of sale.

As used herein, the term "Nutrition Facts" means information required by the U.S. FDA, now and in the future, to be displayed on packaged food and beverage products intended for sale in the United States. As used herein "virtual Nutrition Facts" means information displayed in a transitory medium, such as a graphical display, a mobile device display, a monitor, etc., that closely corresponds to the look of a Nutrition Facts label.

Figure 21:
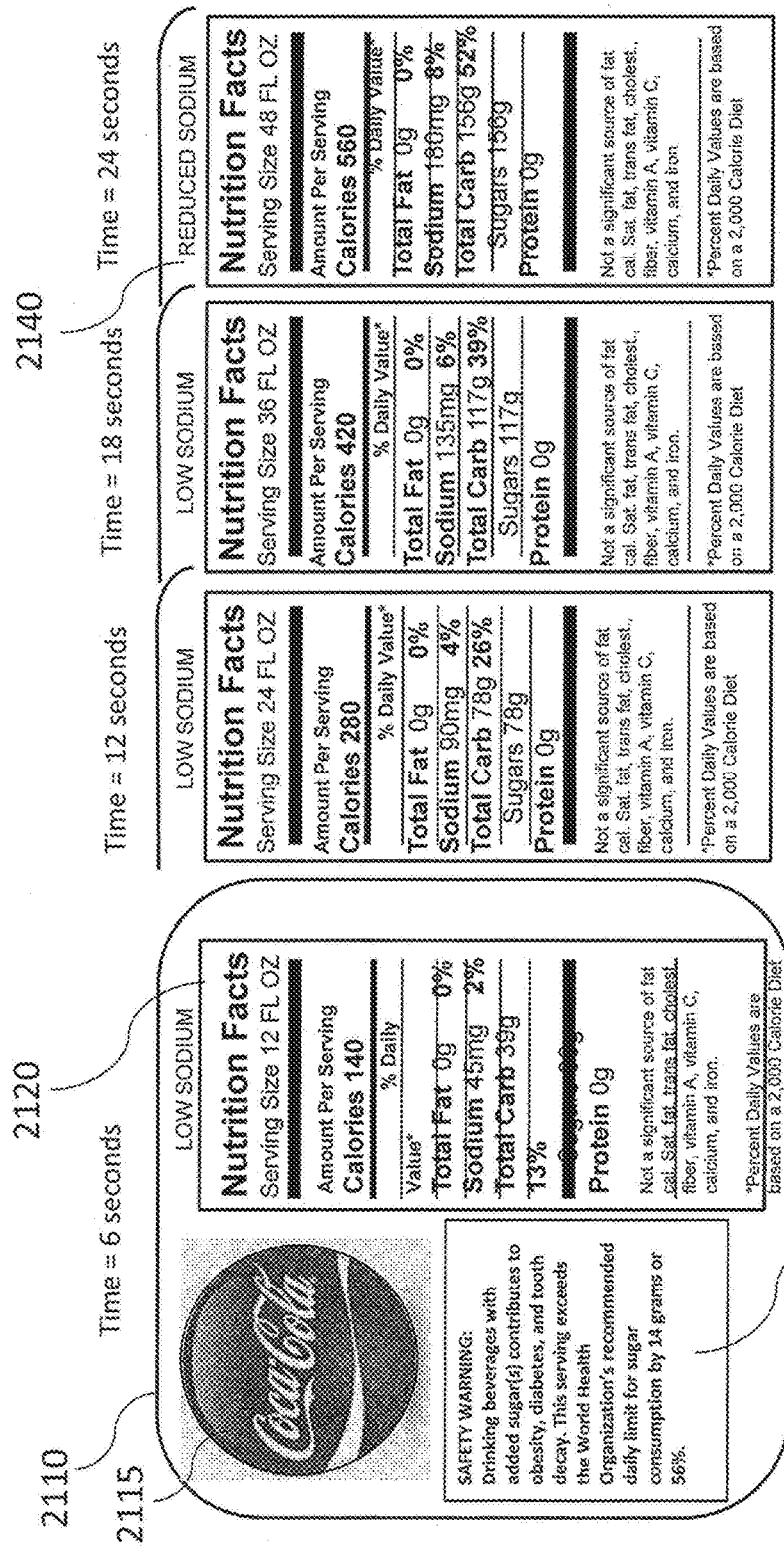
FIG. 21 illustrates virtual real time Nutrition Facts displays according to an aspect of the disclosure.

Another aspect of the disclosure is illustrated in FIG. 21. As previously described, real time virtual Nutrition Facts or other product attributes may, according to the disclosure, be displayed on a product dispenser display 2110, which may be substantially the same as that illustrated as displays 910, 1910 of FIGS. 6 and 19, respectively. As illustrated, the display 2110 may comprise graphical user interface related graphics, 2115, which may comprise user selection buttons/brand indicia for requesting that a product of interest be dispensed and/or for identifying the product being dispensed.

The example of FIG. 21 illustrates the dispensing of a Coca-Cola original formula beverage, which, according to currently available products sold in cans, contains product attributes as set forth in virtual Nutrition Facts label 2120 for a 12-ounce serving. The example of FIG. 21 assumes a 2-ounce-per-second dispensing rate, and therefore displays a 12-ounce serving's Nutrition Facts at time=6 seconds into the product dispensing operation, and may, at time=0, display a virtual Nutrition Facts label showing all zeros or showing Nutrition Facts for a standard serving size, for example, 12 ounces. Of course, other dispensing rates are possible, and the example of FIG. 21 is merely for convenience of illustration. In this example, if a product dispenser is configured to dispense products with a known dispensing rate, for example, 2 ounces-per-second, and given that the product attributes, such as Nutrition Facts per ounce are known, then the resulting information pertaining to the product being dispensed may be transmitted or displayed in real time. In this example, at time=12 seconds, 24 ounces of Coke have been dispensed, at time=18 seconds, 36 ounces have been dispensed, and at time=24 seconds, 48 ounces have been dispensed. As illustrated, and previously discussed, the display 2110 may be configured to display a product warning 2130.

In this aspect, the real time Nutrition Facts or other product attribute display may be employed to take into account how such information, such as product claims, may change as a function of quantity of product being dispensed. As is known, the FDA sets standards whereby food and beverage manufacturers may label their products with product claims, for example, "zero calories," "low sodium," "low fat," "low cholesterol," etc. Such product claims are defined by the FDA, and include, for example claims that a product is calorie free, low calorie, reduced/less calorie, fat free, low fat, reduced/less fat, saturated fat free, low in saturated fat, reduced/less saturated fat, cholesterol free, low cholesterol, reduced/less cholesterol, sodium free, low sodium, reduced sodium, sugar free, low sugar (not defined at present by FDA and may not currently be used), or reduced sugar. Such claims, as defined by the FDA also include synonyms, such as "zero, "no," "without," "trivial source of," dietarily insignificant source of," as synonyms for "free." As used herein, the term "product claims" is intended to include all FDA recognized product claim terms, including those described above and all FDA-recognized synonyms therefore.

Such standards for making product claims are typically based on what the FDA terms "Reference Amounts Customarily Consumed," or "RACC." While RACC may be fairly well understood for packaged products, i.e., a 12-ounce can of soda, such amounts are more difficult to quantify or reference for unpackaged products dispensed from a product dispenser. In this context, the consumer has the ability to dispense his or her own product in variable quantities; restaurant servers may give free refills of soft drinks, sometimes without the consumer realizing it; and super-sized products, such as the aforementioned "Coca-Cola 7-Eleven 64 Ounce Double Gulp" are readily available. In these contexts, the lines between amounts "customarily consumed" and those not "customarily consumed" become blurred. Such blurring invites uncertainty for consumers and the opportunity for misleading advertising and/or lack of candor by food and product sellers.

For example, the FDA proscribes that food and beverage sellers may label their products with the product claim of "Low Sodium" if such products contain 140 mg sodium or less per RACC. A 12-ounce can of Coca-Cola Original Formula contains 45 mg of sodium, and is thus properly claims to be "Low Sodium" on its label, as illustrated on the first screen 2110 of FIG. 21. This first screen 2110 is intended to depict a display of a Freestyle-type product dispenser that has dispensed 12 fluid ounces of Coke at a rate of 2 fluid ounces per second, i.e., at time=6 seconds after dispensing has commenced. But as illustrated, as the dispensing operation continues through 24 seconds of dispensing, for example, to dispense a 48-ounce so-called "super-sized" serving, now the total sodium dispensed has risen to 180 mg, which exceeds the 140 mg maximum for labeling a product as "Low Sodium." In this context, if a 48-ounce super-sized serving is deemed RACC, then under FDA rules, the label, in this case a virtual label 2140, may display "Reduced Sodium," if the resulting product is deemed to have at least 25% sodium than an appropriate reference food.

As another example, currently, FDA regulations permit sellers of food and beverage products to label their products as "zero calorie" or "calorie free" if such products contain less than 5 calories, or "fat free" if such products contain less than 0.5 gram of fat per RACC. But many such products actually contain some, albeit small quantities of calories or fat in small serving sizes, but more than 5 calories or 0.5 grams of fat as the serving size increases. Thus, it may currently be misleading, in some contexts, for such food and beverage sellers to claim "zero calorie" or "calorie free" for products that are dispensed in large quantities from product dispensers. As another example, FDA regulations permit a claim of "Low Calorie" to be made on labels for products containing less than 40 calories per RACC. The present disclosure may solve for such potential misleading claims by, for example, deleting a "zero calorie" or "low calorie" claim from a virtual label display once more than 5 calories of a product have been dispensed, or once more than 40 calories have been dispensed, respectively, and by transmitting or displaying the actual calorie count of the product being dispensed.

Referring now to the virtual warning label 2130 of FIG. 21, such a label may be required in certain jurisdictions and/or for certain products or ingredients. In this example, a hypothetical warning, based on California's recently proposed regulation for sugar, and the World Health Organization's recommendation, is displayed. In this example, the product being dispensed includes a controlled ingredient, sugar, subject to a hypothetical warning, as illustrated. Such a warning may be displayed in response to a consumer requesting the dispensing of a product containing such controlled ingredient. The warning label 2130 of FIG. 21 also includes information concerning recommended daily intake levels, in this example, 25 grams per day. In an embodiment of the disclosure, such recommended daily intake level may be displayed either at the beginning of a dispensing operation of a product containing a controlled ingredient, or only as the dispensing operation proceeds and the amount of controlled ingredient dispensed approaches or exceeds the recommended daily intake or other recommended level for consumption. In this aspect, if the amount of dispensed product contains, for example less than 25 grams of sugar, then the portion of the warning label discussing the WHO recommended daily maximum might not be displayed until 25 grams or more of sugar are dispensed.

Figure 22:
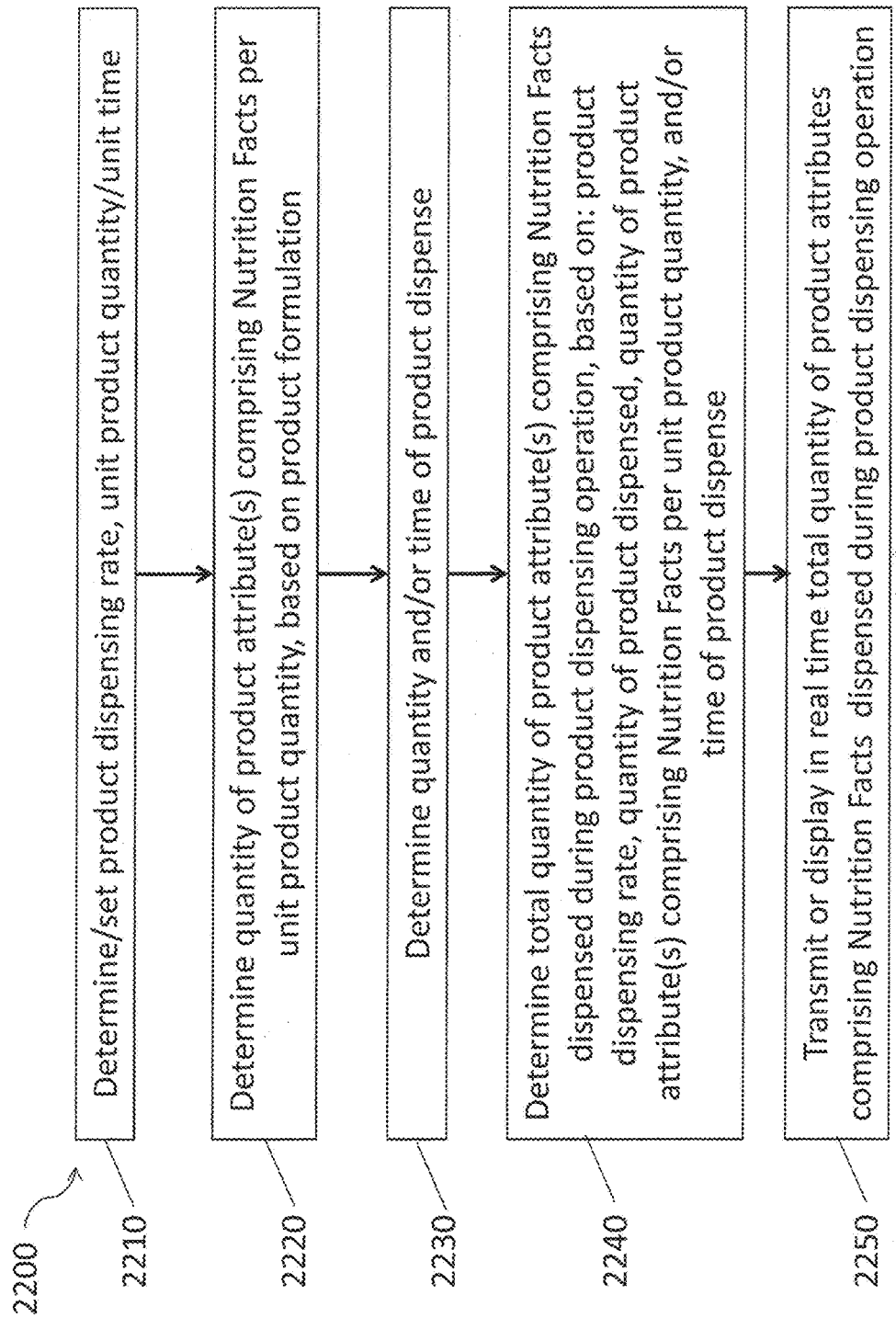
FIG. 22 illustrates an exemplary block diagram of operations comprising processes for implementing real time display of product attributes according to an aspect of the disclosure.
Figure 23:
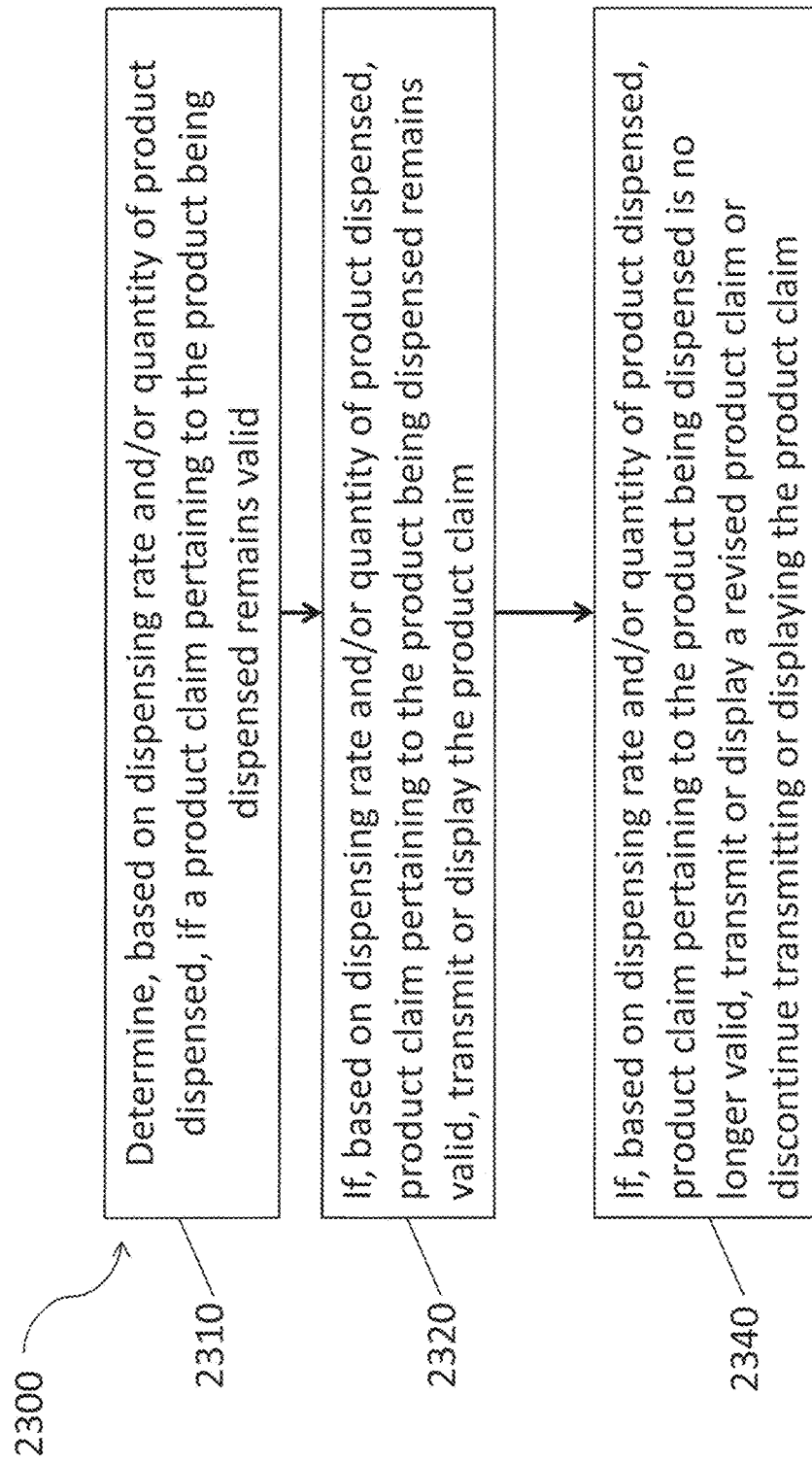
FIG. 23 illustrates an exemplary block diagram of operations comprising processes for displaying product claims according to an aspect of the disclosure.

FIGS. 22 and 23 illustrate block diagrams that may be implemented in processes and systems for carrying out one or more of the real time displays of Nutrition Facts or other product-related information of the present disclosure. Such operations may be carried out in association with product dispensers using processors, flow control equipment, and databases, for example. As illustrated in FIG. 22, a process, generally 2200, may comprise, at operation 2210, which operation may be optional, determining and/or setting a product dispensing rate, for example, in unit product quantity/unit time. In the example of FIG. 21, this rate is 2 fluid ounces per second. Such determinations are readily made using known equipment and apparatus, including that associated with the Coca-Cola Freestyle product dispenser. Such dispensing rates are often determined, for example, to dispense product such as carbonated beverages at a rate that yields a prompt product dispense without excessive foaming.

At operation 2220, a quantity of product attribute(s) comprising Nutrition Facts per unit product quantity, may be determined based on product formulation. This too may be readily determined using known formulations of products sold by product formulators such as The Coca-Cola Company; for example, assuming the fountain version of regular original formula Coke® has the same Nutrition Facts as displayed on, for example, a 12-ounce can thereof, the quantity of Nutrition Facts per unit product quantity may be determined, for example, by dividing the quantities shown on the label by 12, i.e., 140 calories per 12-ounce can=11.67 calories per fluid ounce. Of course, such Nutrition Facts information may be readily determined by the product formulators themselves. Such information may be determined in advance and stored in appropriate databases or lookup tables, which may be accessed for completing the real time Nutrition Facts displaying operation 2220.

At operation 2230, the quantity of product and/or time of product dispense may be determined, for example, with a timing device associated with the product dispenser that may be triggered, for example, by a user of the product dispenser initiating a dispensing operation and concluded by the user discontinuing the dispensing operation. Alternatively, as will now be appreciated, the dispenser may be configured with a volumetric flow (or weight) control device that monitors the volume (or weight) of product being dispensed and determines the total Nutrition Facts for the dispensing operation based not on the time of the dispense, but on the quantity of product dispensed and the Nutrition Facts per quantity.

At operation 2240, based on product dispensing rate or quantity of product dispensed during the dispensing operation, quantity of product attribute(s) comprising Nutrition Facts per unit product quantity, and/or time of product dispense, the total quantity of product attributes dispensed during time of product dispensing operation may be determined. In this aspect, operation 2240 may comprise apparatus similar to known equipment used to determine total quantity and price of gasoline being dispensed during a dispensing operation, but with several important differences. In a conventional gasoline dispenser, there is no need to maintain a database of product attributes, such as Nutrition Facts information, and thus none is employed. And, a gasoline dispenser displays price and quantity data on a display that is not configured to display a virtual Nutrition Facts label or to enable graphical user interface by a consumer.

At operation 2250, product attributes comprising the total quantity of Nutrition Facts dispensed during the product dispensing operation may be transmitted or displayed in real time. This is illustrated schematically, for example, in FIGS. 6-8 and 20-21.

FIG. 23 illustrates another aspect of the disclosure, which may comprise optional or additional operations to those discussed with reference to FIG. 22. In this aspect, at operation 2310, a determination may be made, for example, by a product dispenser appropriately configured, based on the quantity of product dispensed, if a product claim pertaining to the product being dispensed remains valid. For example, if the product dispenser comprises a frozen yogurt dispenser, and a 50 gram dispense of the frozen yogurt contains 3 grams of fat, the product dispenser may be configured, as long as 50 grams or less of yogurt are dispensed, consistent with FDA regulations for packaged food Nutrition Facts labels, to transmit or display a virtual Nutrition Facts label making a claim that the dispensed product is "Low Fat."

Continuing to operation 2320, based on the quantity of product dispensed, if it is determined that a product claim pertaining to the product being dispensed remains valid, for example, during the dispensing operation, then the product claim may continue to be transmitted or displayed, for example "Low Fat" may be displayed on the product dispenser display. Thus, in this example, so long as the frozen yogurt being dispensed does not exceed 50 grams of total dispense, the claim or "Low Fat" may continue to be transmitted or displayed.

If, on the other hand, as illustrated at operation 2340, it is determined, based on the quantity (or dispensing rate) of product being dispensed, that the product claim pertaining to the product being dispensed is no longer valid, then a revised product claim may be transmitted or displayed or the product claim may be discontinued from being transmitted or displayed. In the example of FIG. 21, the claim of "Low Sodium" displayed on virtual Nutrition Facts label 2220 is illustrated as being revised to "Reduced Sodium" on virtual Nutrition Facts label 2240. In the above frozen yogurt example, the "Low Fat" claim may be discontinued once the total dispense of frozen yogurt exceeds 50 grams, and replaced with a "Reduced/Less Fat" claim being displayed as long as that claim remains valid.

This same approach may also be used in the context of product warnings, as previously discussed. For example, if the FDA or other government or regulatory body established that a warning such as 2130 of FIG. 21 only was required to be transmitted or displayed on products containing 25 grams or more of sugar, then the product dispenser may be configured to display a virtual warning label 2130 only once that level of sugar has been dispensed. Thus, no warning 2130 might appear if only 6 ounces of Coke were dispensed, but that warning would appear if a quantity of Coke containing 25 grams or more of sugar, i.e., 7.7 ounces or more, is dispensed.

Figure 24:
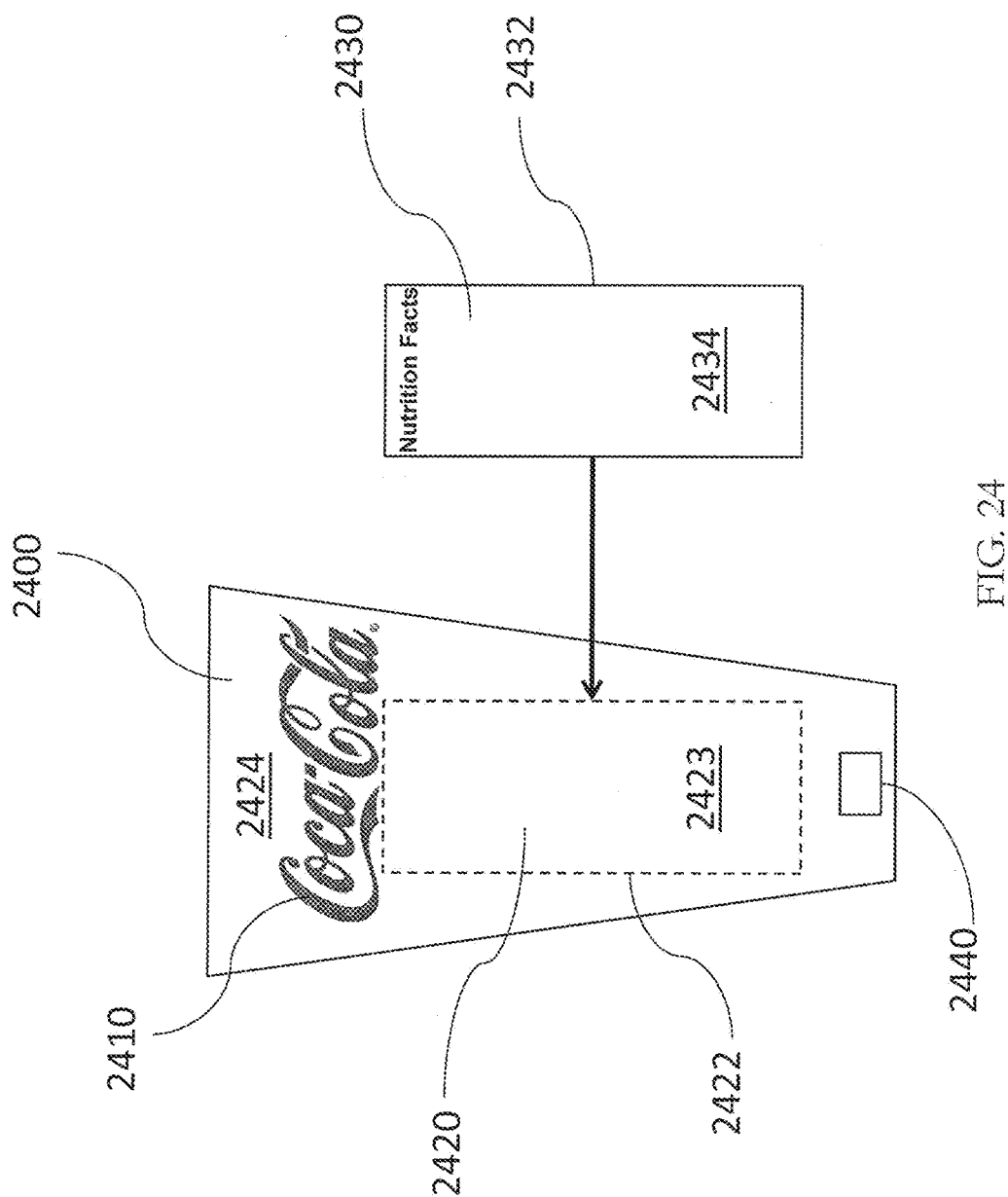
FIG. 24 illustrates another aspect of the systems, apparatus, and methods of the present disclosure, illustrating placement of a label, such as a Nutrition Facts label, on a product receptacle.

FIG. 24 illustrates another aspect of the systems, apparatus, and methods of the present disclosure. This aspect may comprise a product receptacle 2400, which may comprise a beverage cup, or any other receptacle into which a food or beverage product intended for immediate consumption may be dispensed. As illustrated, the product receptacle may comprise branding indicia, 2410, for example a food or product brand such as Coke®, Pepsi®, Frito-Lay®, Planter's®, Eagle®, Breyer's®, Kirkland®, etc. The product receptacle may comprise a disposable cup, for example, made of paper, plastic, Styrofoam®, and the like, or may be reusable, made from glass, metal, plastic, PlantBottle-type materials, etc. Alternatively, the product receptacle, in the case of the dispensed product comprising soft serve ice cream or frozen yogurt, may comprise an edible ice cream cone.

As further illustrated, the product receptacle 2400 may comprise a predefined region 2420, which may be defined by a boundary 2422. While the predefined region 2420 may be positioned at any location on the product receptacle 2400, it is preferably located so as not to infringe on the brand indicia 2430 as illustrated. As illustrated, the boundary 2422 may comprise a minimally intrusive visual indicator, such as a dotted line perimeter, which may be printed, scanned, stamped, or otherwise placed on the product receptacle 2400. When the product receptacle comprises an edible material, such as an ice cream cone, the boundary 2422 may be printed, scanned, stamped, or otherwise applied using an edible ink or food coloring. Alternatively, the boundary 2422 may be defined by the predefined region 2420 having a different color or texture, 2423, i.e., white or rough, relative to the background color or texture 2424 of the product receptacle 2400, which may, for example, be red or smooth. Alternatively, both background colors or textures 2423 and 2424 may be the same. Other color or texture combinations are of course possible, and may compliment readily identifiable colors of the product seller or product formulator, for example, blue for PepsiCo, red for The Coca-Cola Company, and so on.

In a preferred aspect of the embodiment of FIG. 24, a label 2430, which may, for example, be a Nutrition Facts label, may be sized and shaped to fit within the predefined area 2420, for example, by having a perimeter 2432 substantially corresponding to the boundary 2422 on the product receptacle 2400. If the label 2430 comprises an adhesive on the back thereof, then the label 2430 may be applied directly to the product receptacle 2400 in the predefined region 2420 thereof. In another aspect, the predefined region may comprise an adhesive enabling the label 2430 to be applied thereto, particularly when the product receptacle is intended to be used for holding cold foods tending to induce condensation on the outer surface of the product receptacle 2400 which condensation may be useful in wetting a moisture sensitive adhesive or glue on the label 2430. The label 2430 may comprise a printed label that is printed or scanned in response to a user of a product dispenser completing a product dispensing operation whereby product attributes, such as Nutrition Facts pertinent to the dispensed product are provided to the label as previously described. In a preferred aspect, the label 2430 may be printed on recyclable material, such as paper, PlantBottle type plastic, and in the case of edible receptacles such as ice cream cones, may be printed on edible labels, which may, for example, be manufactured of starch-based or other edible materials.

As is known, food and beverage product formulators regard the entire visible area of their product packaging, for example, a can of a soft drink, as precious real estate. Such product sellers carefully design their packages to maximize brand messaging and include beyond that only what is required and little, if anything, that is not required or desired for marketing purposes. The same is generally true of packages comprising product receptacles, such as beverage cups, available for use at food service outlets.

Returning to the example of a beverage can, current sellers of such products package them in cans having a background color, such as red for Coca-Cola, and include distinctive logos, script, and marketing messaging in prominent contrasting colors and highly readable fonts. On the other hand, Nutrition Facts labels on such packages are often designed as if to "blend in" to the background of the can, with the background of the Nutrition Facts label being the same color as the can, and the information itself being in a smaller, less readable font that may comprise a less prominent or less contrasting color, such as the silver color of the aluminum can in which the product is packaged.

Labels printed out or otherwise fabricated to be placed on a product receptacle, for example, a beverage cup, may, according to the present disclosure, be printed using a default to appear the same as a corresponding label on a packaged product, for example, a can of soda. In the case of a Coca-Cola beverage, the product receptacle, or cup 2400 may comprise a red background 2424, and the label 2430 may comprise a red Nutrition Facts label with silver lettering of a size and font as near as possible to that displayed on a can of a corresponding beverage, i.e., regular Coca-Cola. This format may be preferable to product formulators who wish to convey a consistent brand image across all product lines, receptacles, and packages, and wish to maximize the impact of brand messaging they hope to convey, while minimizing the impact of messaging they are required to display, such as Nutrition Facts, whether their products are packaged for future consumption (such as in bottles and cans) or dispensed unpackaged for immediate consumption (such as into beverage cups filled by a product dispenser). In another embodiment, the label 2430 may be printed onto a clear substrate that may be applied to any region of the product receptacle 2400, without as much concern about masking or marring branding indicia 2410 or other marketing messaging on the product receptacle 2400.

But for many consumers, such labeling, such as used on presently sold packaged products, may be difficult to read, particularly for older consumers. According to one aspect of the disclosure, the product dispenser may be configured to enable a consumer to customize the size and/or prominence of the label font that is printed out for placement on the product receptacle. For example, rather than printing out a red label with silver font for placement on a red cup, the consumer may be empowered to request that a product dispenser so equipped print out a white label with black, bold lettering, for easier reading, to be applied to the product receptacle.

As is well known, product receptacles such as beverage cups may be configured with RFID chips or other similar devices enabling the product receptacle to communicate with a product dispenser, such as a Freestyle-type dispensing machine. Recently, SeaWorld Parks & Entertainment began using such a product receptacle to communicate refillable cups with Freestyle dispensers. Introduced as "The Cup That Cares," the reusable cup reportedly is embedded with an RFID chip that interacts with Coca-Cola Freestyle® dispensers in SeaWorld theme parks and calculates the amount of carbon guests keep from the environment by refilling their cups. Now, employing the teachings disclosed herein, cups or receptacles such as 2400 of FIG. 24 may be embedded with a similar RFID chip, perhaps in a receptacle termed "The Company That Cares About Consumers™," in order to keep track of product attributes such as calories, sodium, caffeine, fat, etc., and other Nutrition Facts or other attributes being dispensed during one or more dispensing operations by users of product dispensers such as Coca-Cola Freestyle® dispensers. In this aspect, the RFID chip may be configured to determine and sum the total product attributes, such as calories, that a user of the product receptacle into which the RFID chip is embedded have been dispensed during a predetermined dispensing operation. A "predetermined dispensing operation" as used herein may comprise a period of time, for example, an hour, a day, and/or a week, or other time frame during which a user of the product receptacle has accessed a product dispenser, such as a Freestyle® dispenser, with which the RFID chip is configured to communicate.

Figure 25:
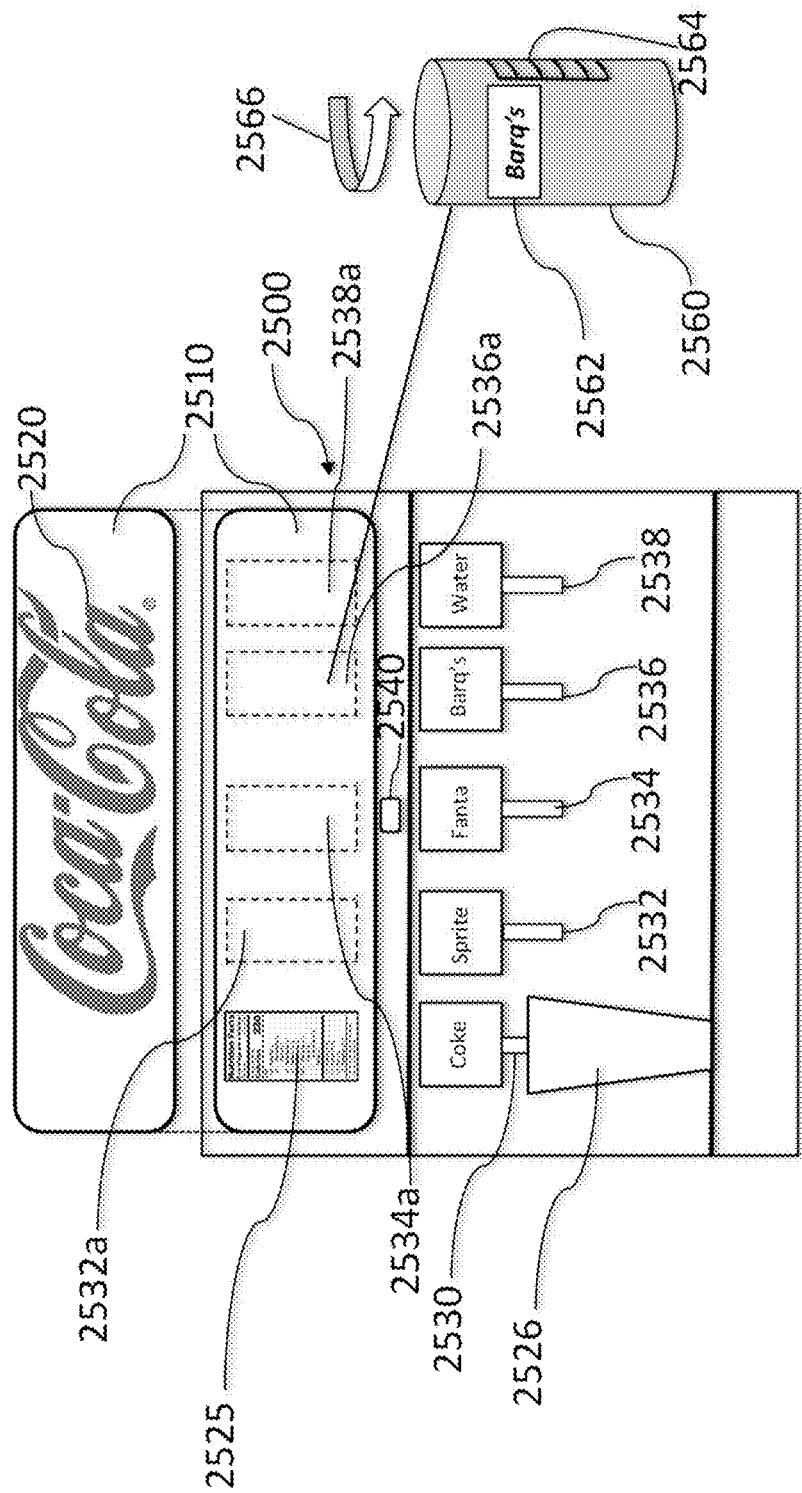
FIG. 25 illustrates another aspect of the disclosure, comprising a "legacy"-type product dispenser, i.e., fountain beverage or other flowable or soft food (such as soft serve ice cream, frozen yogurt, frozen beverages, etc.) dispenser.

FIG. 25 illustrates another aspect of the disclosure, comprising a "legacy"-type product dispenser, i.e., fountain beverage or other flowable or soft food (such as soft serve ice cream, frozen yogurt, frozen beverages, etc.) dispenser, generally 2500, comprising a display 2510 configured according to aspects of the disclosure. As illustrated, the display 2510 may be positioned in approximately the same location on the product dispenser 2500 where existing product dispensers tend to display branding indicia 2520, most often on a banner located proximate the top portion of the dispenser, as illustrated in FIG. 19 as element 1905. Such dispensers are commonly used to dispense unpackaged food and beverage products into receptacles such as cups, ice cream cones, and the like, from one or more product taps, valves, and/or associated levers, 2530, 2532, 2534, 2536, 2538 associated with the product dispenser 2500. The display 2510 of the present disclosure may be retrofitted to existing such product dispensers or may be manufactured integrally with new dispensers.

In a preferred aspect, one or more of the product taps, valves, and/or associated levers, 2530, 2532, 2534, 2536, 2538 associated with the product dispenser 2500 may be configured, in addition to dispense a product upon actuation thereof, to trigger that product attributes of such product be displayed, and that such display be located in a field of vision of the product being dispensed. As is known, product dispensers such as fountain beverage dispensers comprise one or more product taps, valves, and/or associated levers that when actuated, for example, by pushing a lever such as 2530, actuate a switch or other control mechanism to open a valve and/or turn on an evacuation pump to cause product such as a beverage syrup to be dispensed, for example, from a bag-in-box container and/or water supply associated with the fountain beverage dispenser. According to an aspect of the disclosure, such actuation switches or other control mechanisms may now be employed to also initiate product attribute display operations as set forth herein. Such taps, valves, and/or associated levers may be reconfigured, for example, to include volumetric flow monitoring devices enabling product attributes associated with the product being dispensed, such as Nutrition Facts, to be determined and displayed, for example, as previously described.

The display 2510 of FIG. 25 may thus comprise or be associated with similar systems and apparatus as the display 1910 of FIG. 25 or the display 910 of FIG. 6, but with an additional capability; the display 2510 (and 910, 1910) may be configured to display a label, for example, a virtual Nutrition Facts label 2525 upon a user selecting a product to be dispensed from the product dispenser 2500, the virtual label being displayed in substantially the same field of vision as the selected product, in this case, a Coke® beverage, being dispensed into a beverage cup 2526. In this way, the embodiment of FIG. 25 may comply with the FDA's proposed regulations for labeling of product dispensers to display appropriate labels "in the same field of vision as the food items in the machine."

As illustrated in the example of FIG. 25, the label 2525 may comprise a virtual Nutrition Facts label, which may, but need not be, a real time label as previously described, and may be displayed in a location of the display 2510 proximate, for example, directly over the tap 2530 being actuated to dispense the product. The product dispenser 2500 of FIG. 25 may also be equipped or associated with a label maker, such as a printer and related printed label dispenser 1940, 2084, previously described. As will now be apparent, any or all of the other product taps, valves, and/or associated levers, 2532, 2534, 2536, 2538 associated with the product dispenser 2500 may be similarly configured to trigger a display of virtual Nutrition Facts labels proximate such taps, valves, or levers upon actuation thereof, at locations in the same field of vision as the products being dispensed from or via such taps, valves, and/or associated levers, for example, as represented by the broken line field of vision locations 2532a, 2534a, 2536a, and 2538a, respectively. The display of a virtual Nutrition Facts label 2525 may be displayed in proximity to, or even superimposed over, the branding indicia 2520. Alternatively, the branding indicia 2520 may yield the display 2510 partially or entirely to the virtual Nutrition Facts label 2525. For example, while the product dispenser 2500 is in standby mode, the display 2510 may be configured to display only product formulator graphics or branding indicia 2520. But once a user activates one or more of the product taps, valves, and/or associated levers, 2530, 2532, 2534, 2536, 2538, the branding indicia 2520 or other display content may diminish in size, move away from the appropriate field of vision for the product being dispensed, or disappear entirely from the field of vision and be replaced by one or more labels 2525 in the field of vision.

In another aspect of the embodiment illustrated in FIG. 25, the product dispenser and/or display may be configured such that at least two of the product taps, valves, and/or associated levers, 2530, 2532, 2534, 2536, 2538 may be actuated simultaneously, and the display 2510 may be further configured to display simultaneously a virtual Nutrition Facts label or other message, i.e., a warning, calorie count, etc., corresponding to the product taps, valves, and/or associated levers, 2530, 2532, 2534, 2536, 2538 being actuated simultaneously. Thus, multiple users of the product dispenser 2500 may be able to access it simultaneously and see, within their respective fields of view, for example field of vision locations 2532a, 2534a, 2536a, and 2538a, a virtual Nutrition Facts label or other label corresponding to the product each user is dispensing from the product dispenser 2500.

In another aspect of the embodiment illustrated in FIG. 25, the product dispenser and/or display may be configured to display a virtual package branded to correspond to an unpackaged product being dispensed from the product dispenser. In this example, the product being dispensed is Barq's Root Beer, from tap 2536, and the virtual package 2560 corresponding to it is a virtual can of Barq's Root Beer 2560 being displayed at field of vision location 2536a of the display 2520. As illustrated, the virtual package 2560 may comprise branding indicia 2562 and a virtual Nutrition Facts label 2564. Such virtual package 2560 may be configured to rotate, as illustrated by arrow 2566 in order to display a 360-degree view of the virtual package, as is currently done on packaged product vending machines such as the Coca-Cola "Thirst Station" packaged product vending machine manufactured by Royal Vendors, Inc. under the brand "Econo-Cool." Such virtual Nutrition Facts label 2564 may be configured to simply display a static, i.e., unchanging set of Nutrition Facts, for example those corresponding to a packaged 12-ounce serving, or may be configured to display, in real time, the actual Nutrition Facts of the product as it is being dispensed from the dispenser 2500.

In an alternative embodiment, the product dispensers disclosed herein may be configured to display both a static virtual Nutrition Facts label for a standard serving size, such as 8 or 12 ounces, and a real time virtual Nutrition Facts label in the same field of vision, such that the consumer may compare product attributes of a standard size portion to the product attributes of the portion size being dispensed. The display may be further configured to compare both the static standard serving size and real time serving size product attributes, and display the relative difference between them, also in real time, also in the same field of vision.

As will now be appreciated, the display 2510 may be further configured to sum the totality of Nutrition Facts from multiple dispenses, for example, via taps 2530, 2532, 2534, 2536, and 2538 during a single dispensing operation, for example, if a user dispenses products from more than one tap into a receptacle, or dispenses product from one or more taps or dispenses products from the same dispenser at different times. The single dispensing operation may be determined, for example, by one or more motion and/or proximity sensors 2540 located on or associated with the product dispenser 2500. Such sensors may be of known design, for example of the type manufactured by the Sloan Valve Company, and used for sensing when a user of a self-flushing toilet has departed the area. In the same way, the product dispenser 2500 may be reset to zero once a user thereof has been determined by the sensor 2540 to no longer be proximate the dispenser, thereby readying the same for the next user, for example, by deleting the previous user's virtual Nutrition Facts label from the display 2510 and again displaying the banner or brand indicia 2520. Alternatively, the display 2510 may reset to zero or delete the virtual Nutrition Facts label 2525 from the display 2510 after a predetermined period of time, for example, 5 seconds, following discontinuation of product dispensing, for example by ceasing actuation of one of the product taps, valves, and/or associated levers, 2530, 2532, 2534, 2536, 2538. As another example, when a receptacle containing an RFID chip 2440 as illustrated in FIG. 24 is used, the product dispenser 210, 900, 1900, 2500 may be configured to sum the total product attributes, i.e., calories, Nutrition Facts, etc., that a user associated with the RFID chip 2440 dispenses during a predetermined period of time considered a dispensing operation, which may be an hour, a day, and/or a week, etc. In this way, a product dispenser 210, 600, 900, 1900, 2500 may provide feedback to the user concerning, for example, how many calories or grams of sugar were dispensed by that user that day, how much alcohol was dispensed by that user in the past hour, and so forth, and communicate such information to the user, either on the display associated with the product dispenser or to a mobile device with which the user is associated.

Any of the above mentioned aspects can be implemented in methods, systems, computer readable media, or any type of manufacture. It should be understood to those skilled in the art that the various techniques described herein may be implemented in connection with hardware or software or, where appropriate, with a combination of both. For example, aspects of the invention may execute on a programmed computer. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, smart phone, or other machine, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations. In example embodiments a computer readable storage media can include for example, random access memory (RAM), a storage device, e.g., electromechanical hard drive, solid state hard drive, etc., firmware, e.g., FLASH RAM or ROM, and removable storage devices such as, for example, CD-ROMs, floppy disks, DVDs, FLASH drives, external storage devices, etc. It should be appreciated by those skilled in the art that other types of computer readable storage media can be used such as magnetic cassettes, flash memory cards, digital video disks, Bernoulli cartridges, and the like. The computer readable storage media may provide non-volatile storage of processor executable instructions, data structures, program modules and other data for a computer.

While the present disclosure has been presented with reference to various exemplary embodiments comprising descriptions, tables, examples, and figures, it will now be appreciated that such embodiment are intended to be exemplary and non-limiting, and that various aspects of such embodiments may be combined with other disclosed aspects. For example, in some aspects, systems and apparatus have been described in which Nutrition Facts labels may be printed and dispensed as a label that may be applied to a product receptacle. It will now be appreciated that such labels may be printed directly onto a cup or other product receptacle at the conclusion of a dispensing operation, for example, employing devices to orient the cup such that a printer head associated with the machine may print onto a predefined area of the cup that may be hydrophobic, for example. As another example, as is known, products may be purchased from product dispensers using cash or cashless vending systems. Employing the teachings herein, it is now possible to pay for dispensed products, such as soft drinks based on the quantity dispensed, similar to payment for gasoline at a kiosk following a dispensing operation. As yet another example, Nutrition Facts information may be transmitted or displayed not only in real time, but also at the beginning, intermittently through or at the end of a dispensing operation, based on a RACC quantity, for example, or any other standard serving size. Such Nutrition Facts information may be provided in response to a request for a free product sample, a customized blend, or a standard formulation from the dispenser.

The purpose of the present disclosure is not to criticize or judge sellers and manufacturers of consumer products, governing bodies and regulators that enact laws and regulations concerning such products, or consumers for the personal decisions they make regarding the purchase, use or consumption of such products. Rather, the present disclosure is intended to provide a framework for implementing systems, methods, and apparatus that may serve as a vehicle for a reasonable compromise among: (1) consumer product sellers and manufacturers who wish to comply with both the letter and spirit of all applicable case precedent, laws, and regulations concerning their products, who wish to provide full, frank, and fair disclosure to consumers regarding the attributes of such products, and who wish to provide consumers greater opportunities for making informed choices regarding which products they purchase, use, and consume; (2) governing and regulating bodies who wish to fulfill their respective charters to advocate on behalf of, protect, and serve their constituencies, to regulate the health and safety aspects of the products such constituencies purchase, use, and consume, and to direct the manner in which such products are advertised or sold; and (3) consumers who wish to be empowered to make fully informed choices regarding the products they purchase, use, and consume, who wish to have greater opportunities to customize such products and choices, and who wish to be able to make such choices freely.

We claim:

1. A product dispenser including a touch point enabling a user to select a product intended to be dispensed from the product dispenser, the product dispenser configured with a wireless connection enabling a mobile device associated with the user to communicate wirelessly with the product dispenser, the product dispenser configured to enable the user to select a requested product from the product dispenser either via the touch point, or wirelessly via the mobile device and the wireless connection with the product dispenser in place of the touch point, wherein the mobile device is configured to receive a push notification intended for a mobile application associated with the mobile device, the push notification offering the product to be dispensed from the product dispenser, and the mobile device is further configured to transmit a response to the push notification indicating acceptance of the offering, and wherein the product dispenser is configured to enable the user to customize the product intended to be dispensed from the product dispenser via the mobile application associated with the mobile device.

2. The product dispenser of claim 1 wherein the touch point comprises a touchscreen.

3. The product dispenser of claim 1 wherein the product intended to be dispensed comprises a purchased product.

4. The product dispenser of claim 1 wherein the product intended to be dispensed comprises a free sample.

5. The product dispenser of claim 1 wherein the product intended to be dispensed comprises a user-customized purchased product.

6. The product dispenser of claim 1 wherein the product dispenser comprises a beverage dispenser.

7. The product dispenser of claim 1 wherein enabling the user to request a selected product from the product dispenser via the mobile device in place of the touch point is enabled via a software upgrade to an existing product dispenser.

8. The product dispenser of claim 1 wherein the product dispenser comprises a retrofitted legacy fountain dispenser.

9. The product dispenser of claim 5 wherein the user-customized product comprises a pre-saved beverage mix stored on the user's mobile device.

10. A mobile device configured with a wireless connection enabling the mobile device to communicate wirelessly with a cloud computer storing beverage formulation data for a beverage intended to be dispensed from an upgraded beverage dispenser, the mobile device further configured to communicate wirelessly with the upgraded beverage dispenser, the upgraded beverage dispenser having a touchscreen enabling a user to select a beverage intended to be dispensed from the beverage dispenser, the mobile device wireless connection enabling the user to select the beverage from the upgraded beverage dispenser via the mobile device in place of the touchscreen, wherein the mobile device is configured to receive a push notification intended for a mobile application offering the product to be dispensed from the product dispenser, and to transmit a response to the push notification indicating acceptance of the offering, and wherein the mobile application is configured to enable the user to select the beverage from the upgraded beverage dispenser via the mobile device in place of the touchscreen.

11. The mobile device of claim 10, wherein the beverage intended to be dispensed comprises a user-customized beverage.

12. The mobile device of claim 10, wherein the beverage intended to be dispensed comprises a purchased beverage.

13. The mobile device of claim 10 wherein the beverage intended to be dispensed comprises a free sample.

14. A software upgrade intended for an existing beverage dispenser comprising a touchscreen enabling a user to select a beverage intended to be dispensed from the existing beverage dispenser, the software upgrade intended to result in an upgraded beverage dispenser, the software upgrade comprising a non-transitory computer readable storage medium storing instructions that, when executed by a processor, perform the steps of:
   a. providing instructions to wirelessly connect the upgraded beverage dispenser with a mobile device of the user, enabling the mobile device to communicate wirelessly with a cloud computer storing beverage formulation data for a beverage intended to be dispensed from the upgraded beverage dispenser; and
   b. providing instructions enabling the user to select the beverage intended to be dispensed from the upgraded beverage dispenser either via the touchscreen or via the mobile device in place of the touchscreen; and
   c. providing instructions to the upgraded beverage dispenser to dispense the beverage intended to be dispensed from the upgraded beverage dispenser, wherein the beverage dispenser is configured to transmit a push notification intended for a mobile device, the push notification offering the product to be dispensed from the product dispenser, and to receive a response to the push notification indicating acceptance of the offering, and, wherein the mobile device mobile application is configured to enable the user to select the beverage from the upgraded beverage dispenser via the mobile device in place of the touchscreen.

15. The software upgrade of claim 14, wherein the beverage intended to be dispensed from the upgraded beverage dispenser comprises a user-selected customized beverage.

* * * * *